(12) United States Patent
Adams et al.

(10) Patent No.: US 7,771,699 B2
(45) Date of Patent: Aug. 10, 2010

(54) DEPOLYMERIZATION PROCESS OF CONVERSION OF ORGANIC AND NON-ORGANIC WASTE MATERIALS INTO USEFUL PRODUCTS

(75) Inventors: Terry N. Adams, Tacoma, WA (US); Brian S. Appel, West Hempstead, NY (US); Craig Timothy Einfeldt, Collegeville, PA (US); James H. Freiss, Stony Brook, NY (US)

(73) Assignee: AB-CWT, LLC, West Hempstead, NY (US)

( * ) Notice: Subject to any disclaimer, the term of this patent is extended or adjusted under 35 U.S.C. 154(b) by 335 days.

(21) Appl. No.: 11/529,825

(22) Filed: Sep. 29, 2006

(65) Prior Publication Data
US 2007/0098625 A1    May 3, 2007

Related U.S. Application Data

(60) Provisional application No. 60/721,836, filed on Sep. 28, 2005, provisional application No. 60/727,491, filed on Oct. 17, 2005, provisional application No. 60/778,034, filed on Feb. 28, 2006, provisional application No. 60/812,275, filed on Jun. 9, 2006, provisional application No. 60/840,207, filed on Aug. 25, 2006.

(51) Int. Cl.
   *C01B 7/19* (2006.01)
(52) U.S. Cl. .................. 423/484; 585/15; 585/240; 422/188; 422/198
(58) Field of Classification Search ................. 423/484; 422/188, 198; 585/15, 240
   See application file for complete search history.

(56) References Cited

U.S. PATENT DOCUMENTS

| | | |
|---|---|---|
| 3,558,426 A | 1/1971 | Hess et al. |
| 3,704,108 A | 11/1972 | Alpert |
| 3,733,255 A | 5/1973 | Appel et al. |
| 3,838,199 A | 9/1974 | Coe et al. |

(Continued)

FOREIGN PATENT DOCUMENTS

| CA | 1093102 | 1/1981 |
|---|---|---|

(Continued)

OTHER PUBLICATIONS

Elliott et al., "Liquid Hydrocarbon Fuels from Biomass," *Amer. Chem. Soc., Div. Fuel Chem. Preprints* (1989) 34(4):1160-1166.

(Continued)

*Primary Examiner*—In Suk Bullock
*Assistant Examiner*—Prem C. Singh
(74) *Attorney, Agent, or Firm*—Downs Rachlin Martin PLLC

(57) ABSTRACT

The present invention relates to the conversion of waste and low-value materials into useful products in reliable purities in a cost-effective and energy-efficient manner. More specifically, the invention provides processes that can handle mixed streams of various feedstocks, e.g. shredder residue, offal, animal manures, municipal sewage sludge, tires, and plastics, that otherwise have little commercial value, to useful products including gas, oil, specialty chemicals, and carbon solids. The process subjects the feedstock to heat and pressure, separates out various components, then further applies heat and pressure to one or more of those components, according to processes based on thermal or catalytic cracking. The invention further comprises an apparatus for performing a multi-stage process of converting waste materials into useful materials, and at least one oil product that arises from the process. Useful products can also be obtained or derived from materials diverted at different points of the process.

27 Claims, 26 Drawing Sheets
(7 of 26 Drawing Sheet(s) Filed in Color)

U.S. PATENT DOCUMENTS

| | | | |
|---|---|---|---|
| 3,946,679 A | 3/1976 | Varani | |
| 4,002,438 A | 1/1977 | Fleming | |
| 4,010,098 A | 3/1977 | Fassell | |
| 4,054,590 A | 10/1977 | Gerberich, Jr. | |
| 4,057,401 A | 11/1977 | Boblitz | |
| 4,093,516 A | 6/1978 | Lang | |
| 4,094,740 A | 6/1978 | Lang | |
| 4,113,185 A | 9/1978 | Marsh et al. | |
| 4,118,281 A | 10/1978 | Yan | |
| 4,164,396 A | 8/1979 | Jones | |
| 4,192,734 A | 3/1980 | Pavlica et al. | |
| 4,260,473 A | 4/1981 | Bauer | |
| 4,271,326 A | 6/1981 | Mego | |
| 4,280,817 A | 7/1981 | Chauhan et al. | |
| 4,289,625 A | 9/1981 | Tarman et al. | |
| 4,298,621 A | 11/1981 | Samis et al. | |
| 4,321,150 A | 3/1982 | McMullen | |
| 4,321,151 A | 3/1982 | McMullen | |
| 4,344,770 A | 8/1982 | Capener et al. | |
| 4,364,745 A | 12/1982 | Weil | |
| 4,439,209 A | 3/1984 | Wilwerding et al. | |
| 4,515,659 A | 5/1985 | Wingfield, Jr. et al. | |
| 4,552,621 A | 11/1985 | Lyakhevich et al. | |
| 4,578,163 A | 3/1986 | Kunter et al. | |
| 4,618,735 A | 10/1986 | Bridle et al. | |
| 4,636,318 A | 1/1987 | Baker | |
| 4,657,681 A | 4/1987 | Hughes et al. | |
| 4,755,300 A | 7/1988 | Fischel et al. | |
| 4,795,841 A | 1/1989 | Elliott et al. | |
| 4,842,692 A | 6/1989 | Baker | |
| 4,842,728 A | 6/1989 | Baker | |
| 4,871,426 A | 10/1989 | Lechert et al. | |
| 4,871,462 A | 10/1989 | Fischel et al. | |
| 4,891,459 A | 1/1990 | Knight et al. | |
| 4,897,205 A | 1/1990 | Landry | |
| 4,923,604 A | 5/1990 | Baker | |
| 4,935,038 A | 6/1990 | Wolf | |
| 4,938,876 A | 7/1990 | Ohsol | |
| 4,938,976 A | 7/1990 | Shemer | |
| 4,941,952 A | 7/1990 | Betz | |
| 4,950,309 A | 8/1990 | Schulz | |
| 4,971,703 A | 11/1990 | Sealock, Jr. et al. | |
| 4,980,029 A | 12/1990 | Bolz et al. | |
| 4,981,579 A | 1/1991 | Paspek et al. | |
| 5,221,357 A | 6/1993 | Brink | |
| 5,269,947 A | 12/1993 | Baskis | |
| 5,359,061 A | 10/1994 | Evans et al. | |
| 5,360,553 A | 11/1994 | Baskis | |
| 5,387,267 A | 2/1995 | Warf et al. | |
| 5,389,258 A | 2/1995 | Smis et al. | |
| 5,425,925 A | 6/1995 | Kline et al. | |
| 5,466,383 A | 11/1995 | Lee | |
| 5,485,728 A | 1/1996 | Dickinson | |
| 5,498,827 A | 3/1996 | Khan et al. | |
| 5,543,061 A | 8/1996 | Baskis | |
| 5,609,113 A | 3/1997 | Galipeault et al. | |
| 5,636,580 A | 6/1997 | Kanis | |
| 5,685,153 A | 11/1997 | Dickinson et al. | |
| 5,711,235 A | 1/1998 | May et al. | |
| 5,817,282 A | 10/1998 | Radlein et al. | |
| 5,852,062 A | 12/1998 | Carpenter | |
| 5,888,307 A | 3/1999 | Solheim | |
| 5,891,926 A | 4/1999 | Hunt et al. | |
| 6,172,275 B1 | 1/2001 | Tadauchi et al. | |
| 6,180,845 B1 | 1/2001 | Catallo et al. | |
| 6,197,081 B1 | 3/2001 | Schmidt | |
| 6,387,221 B1 | 5/2002 | Schoenhard | |
| 6,465,707 B1 | 10/2002 | Procida | |
| 6,504,068 B1 | 1/2003 | Matsubara et al. | |
| 6,548,560 B1 | 4/2003 | Kovalak et al. | |
| 6,699,708 B1 | 3/2004 | Muller et al. | |
| 6,822,126 B2 | 11/2004 | Miller | |
| 6,905,600 B2 | 6/2005 | Lee, Jr. | |
| 7,179,379 B2 | 2/2007 | Appel et al. | |
| 7,301,060 B2 | 11/2007 | Appel et al. | |
| 7,476,296 B2 | 1/2009 | Appel et al. | |
| 2002/0010222 A1* | 1/2002 | Sendijarevic | 521/49 |
| 2003/0153797 A1 | 8/2003 | Percell | |
| 2004/0192980 A1 | 9/2004 | Appel et al. | |
| 2004/0192981 A1* | 9/2004 | Appel et al. | 585/241 |
| 2005/0113611 A1 | 5/2005 | Adams et al. | |
| 2006/0231510 A1 | 10/2006 | Benachenhou | |
| 2007/0098625 A1 | 5/2007 | Adams et al. | |
| 2009/0062581 A1 | 3/2009 | Appel et al. | |

FOREIGN PATENT DOCUMENTS

| | | |
|---|---|---|
| CN | 1392224 A | 1/2003 |
| DE | 4313123 A1 | 1/1995 |
| JP | 53049855 A | 5/1978 |
| JP | 58156023 A | 9/1983 |
| JP | 59047292 A | 3/1984 |
| JP | 2001137812 | 2/2001 |
| RU | 2022666 | 11/1994 |
| RU | 2169075 | 6/2001 |
| RU | 2185892 | 7/2002 |
| SU | 1087077 | 3/1972 |
| SU | 727152 | 4/1980 |
| WO | 9406721 | 3/1994 |
| WO | 9521903 | 8/1995 |
| WO | 0013811 | 3/2000 |
| WO | 2008073186 | 6/2008 |
| WO | 2009108761 | 9/2009 |

OTHER PUBLICATIONS

Matar et al., "Crude Oil Processing and Production of Hydrocarbon Intermediates," *Chemistry of Petrochemical Processes* (2001) Chapter Three, pp. 49-109.

Yoshida et .al., "Production of Organic Acids and Amino Acids from Fish Meat by Sub-Critical Water Hydrolysis," *Biotechnot Prof.* (1999) 15:1090-1094.

Third Party Submission under 37 C.F.R. § 1.99 submitted by Paul Baskis.

Lemley, B., "Anything Into Oil", Discover, May 2003, pp. 51-57.

Staedter, T., "Garbage Into Oil", Technology Review, Jun. 2003 (www.technologyreview.com/articles/print_version/ visualize0603. asp).

Raymus, "Handling of Bulk Solids and Packaging of Solids and Liquids," in Perry's Chemical Engineers' Handbook, 7th ed. (1997), pp. 21-5-21-10.

Rubio et al., "Overview of floatation as a wastewater treatment technique," Minerals Engineering (2002) 15:139-155.

Restriction Requirement dated Dec. 1, 2006, in related U.S. Appl. No. 10/716,839 now U.S. Patent No. 7,476,296.

Response to Restriction Requirement dated Feb. 5, 2007, in related U.S. Appl. No. 10/716,839 now U.S. Patent No. 7,476,296.

Office Action dated Apr. 4, 2007, in related U.S. Appl. No. 10/716,839 now U.S. Patent No. 7,476,296.

Response to Office Action dated Oct. 4, 2007, in related U.S. Appl. No. 10/716,839 now U.S. Patent No. 7,476,296.

Final Office Action dated Nov. 9, 2007, in related U.S. Appl. No. 10/716,839 now U.S. Patent No. 7,476,296.

Response to Office Action dated Apr. 9, 2008, in related U.S. Appl. No. 10/716,839 now U.S. Patent No. 7,476,296.

Office Action dated Jun. 23, 2008, in related U.S. Appl. No. 10/716,839 now U.S. Patent No. 7,476,296.

Response to Office Action dated Jul. 17, 2008, in related U.S. Appl. No. 10/716,839 now U.S. Patent No. 7,476,296.

Notice of Allowance dated Sep. 12, 2008, in related U.S. Appl. No. 10/716,839 now U.S. Patent No. 7,476,296.

Office Action dated Feb. 22, 2006, in related U.S. Appl. No. 10/716,837 now U.S. Patent No. 7,179,379.

Response to Office Action dated Aug. 22, 2006, in related U.S. Appl. No. 10/716,837 now U.S. Patent No. 7.

Notice of Allowance dated Oct. 12, 2006, in related U.S. Appl. No. 10/716,837 now U.S. Patent No. 7,179,379.
Restriction Requirement dated Jul. 27, 2006, in related U.S. Appl. No. 10/957,540 now U.S. Patent No.
Response to Restriction Requirement dated Sep. 20, 2006, in related U.S. Appl. No. 10/957,540 now U.S. Patent No. 7,301,060.
Office Action dated Dec. 13, 2006, in related U.S. Appl. No. 10/957,540 now U.S. Patent No. 7,301,060.
Terminal Disclaimer dated Dec. 20, 2006, in related U.S. Appl. No. 10/957,540 now U.S. Patent No. 7,301,060.
Response to Office Action dated Apr. 13, 2007, in related U.S. Appl. No. 10/957,540 now U.S. Patent No. 7,301,060.
Notice of Allowance dated Jul. 24, 2007, in related U.S. Appl. No. 10/957,540 now U.S. Patent No. 7,301,060.
Terminal Disclaimer dated Dec. 20, 2006, in related U.S. Appl. No. 10/954,691.
Restriction Requirement dated Feb. 4, 2008, in related U.S. Appl. No. 10/954,691.
Response to Restriction Requirement dated Mar. 4, 2008, in related U.S. Appl. No. 10/954,691.
Office Action dated May 14, 2008, in related U.S. Appl. No. 10/954,691.
Response to Office Action dated Oct. 14, 2008, in related U.S. Appl. No. 10/954,691.
Second Office Action dated Nov. 20, 2008, in related U.S. Appl. No. 10/954,691.
Response to Second Office Action dated May 20, 2009, in related U.S. Appl. No. 10/954,691.
Restriction Requirement dated Oct. 4, 2005, in related U.S. Appl. No. 10/717,076.
Response to Restriction Requirement dated Nov. 4, 2005, in related U.S. Appl. No. 10/717,076.
Office Action dated Jan. 26, 2006, in related U.S. Appl. No. 10/717,076.
Response to Office Action dated Apr. 5, 2006, in related U.S. Appl. No. 10/717,076.
Final Office dated Jun. 28, 2006, in related U.S. Appl. No. 10/717,076.
Response to Final Office Action dated Sep. 20, 2006, in related U.S. Appl. No. 10/717,076.
Response to Final Office Action Refiled dated Oct. 18, 2006, in related U.S. Appl. No. 10/717,076.
Advisory Action dated Nov. 15, 2006, in related U.S. Appl. No. 10/717,076.
Notice of Appeal Terminal Disclaimer dated Dec. 20, 2006, in related U.S. Appl. No. 10/717,076.
Restriction Requirement dated May 10, 2007, in related U.S. Appl. No. 10/717,076.
Response to Restriction Requirement dated Nov. 13, 2007, in related U.S. Appl. No. 10/717,076.
Statement of Relatedness dated Feb. 7, 2008, in related U.S. Appl. No. 10/717,076.
Restriction Requirement dated Feb. 6, 2008, in related U.S. Appl. No. 10/717,076.
Response to Restriction Requirement dated May 6, 2008, in related U.S. Appl. No. 10/717,076.
Restriction Requirement dated Sep. 3, 2008, in related U.S. Appl. No. 10/717,076.
Response to Restriction Requirement dated Oct. 22, 2008, in related U.S. Appl. No. 10/717,076.
Office Action dated Jan. 12, 2009, in related U.S. Appl. No. 10/717,076.
Response to Office Action dated Jun. 12, 2009, in related U.S. Appl. No. 10/717,076.
Related U.S. Appl. No. 12/140,899, filed Jun. 17, 2008 entitled Methods and Apparatus for Converting Waste Materials Into Fuels and Other Useful Products.
Related U.S. Appl. No. 12/037,914, filed Feb. 26, 2008 entitled Methods and Apparatus for Converting Waste Materials Into Fuels and Other Useful Products.
International Search Report and Written Opinion dated May 13, 2008, in related International Application No. PCT/US05/34881.
International Search Report and Written Opinion dated Jan. 16, 2008, in related International Application No. PCT/US06/38024.
International Search Report and Written Opinion dated Apr. 14, 2009, in related International Application No. PCT/US09/35258.
Third Office Action dated Aug. 31, 2009 in related pending U.S. Appl. No. 10/954,691.
Final Office Action dated Sep. 17, 2009 in related pending U.S. Appl. No. 10/717,076.
Response to Office Action dated Nov. 25, 2009, in related pending U.S. Appl. No. 10/954,691, filed Sep. 29, 2004, Adams, Terry N., entitled Apparatus and Process for Separation of Organic Materials From Attached Insoluble Solids, and Conversion into Useful Products.
Supplementary European Search Report received Nov. 5, 2009, in related pending European Patent Application No. 06815770.0.
Notice of Allowance dated Jan. 11, 2010, in related U.S. Appl. No. 10/954,691, filed Sep. 29, 2004, Adams, Terry N., entitled Apparatus and Process for Separation of Organic Materials From Attached Insoluble Solids, and Conversion into Useful Products.
Response to Final Office Action dated Nov. 17, 2009, in related pending U.S. Appl. No. 10/717,076, filed Nov. 18, 2003, Brian S. Appel et al.

* cited by examiner

Hydrolyzed Intermediate Oil

DEPOLYMERIZATION PROCESS OF CONVERSION OF ORGANIC AND NON-ORGANIC WASTE MATERIALS INTO USEFUL PRODUCTS

CROSS-REFERENCES TO RELATED APPLICATION

The present application claims priority to U.S. patent application Ser. No. 60/721,836, filed Sep. 28, 2005, U.S. patent application Ser. No. 60/727,491, filed Oct. 17, 2005, U.S. patent application Ser. No. 60/778,034, filed Feb. 28, 2006, U.S. patent application Ser. No. 60/812,275, filed Jun. 9, 2006, and U.S. patent application Ser. No. 60/840,207, filed Aug. 25, 2006, each of which is incorporated herein by reference in its entirety.

FIELD OF THE INVENTION

The present invention generally relates to the processing of waste or low-value materials to form useful products. More specifically, the invention relates to a process and apparatus for converting industrial, agricultural, and other waste or low-value materials that contain carbon-based compounds, to commercially useful products such as fuel oil, fertilizer and specialty organic chemicals. The invention also reduces the potential for environmental pollution arising from inorganic waste streams.

BACKGROUND

It has long been recognized that many of the waste materials generated by human society can, ultimately, be broken down into a small number of simple organic materials that have their own intrinsic value. The ability to implement such transformation in an energy-efficient manner and on a large enough scale would be of tremendous benefit to society.

Most living materials, as well as most synthetic organic substances used in domestic and commercial applications comprise carbon-based polymers of various compositions. Under appropriate conditions, most such materials—including wood, coal, plastics, tires, and animal waste—will break down to a mixture of gaseous products, oils, and carbon. Materials such as agricultural waste materials may also contain inorganic substances that break down to mineral products. Almost all of these products, whether organic or inorganic, can enjoy new lives in a host of beneficial and often lucrative applications.

Not only is the principle of creating useful materials from otherwise unserviceable waste appealing: recycling of waste materials is of fundamental importance to the way that the burgeoning human population will come to cope with major challenges in the $21^{st}$ century. Two principal challenges facing humanity are coping with a finite supply of materials and energy, and with curtailing the growing threat to the environment from global warming. Indeed, an idea that is rapidly gaining currency is that recycling carbon-based materials from within the biosphere rather than introducing new sources of carbon from underground oil, natural gas and coal deposits could mitigate global warming.

As of today, however, industries that produce huge volumes of waste materials comprising largely organic materials face enormous challenges in disposing and storing that waste, as well as putting it to maximum beneficial use.

A case in point, the food processing industry around the world generates billions of pounds of organically rich wastes per year. These wastes are associated with the processing of both animal and plant products, and include turkey-, fish-, chicken-, pig-, and cattle-processing and husbandry wastes. The food processing industry continues to grow and its members face significant economic and environmental pressures to do something productive with their waste materials. Such waste materials give rise to a number of critical problems. The generation of greenhouse gases such as carbon dioxide and methane by landfilling, land applying, or digesting food wastes, without any other benefit, is one such problem. Ideally, the food industry must adopt efficient and economical ways of managing their wastes without discharging odorous or objectionable pollutants.

More recently, the cost of warehousing unusable byproducts in many areas is growing in significance. As the types of waste materials that can be fed to agricultural livestock become increasingly regulated. For example, in the wake of BSE/CJD scares in Europe, many waste materials are simply being warehoused, pending a suitable fate. Clearly, there is an additional urgent need to find an acceptable means to cleanly process and utilize such materials. Preferably, a way to convert food-processing wastes into useful, high-value products needs to be found.

An additional drive to seek treatment alternatives is the combined enforcement of wastewater discharge regulations and the escalation of sewage surcharges. The food processing industry must seek cost-effective technologies to provide pretreatment or complete treatment of their wastewaters and solid (wet) wastes. Historically, food processing facilities located within or adjacent to municipalities, have relied on local publicly owned treatment works (POTWs) for wastewater treatment and disposal. Increasingly, this option is becoming less available, as a result of more rigorous enforcement. Pressure to comply with wastewater discharge permits has increased. Dwindling federal grants for construction of new and upgraded POTWs also mean that this option is less appealing. Thus, the food-processing industry is increasingly being pressured to devise more effective ways of disposing of its inedible products.

Bioaccumulation of persistent chemicals such as dioxins and the potential for the spread of life threatening diseases such as Mad Cow Disease (BSE) is another threat to food processors and food consumers alike. This threat is greatly exacerbated by refeeding food processing residues to farm animals. Food processors need economical solutions to break this cycle.

Treatment of industrial waste, namely shredder residue, likewise presents another challenge. While most components of end-of-life automobiles, household and commercial appliances can be recycled, reused, or recovered, a significant portion is left over from the shredding process and finds its way into landfill. Disposal of shredder residue is made all the more difficult by the toxic materials found therein, e.g. cadmium, lead, mercury, and other heavy metals. Due to the limited amount of space available for landfill use and the increasing costs of hazardous waste disposal, an alternate solution is needed. The automotive and recycling industries are currently under pressure to devise ways of using shredder residue in a cost-effective and energy-efficient manner.

Furthermore, municipal and regional sewer authorities are requiring industries to reduce their organic biochemical oxygen demand (BOD), chemical oxygen demand (COD), and solid loading on the sewers. Due to the high BOD concentrations typically found in high-strength food process wastewaters with high levels of suspended solids, ammonia, and protein compounds, the food processing industry is under additional scrutiny. Food processing facilities need cost-effective and application-specific treatment technologies to manage their wastewaters and solid wastes effectively.

Similar problems are multiplied, magnified and augmented in many different ways across other industries. For example, the generation of malodorous air emissions associated with rendering plants—that convert animal waste by heat into fats and proteins, is one such problem. Another is land application of municipal biosolids that contain high concentrations of pathogens.

There have been various approaches developed to process used waste tires, say from truck and passenger vehicles, into useful products including fuels, petroleum oils, carbon, fuel-gases, and feedstocks for manufacture of tires and other rubber products. Typically, these schemes involve heating and dissolving the tires in solvents. Some of the schemes attempt to devulcanize the tire rubber, i.e., break the sulfur bonds that connect the constituent polymers along their lengths. Others attempt to depolymerize the rubber material. Depolymerization breaks the long chain polymers into a composition of smaller subunits with higher fluidity and greater utility, such as fuel oil. Some schemes involve using water under conditions near or above its critical point (~3,200 psi and ~370° C.) at which water can be an effective solvent for and reactant with the tire feedstock. However, such schemes are rendered energy-inefficient by virtue of the amount of energy needed to achieve super-critical conditions. Processing at super-critical conditions is also not cost-effective as it requires expensive super-alloy operating equipment.

A number of organic materials have been considered for dissolving tire material to form a heavy oil or a devulcanized rubber product. Existing schemes that operate at modest conditions (<200 psi) generally produce heavy, contaminated products, whereas those that use lighter solvents produce better products but also require a more expensive solvent or higher operating pressure (>2,000 psi), or both. Additionally, most schemes that use a solvent to dissolve tire material are uneconomical due to loss of some fraction of the solvent during the process and the cost associated with the make-up solvent, even in instances where solvent recovery and reuse can be practiced.

Aerobic and anaerobic digesters have been employed at sewage treatment plants to treat municipal sewage sludge. There are a number of problems associated with their use. The basic principle behind their operation is that biologically rich materials are directed into large holding vessels that contain bacteria which digest the biological materials. Typically, dissolved solids are directed to an aerobic digester, and suspended solids are directed to an anaerobic digester. Once the nutritional feed materials are exhausted, the bugs can no longer sustain themselves, and they die. The end-product of the digestion period is a sludge that contains the dead bacteria, and which must be disposed of in some way. One problem with the resulting material is that it still contains pathogens. Problems with the whole process, in general, include that the holding times in the digester vessels can be as long as 17 days, and that the operating conditions are difficult to maintain. For example, the relatively large vessel (typically 20-30 ft. in diameter) is usually maintained at above 85° F., and in some cases above 122° F.

All of the disposal technologies currently available to industries, in particular the food processing industry, have significant limitations and drawbacks that provide an incentive to search for alternative processes. This applies to technologies in addition to the use of existing POTWs. In particular, four types of approach, land disposal (landfills, composting, land application), biotreatment, traditional thermal oxidation treatments such as incineration/combustion, and pyrolysis/gasification, all have separate drawbacks.

Drawbacks for land disposal include: high haulage or transport costs, significant potential for groundwater contamination from leaching, and the exposure of area residents to high concentrations of hazardous pollutants (such as pathogens in the instance of land application). Landfills produce gas that can create air pollution concerns, including the generation of greenhouse gases.

Biotreatment of waste also has its disadvantages. The process is difficult to control and its performance equally difficult to verify. How well the process performs largely depends on whether adequate airflow, i.e. oxygenating means, eis provided to the soil where aerobic bacteria is involved. Additionally, bacteria that may have been developed to consume specific compounds will, when placed in soil, activate alternative enzyme systems to consume the easiest available compounds.

Drawbacks associated with older incineration or combustion units include the need to add equipment or components to meet increasingly heightened air pollution emission standards. It may also take longer to obtain air discharge permits for incinerators than for other technologies due to significant community concerns about incineration. Additionally, the treatment of the waste at the exhaust means treating large volumes of gas so that very large plant equipment is required. The feedstock is also low in calorific value. Some incinerators are not compatible with solid fuels or solid waste, as these materials will start to oxidize too high up in the furnace. Conversely, high moisture content in the feedstocks is also a problem because during incineration or combustion the water is vaporized and removed—a process which requires approximately 1,000 Btu/lb of water vaporized. This represents huge heat/energy losses to the system.

The last category of technique employed—pyrolysis/gasification—is appealing because, unlike the others mentioned, it attempts to convert the waste into utilizable materials, such as oils and carbon. Of principal concern in implementing ways to break down waste ematerials is finding a means of controlling the composition of the resulting products while minimizing the amount of energy needed to effect the breakdown. Generally, pyrolysis and gasification methods employed in the past were aimed at breaking down the waste materials in a single stage process, but a single stage has been found to offer inadequate control over purity and composition of the end products.

Pyrolyzers have been used to break down organic materials to gas, oils and tar, and carbonaceous materials. A pyrolyzer permits heating of the organic materials to high temperatures, ~400-500° C., but has poor energy efficiency and gives little control over the composition of the resulting materials. In particular, most waste materials—especially those originating from agricultural sources—contain up to 50% water. To effectuate the breakdown, pyrolyzers in the art would boil off the water using a very energy-demanding process. Additionally, a pyrolysis chamber is typically large in size so as to maximize throughput. However, use of a large chamber also has the unfortunate side-effects of generating significant temperature gradients throughout the chamber, resulting in uneven heating of waste materials and poor quality or impure end products.

Gasifiers have been used to achieve a partial combustion of waste materials. In essence, a gas—usually air, oxygen, or steam—is passed over the waste materials in an amount that is insufficient to oxidize all the combustible material. Thus, some combustion products such as $CO_2$, $H_2O$, CO, $H_2$ and light hydrocarbons are produced, and the generated heat converts the remaining waste materials into oils, gases, and carbonaceous material. The gases produced will contain some of the input gases, but any gases that are produced are too voluminous to be stored and must be used immediately or piped to a location where they can be utilized. Gasifiers also suffer from some of the same drawbacks as pyrolyzers, e.g. high energy consumption in vaporizing water content of waste material.

Products of pyrolysis and gasification methods also tend to contain unacceptably high levels of impurities. In particular, sulfur- and chlorine-containing materials in waste materials give rise, respectively, to sulfur-containing compounds such as mercaptans, and organic chlorides in the resulting end products. Typically, chlorinated hydrocarbons at levels of 1-2 ppm can be tolerated in hydrocarbon oils, but neither gasification nor pyrolysis methods can guarantee such a low level with any reliability.

Furthermore, pyrolysis and gasification methods have low efficiencies, typically around 30%. One reason for this is that the products are not optimum in terms of calorific content. Another reason is that a single stage process cannot readily produce materials in a form from which energy can be efficiently harnessed and recycled in the process. For example, it is difficult to capture the thermal energy in the solid products that are produced and redirect it to assist in the heating of the reaction vessel.

As detailed above, pyrolysis/gasification methods suffer in several ways. The oil product is generally rich in undesirable high viscosity components such as tar and asphalt. Both pyrolysis and gasification processes have poor heat transfer properties and consequently do not heat evenly. Therefore, end products vary greatly in number with few of sufficient quantity or quality for economical recovery. Wet feedstocks require significant energy to vaporize and represent large energy losses to the system since the water leaves as a gas in the stack. In summary, pyrolysis/gasification has a high overall operating cost, is capital intensive, and produces some by-products of no or limited value.

Although there have been many variants of the pyrolysis and gasification methods, all of which have suffered from broadly similar drawbacks, one recent advance has permitted significant increases in processing efficiency. For example, U.S. Pat. Nos. 5,269,947, 5,360,553, and 5,543,061, disclose systems that replace the single-stage process of the prior methods with a two-stage process. In a Hydrolysis Stage (often referred to as the "wet" stage), the waste materials are subjected to heat at around 200-250° C. and at about 20-120 atmospheres pressure. In preferred embodiments, the waste materials are subjected to a pressure of about 50 atmospheres. Under such conditions, the water content of the waste material hydrolyzes many of the biopolymers such as fats and proteins that may be present to form a mixture of oils. In a second stage (often called the "dry" stage), the mixture is flashed down to low pressure, during which around half of the water is driven off as steam. The mixture is heated still further to evaporate off the remaining water while the mixture ultimately breaks down into gaseous products, oils, and carbon.

The principal advance of these two-stage methods was to permit generation of higher quality and more useful mixtures of oils than any previous single stage process. However, the products of such methods still suffer from problems of contamination, from materials such as sulfur- and chlorine-containing compounds, and the need to evaporate a significant portion of the water still entails a substantial energy penalty. Thus, prior two stage methods have been difficult to make commercially viable.

Accordingly, there is a need for a method of processing waste and low-value products to produce useful materials in reliable purities and compositions, at acceptable capital and operational cost.

SUMMARY OF THE INVENTION

The present invention generally relates to the processing of waste and low-value materials. More specifically, the present invention relates to methods of converting waste and low-value materials into useful products of reliable purities and compositions, at acceptable cost, without producing malodorous emissions, and at high energy efficiency.

In particular, the method of the invention comprises a process that converts various feedstocks otherwise having little commercial value or use, into useful materials such as gas, oil, specialty chemicals (such as fatty acids), fertilizer, and carbon solids. The invention further comprises an apparatus for performing a multi-stage process of converting waste materials into useful materials, and at least one oil product that arises from the process. The apparatus and process of the present invention are particularly applicable to processing organic and inorganic waste, offal from poultry (such as turkey, chicken, ostrich), cattle, pigs, fish, and other waste materials such as shredder residue, animal manures, grease, vegetable oil, and municipal sewage sludge, as well as tires and plastics.

In overview, a process according to the present invention subjects a suitably prepared feedstock to heat and pressure, separates out various components of the resulting feed, then further applies heat and pressure, to one or more of those components. Various materials that are produced at different points in the process of the present invention may be recycled and used to play other roles within the process of the present invention.

The present invention additionally includes an apparatus for converting a feedstock into at least one useful material, comprising: a preparation unit, including a slurrying device to create a feedstock slurry from the feedstock; a vessel communicating with the feedstock preparation unit to receive the feedstock slurry from the feedstock preparation unit, additional equipment such as a pump and a heat exchanger configured to pressurize and heat the slurry to produce a heated slurry; a Hydrolysis Stage reactor communicating with the vessel to receive the heated slurry, the Hydrolysis Stage reactor configured to subject the heated slurry to a first increased temperature and a first increased pressure to produce a reacted feed that comprises at least one reacted solid product, at least one reacted liquid product, and water; at least one separation unit communicating with the Hydrolysis Stage reactor to receive the at least one solid product, at least one liquid product, and water, the unit configured to separate out the at least one reacted solid product, the water, and the at least one reacted liquid product; and a Oil Finishing Stage reactor communicating with the separation unit to receive the at least one reacted liquid product, the Oil Finishing Stage reactor configured to subject the at least one reacted liquid product to a second increased temperature and, optionally, a second increased pressure, thereby converting the at least one reacted liquid product to at least one useful material.

The present invention further comprises a fuel oil manufactured by a process, wherein the process comprises: preparing a slurry from a carbon-containing feedstock; reacting the slurry in a Hydrolysis Stage to produce a reacted feed comprising at least one reacted solid product, at least one reacted liquid product, and water; separating said at least one reacted solid product, said water, and said at least one reacted liquid product from said reacted feed; converting said at least one reacted liquid product into the fuel oil in a second reaction.

The present invention also provides for an apparatus for converting an organic liquor into a mixture of hydrocarbons and carbon solids, comprising: a heater for heating the organic liquor, thereby producing a mixture of liquid and vaporized oil; a reactor for converting the mixture of liquid and vaporized oil into carbon solids, and a mixture of hydrocarbons and gases; a first cooler for accepting the carbon solids; and a second cooler for accepting the mixture of hydrocarbons and gases.

The present invention further includes an apparatus comprising: a heated vessel having an inlet and an outlet; a first heated auger having an inlet and an outlet, the inlet and outlet being configured and dimensioned to permit higher pressure to be applied in the first auger, the first auger inlet communicating with the vessel outlet; a fluid-solid separator communicating with the first auger outlet, the separator having a first outlet for liquids and gases and a second outlet for solids; and a second auger communicating with the solids, the second auger providing for cooling of the solids.

The present invention still further includes a process for converting an organic liquor into a mixture of hydrocarbons and carbon solids, comprising: heating the organic liquor, thereby producing a mixture of liquid and vaporized oil; converting the mixture of liquid and vaporized oil into carbon solids and a mixture of hydrocarbons and gases; and separating the carbon solids from the mixture of hydrocarbons and gases.

The present invention also provides process for producing a fuel from a feedstock, comprising: preparing a slurry from the feedstock; subjecting the slurry to a depolymerization process to form a composition comprising at least one inorganic material and a liquid mixture; separating said at least one inorganic material from the liquid mixture; and deriving a fuel from said liquid mixture.

The present invention further provides a process for producing a fertilizer from a feedstock, comprising: preparing a slurry from the feedstock; heating the slurry at a temperature sufficient to depolymerize said feedstock into a composition comprising at least one inorganic material and a liquid mixture; separating said at least one inorganic material from the liquid mixture; and deriving a fertilizer from said liquid mixture.

The present invention still further provides a process for producing a food from a feedstock, comprising: preparing a slurry from the feedstock; heating the slurry at a temperature sufficient to depolymerize said feedstock into a composition comprising at least one inorganic material and a liquid mixture; separating said at least one inorganic material from the liquid mixture; and deriving a food from said liquid mixture.

The invention also provides a process of converting shredder residue into oil, comprising: dissolving the shredder residue in a solvent; preparing a slurry from the shredder residue; reacting the slurry with water in a Hydrolysis Stage to produce a reacted feed comprising at least one reacted solid, product, at least one reacted liquid product; separating said at least one reacted solid product, said water, and said at least one reacted liquid product from said reacted feed; converting said at least one reacted liquid product into oil in a second reaction.

BRIEF DESCRIPTION OF THE DRAWINGS

The patent or application file contains at least one or more drawings executed in color. Copies of this patent or patent application publication with color drawings will be provided by the Office upon request and payment of the necessary fee.

DETAILED DESCRIPTION

Figure 1:
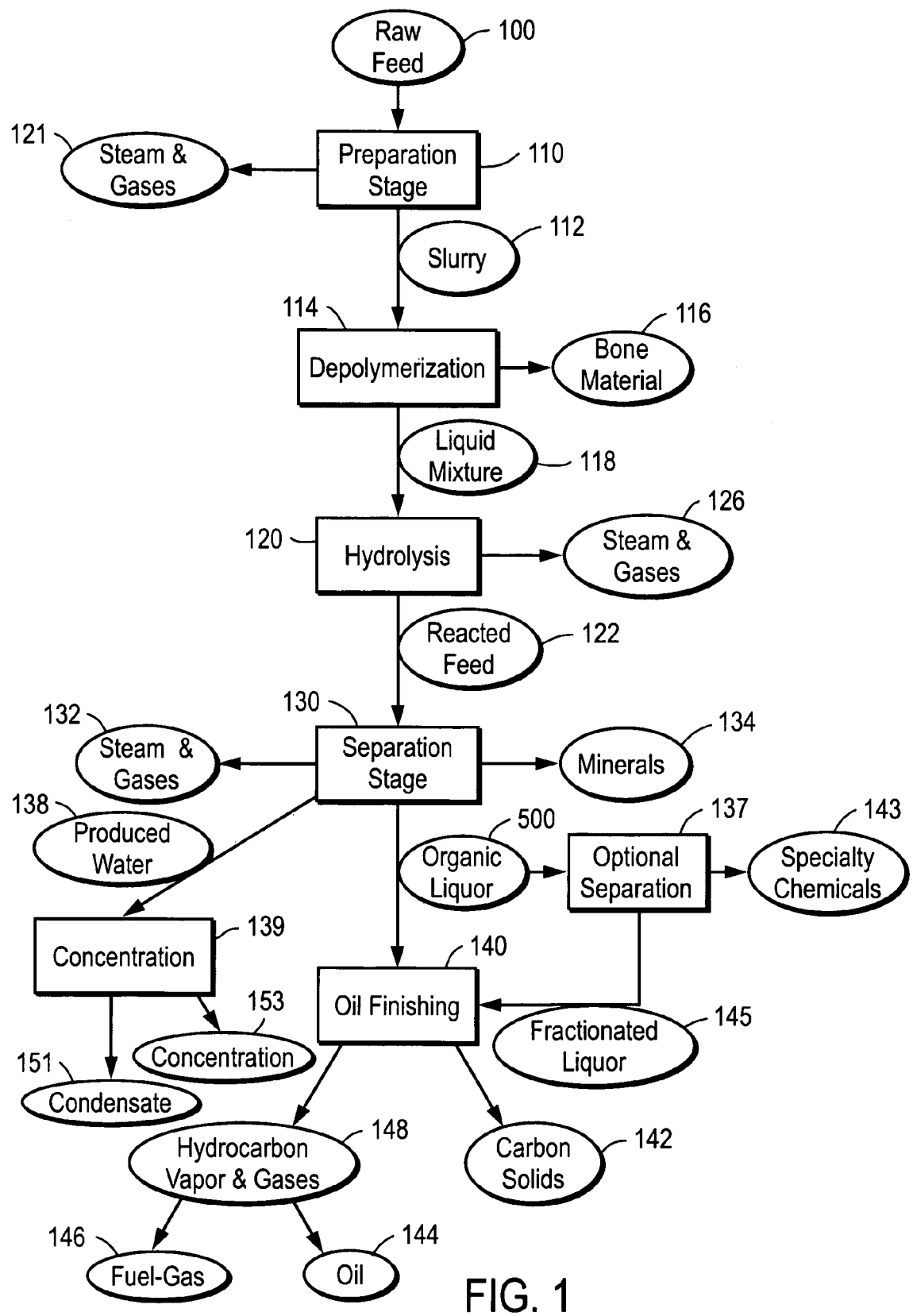
FIG. 1 shows a flow-chart of an overall process according to the present invention.

The process of the present invention is directed to producing one or more useful materials from low-value or waste materials generated by society at large, either from ordinary domestic practices, or from commercial operations. Typically the process of the present invention is applied to waste materials, or other low-value products, for example grease, that contain a substantial proportion of organic materials. However, the present invention may be applied to convert other products, not normally considered low-value, to higher-value products.

Organic materials are those commonly understood by one of ordinary skill in the art. In particular, for use with the present invention, organic materials are those materials whose constituent elements include carbon in combination with one or more other elements such as hydrogen, oxygen, nitrogen, sulfur, and phosphorous, and the halogen elements, in particular fluorine, chlorine, bromine, and iodine. For the purposes of the present invention, organic materials also include compounds that contain carbon in combination with elements such as arsenic, selenium, and silicon, as well as salts of organic molecules, and complexes of organic molecules with metals such as, but not limited to, magnesium, mercury, iron, zinc, chromium, copper, lead, aluminum, and tin. Many organic materials used with the present invention come from biological sources and comprise proteins, lipids, starches, nucleic acids, carbohydrates, cellulose, lignin, and chitin, as well as whole cells. Other organic materials for use with the present invention, have man-made, or synthetic origin, such as plastics, and other petroleum-derived products.

In the process of the present invention, heat and pressure are applied to a feedstock at levels capable of breaking the feedstock's long molecular chains. Thus, feedstock material is broken down at the molecular level to one or more constituent materials. In the process, the feedstock is transformed from a cost or low value to a profit, or significant cost reduction, or higher value. Importantly, the process is also able to destroy pathogens that may be present in the feed stock.

The basic process of the present invention is designed to handle potentially any waste or low-value product, including: by-products of food manufacture and distribution such as turkey offal, fryer oils, corn stalks, rice hulls, waste scraps, last-press edible oils such as canola, soybean, palm, coconut, rape seed, cotton seed, corn, or olive oil, and other oils, food processing wastes, and seafood industry wastes; by-products of paper and other wood industry manufacturing, such as cellulose and lignin by-products, and paper-pulp effluent; yard waste such as leaves and grass clippings; tires; shredder residue; plastic bottles; harbor-dredged sediments; post-consumer plastics and electronics, such as old computers; municipal solid waste; oil-refinery residues; industrial sludges; bagasse; seaweed; milling waste; black liquor; coal refinery wastes; tar sands; shale oil; drilling mud; cotton waste; agricultural processing wastes such as animal manures; infectious medical waste; biological pathogens; and even materials such as anthrax spores that could be used to make biological weapons. It is to be understood that the foregoing list of materials is not an exhaustive list. In the foregoing list, bagasse is a byproduct from processing of sugar cane, and black liquor is a byproduct of chemical wood-pulping that results from dissolving wood chips, liberating the lignin, and freeing the fibers to give rise to a lignin and hemi cellulose solution.

Waste materials for use with the present invention are typically byproducts or end-products of other industrial processes, commercial preparations, and domestic or municipal uses, that typically have no other immediate use and/or which are ordinarily disposed of. Low-value products may similarly be byproducts or end-products of other industrial processes, commercial preparations, and domestic or municipal uses, but are typically materials that have very low re-sale value and/or which require some further processing to be converted into something of use.

When used with the process of the present invention, waste and low-value products are typically referred to as feedstocks or as raw feed. It is also to be understood that the raw feed used with the process of the present invention can comprise waste and/or low-value products from a number of sources, and of a number of different types. For example, food-processing wastes could be combined with agricultural processing wastes, if convenient, and processed simultaneously.

Still other exemplary raw feed materials for use with the present invention include municipal sewage sludge, mixed plastics (including polyvinylchloride ("PVC")) as might be obtained from a municipal recycling depot, and tires.

Polyvinyl chloride (PVC) is found in vinyl siding and plastic plumbing pipes. PVC contains about 55% by weight chlorine and thus has a propensity to give rise to harmful chlorine-containing compounds when degraded. For example, combusting PVC produces dioxins, which are some of the most toxic compounds known. One benefit of using water early in the process of the present invention is that the hydrogen ions in water combine with chloride ions from the PVC to yield solubilized products such as hydrochloric acid, a relatively benign and industrially valuable chemical which is useful for cleaners and solvents.

Tires are typically obtained from vehicles such as automobiles, buses, trucks, aircraft, and other mass-transit craft, as well as military and other commercial vehicles. When applying the process of the present invention to tires, a portion of the produced oil is preferably recycled to the inlet to assist dissolving the tires in the incoming feedstock.

Shredder residue (SR) is the material remaining after ferrous metals have been recovered from shredded or dismantled vehicles, white goods, consumer goods, etc. Without the benefit of the present invention, such materials typically go to landfill. Examples of "white goods" include washers, dryers, refrigerators, dishwashers, stoves, air conditioners, water heaters; the term as used herein also encompasses any appliances that can be salvaged for its metal content. The components and elemental composition of two SR samples, as determined by sample analysis, are shown below.

Sample 1

|  | Percentage by weight |  | mg/kg |
|---|---|---|---|
| Moisture | 4.4 | Arsenic (total) | 32 |
| Plastics | 22.8 | Barium | 550 |
| Foams | 11.2 | Cadmium (total) | 17 |
| Rubber & Elastomers | 23.3 | Chromium | 110 |
|  |  | Copper | 6000 |
| Clothes & Fabrics | 5.8 | Lead | 920 |
| Wood | 2.9 | Mercury | 1.4 |
| Fines | 22.0 | Selenium | ND |
| Miscellaneous | 3.9 | Silver | ND |
| Rocks | 1.5 | Zinc | 5600 |
| Metals & Wires | 6.9 |  |  |

Sample 2

|  | Percentage by weight |  | mg/kg |
|---|---|---|---|
| Moisture | 10 | Arsenic (total) | 1.87 |
| Plastics | 28.4 | Barium | 99 |
| Foams | 6.9 | Cadmium (total) | 11.67 |
| Rubber & Elastomers | 32.3 | Chromium | 40 |
|  |  | Copper | 1140 |
| Clothes & Fabrics | 10.6 | Lead | 556.67 |
| Wires | 7.6 | Mercury | 10.40 |
| Fines | 3.8 | Selenium | ND |

-continued

| | Percentage by weight | | mg/kg |
|---|---|---|---|
| Miscellaneous | 10.4 | Silver | 0.85 |
| Rocks | 0 | Zinc | 3400 |
| Metals | 0 | | |

Figure 14:
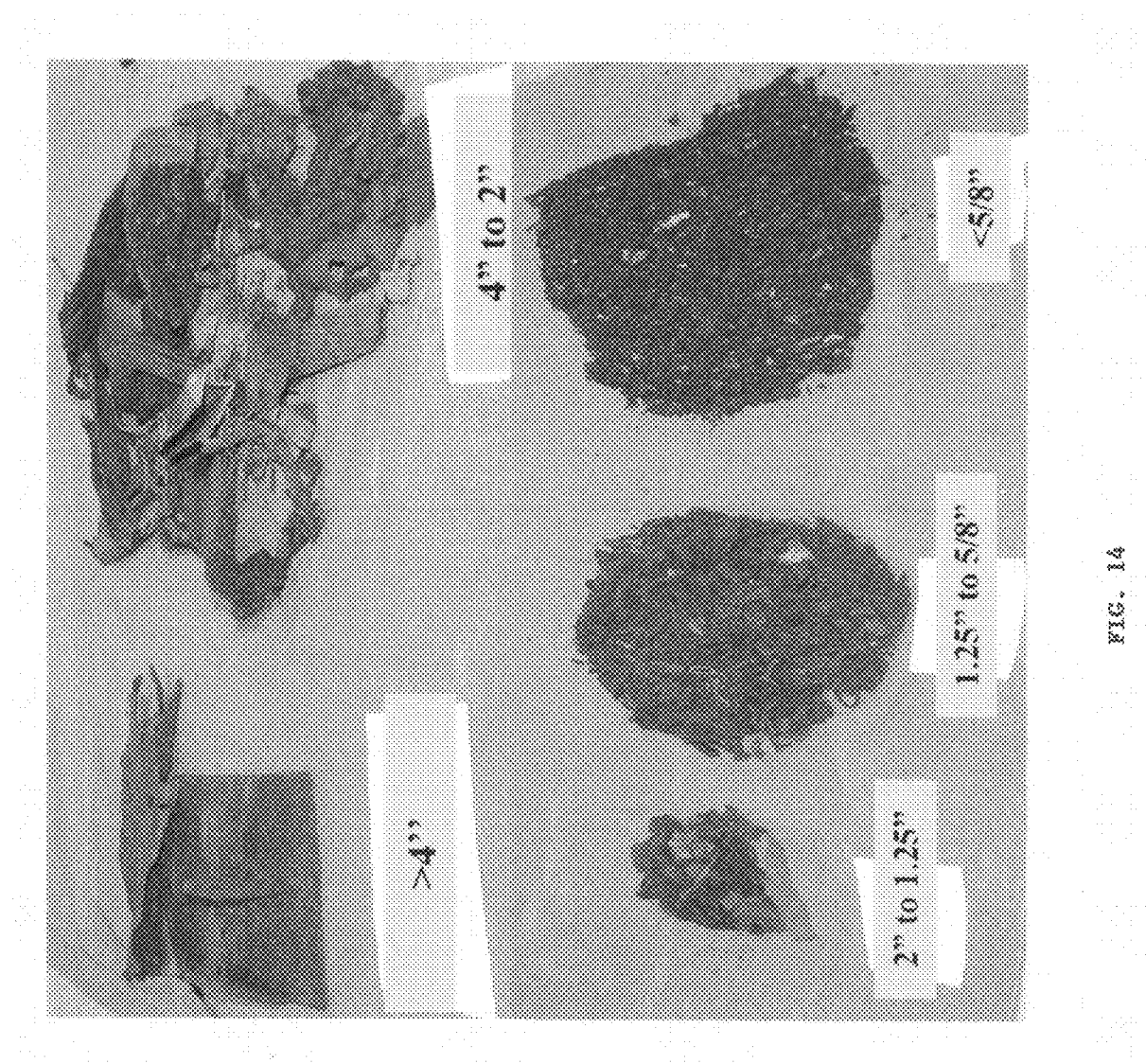
FIG. 14 depicts shredder residue fractions of various sizes.
Figure 15:
FIG. 15 depicts depolymerization products of a process according to the present invention as applied to shredder residue.
Figure 16:
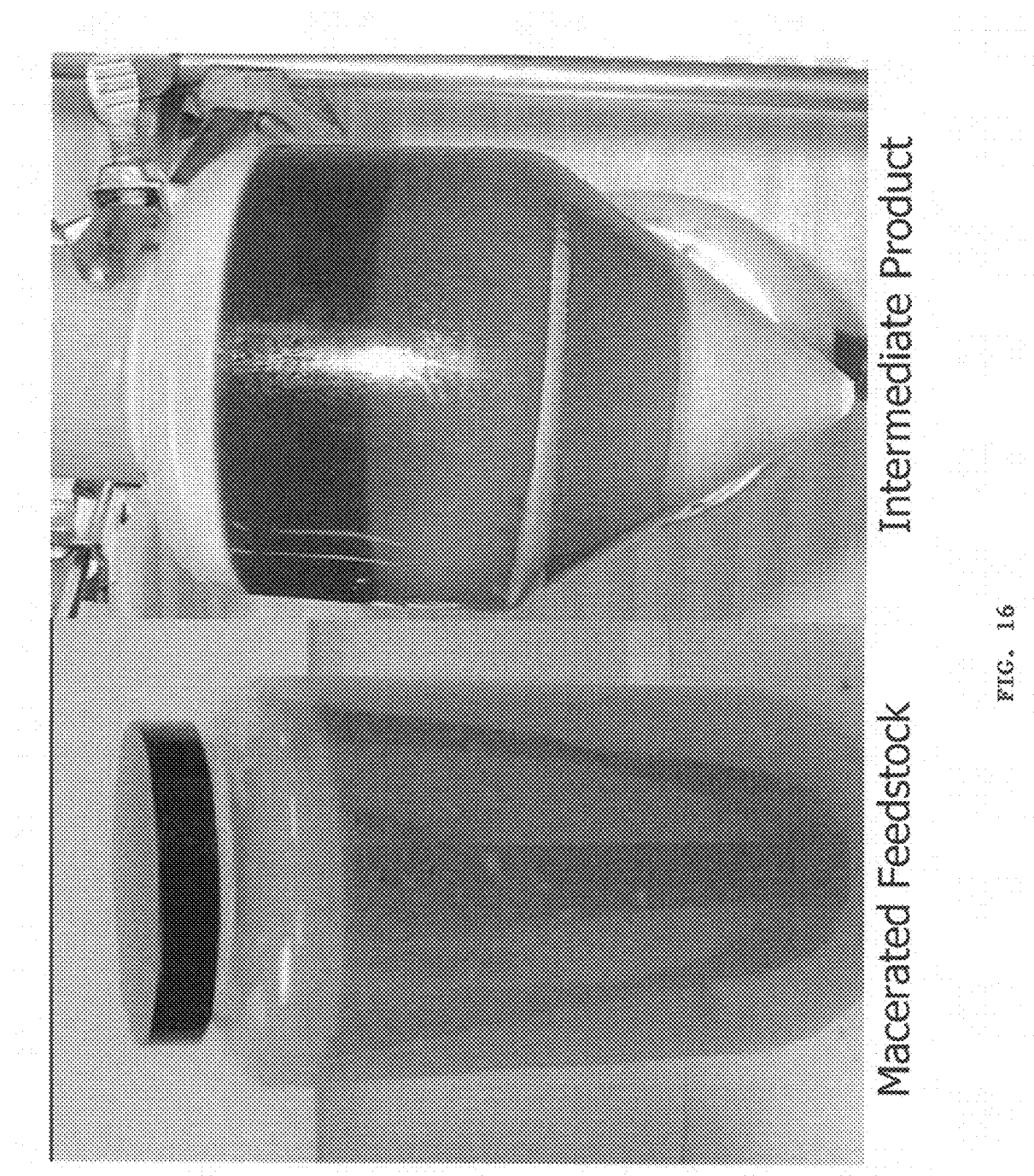
FIG. 16 depicts intermediate products of a process according to the present invention.
Figure 17:
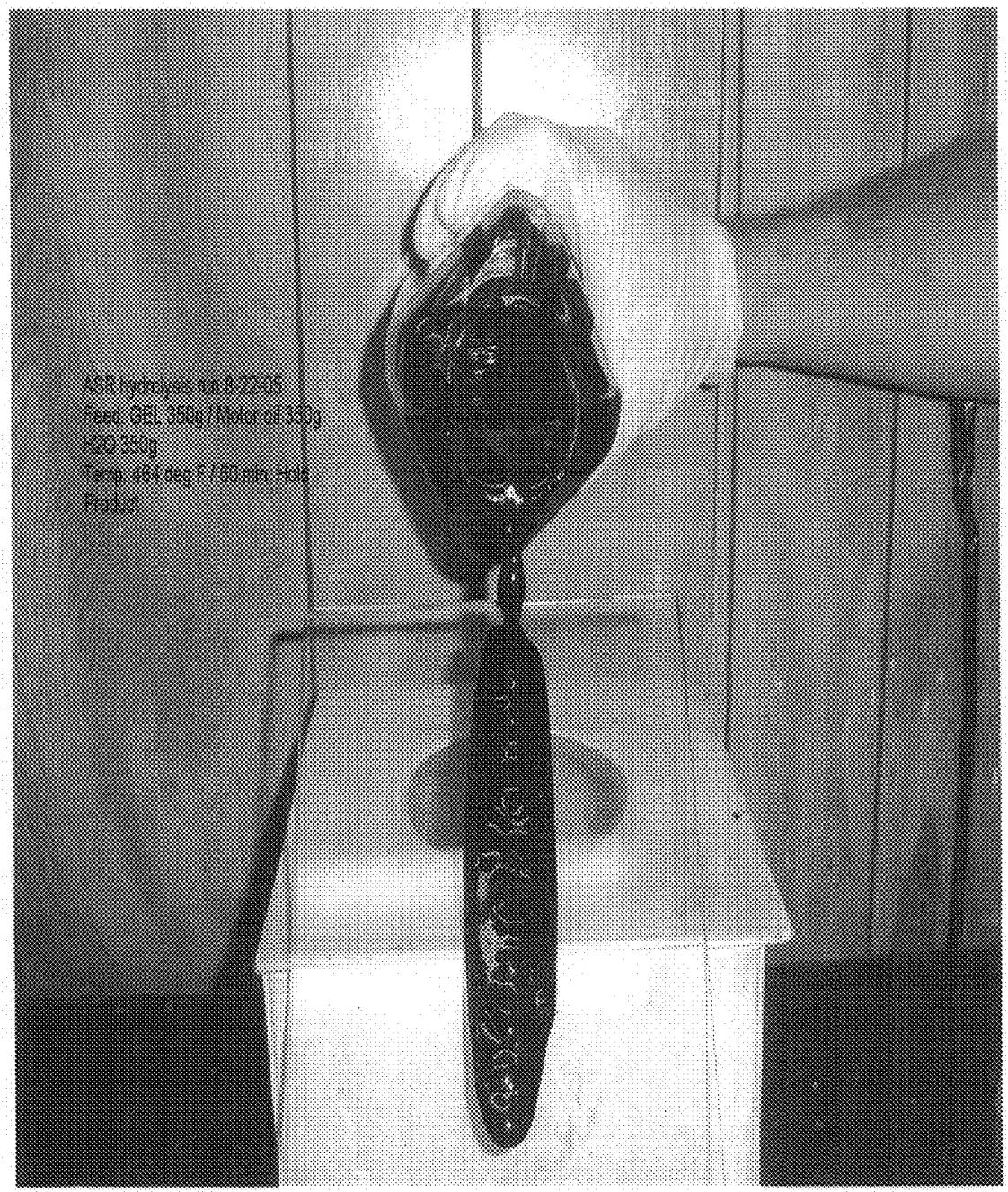
FIG. 17 depicts a hydrolyzed intermediate oil produced using shredder residue as raw feedstock.
Figure 18:
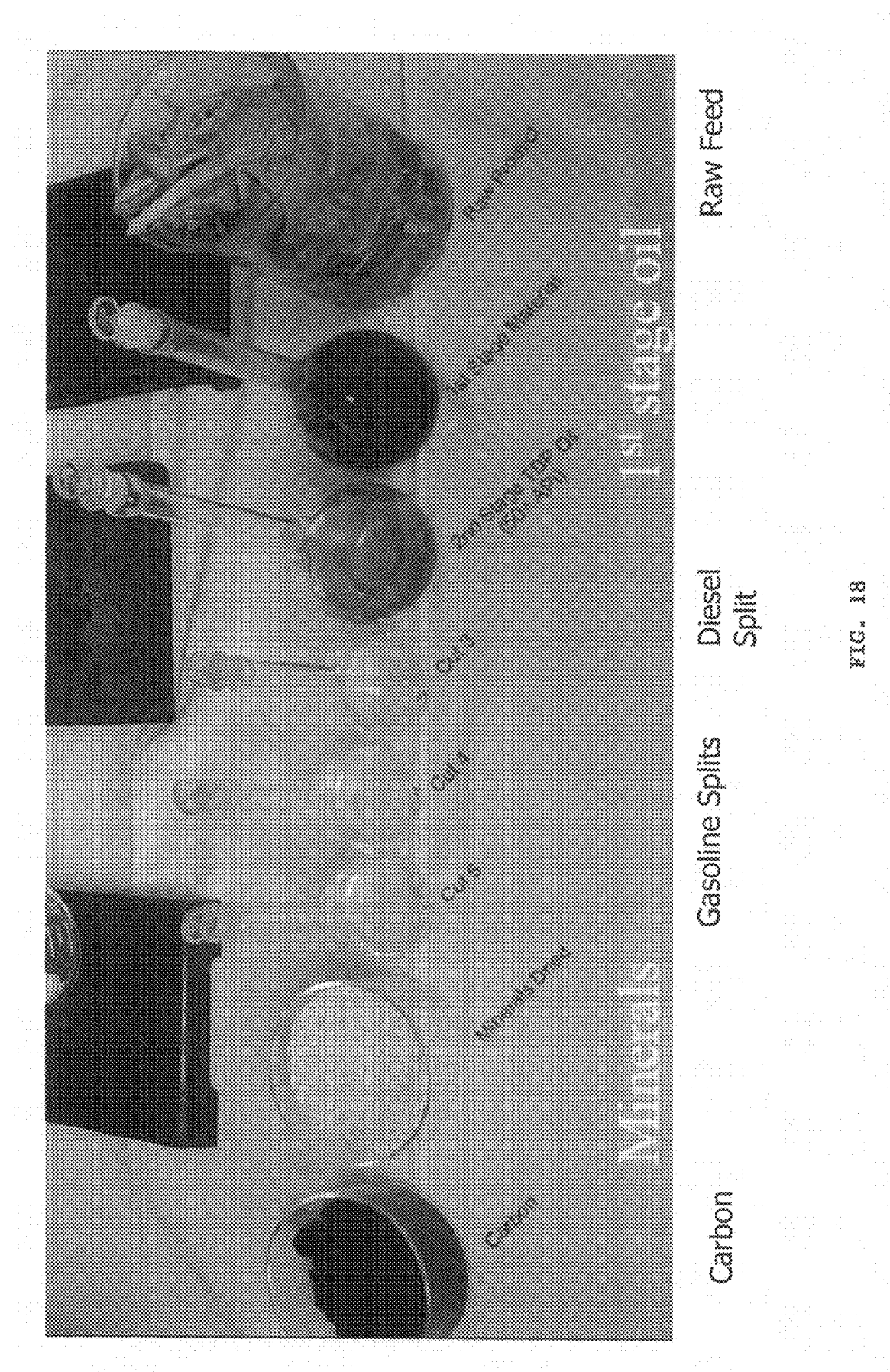
FIG. 18 depicts various starting materials, intermediate, and final products of a process of the present invention.
Figure 19:
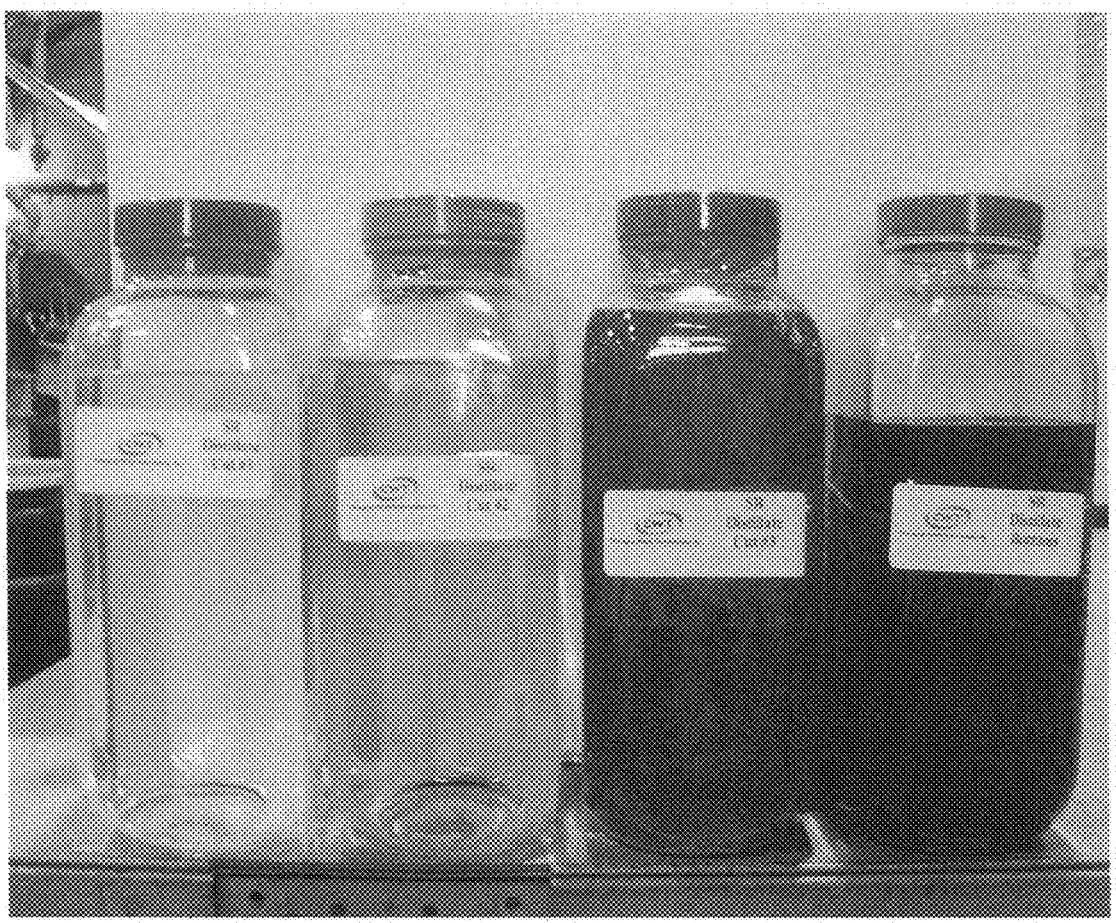
FIG. 19 depicts some exemplary distilled cracked oil products that can be produced using the process of the present invention.
Figure 20:
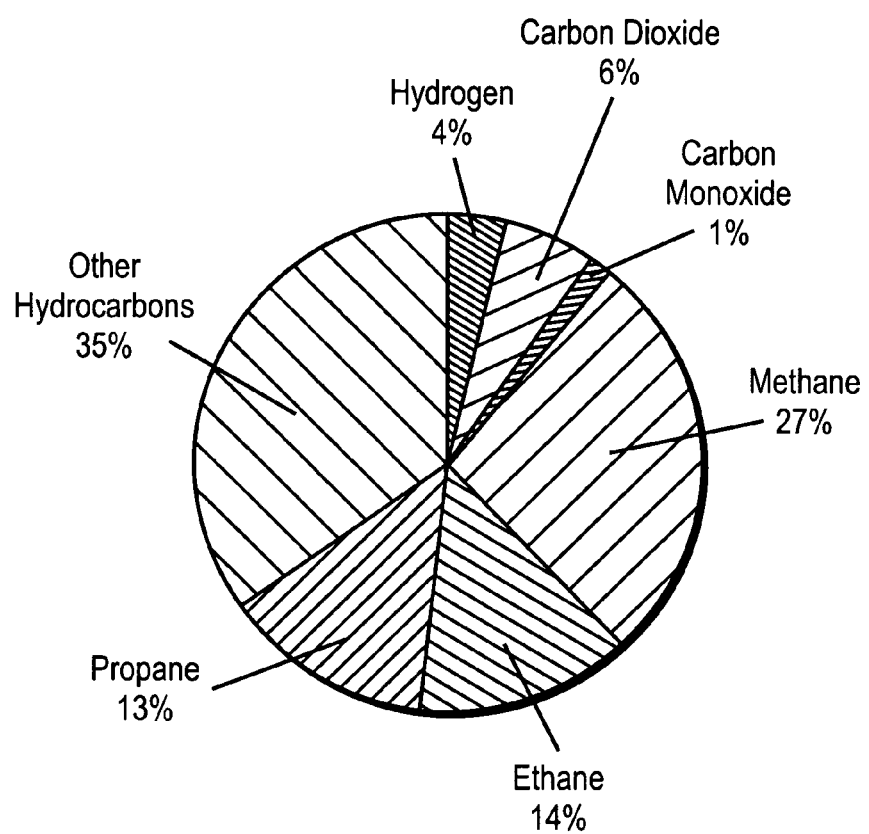
FIG. 20 shows a breakdown of various chemicals found in cracking fuel-gas from a process of the present invention as applied to shredder residue.
Figure 21:
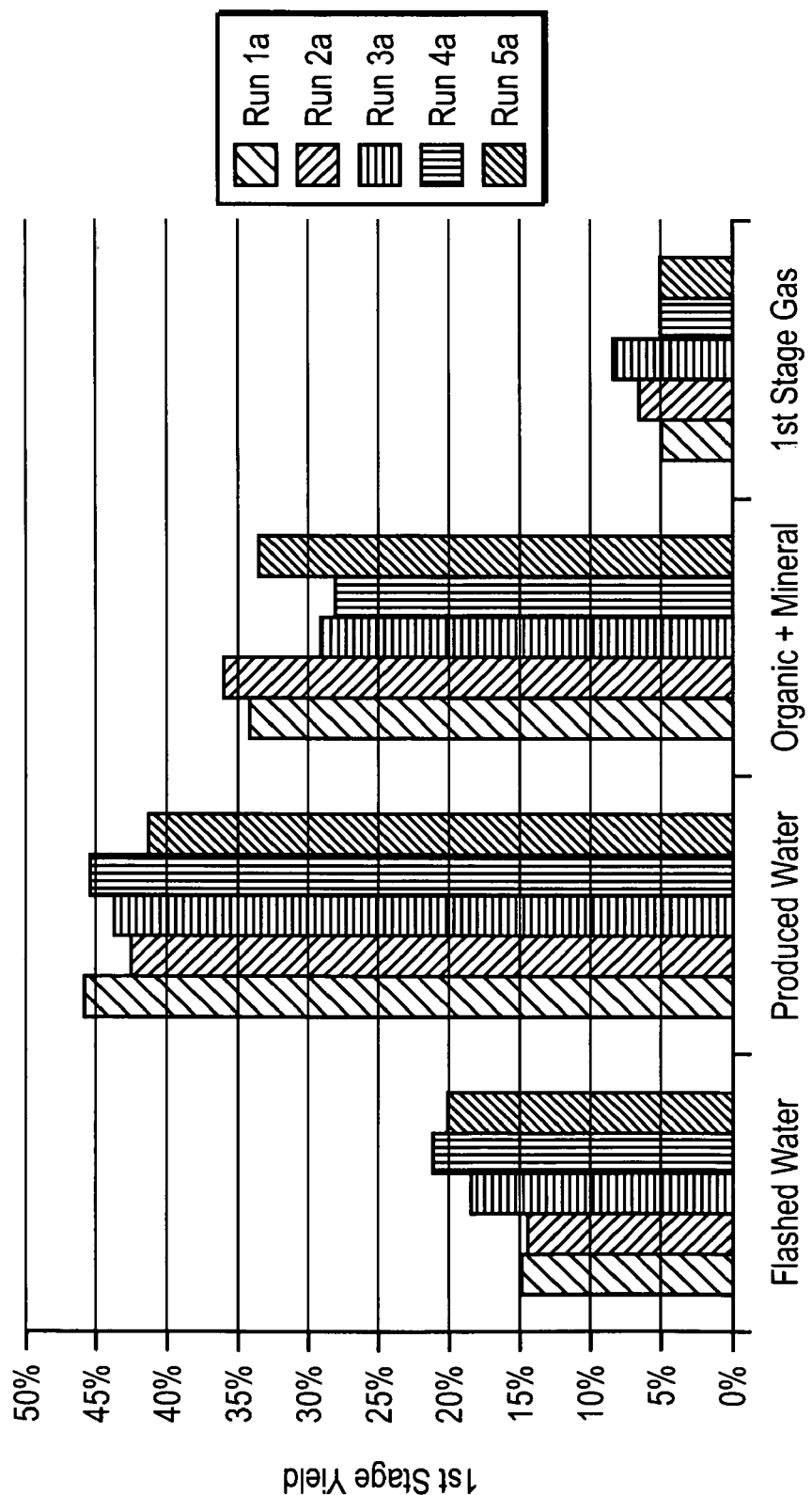
FIG. 21 is a graph showing run-to-run yield consistency of a process of the present invention based on the Hydrolysis Stage yields for five runs.
Figure 22:
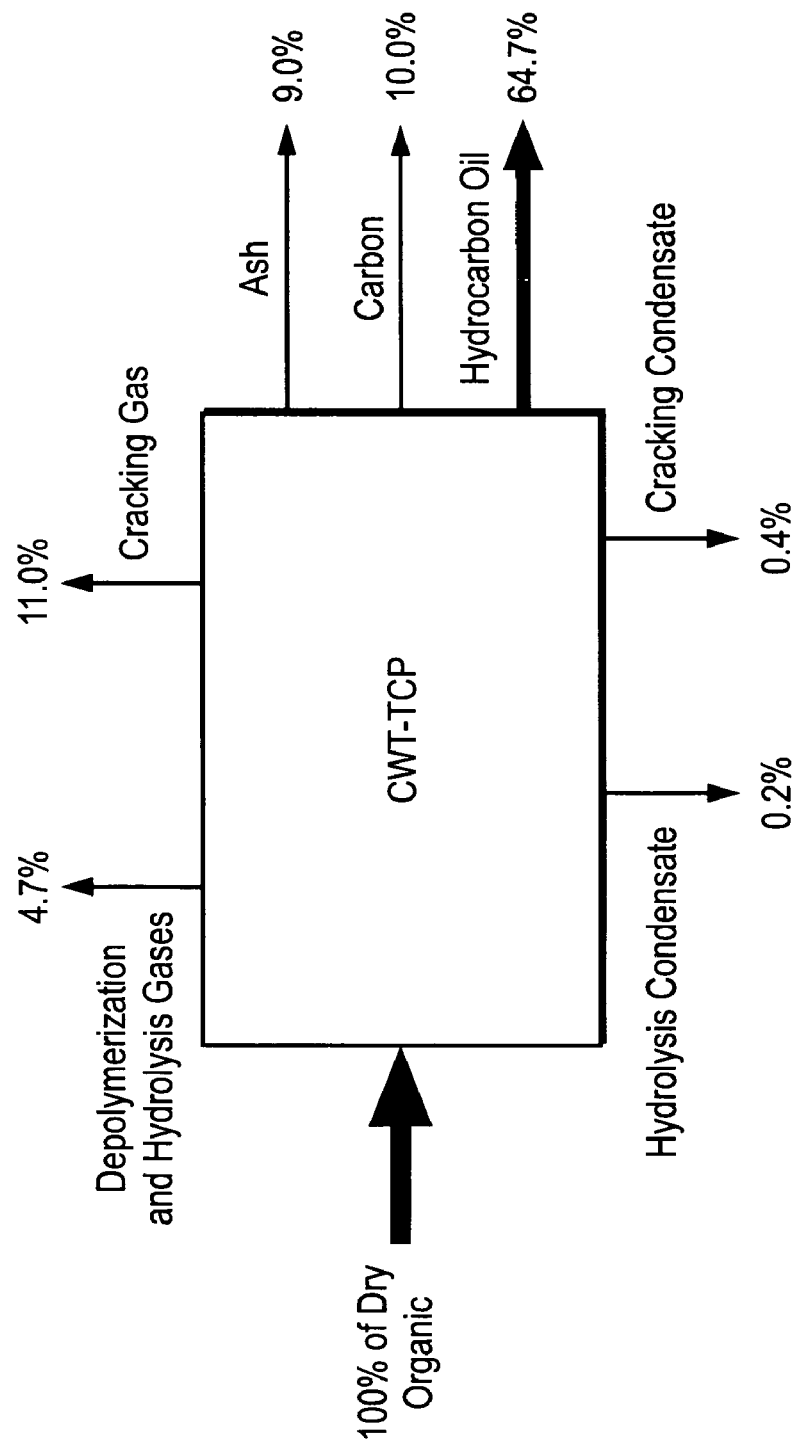
FIG. 22 is a diagram tracing the conversion of dry organic into various materials and gases through the depolymerization, hydrolysis, and oil finishing steps of the process according to the present invention.
Figure 23:
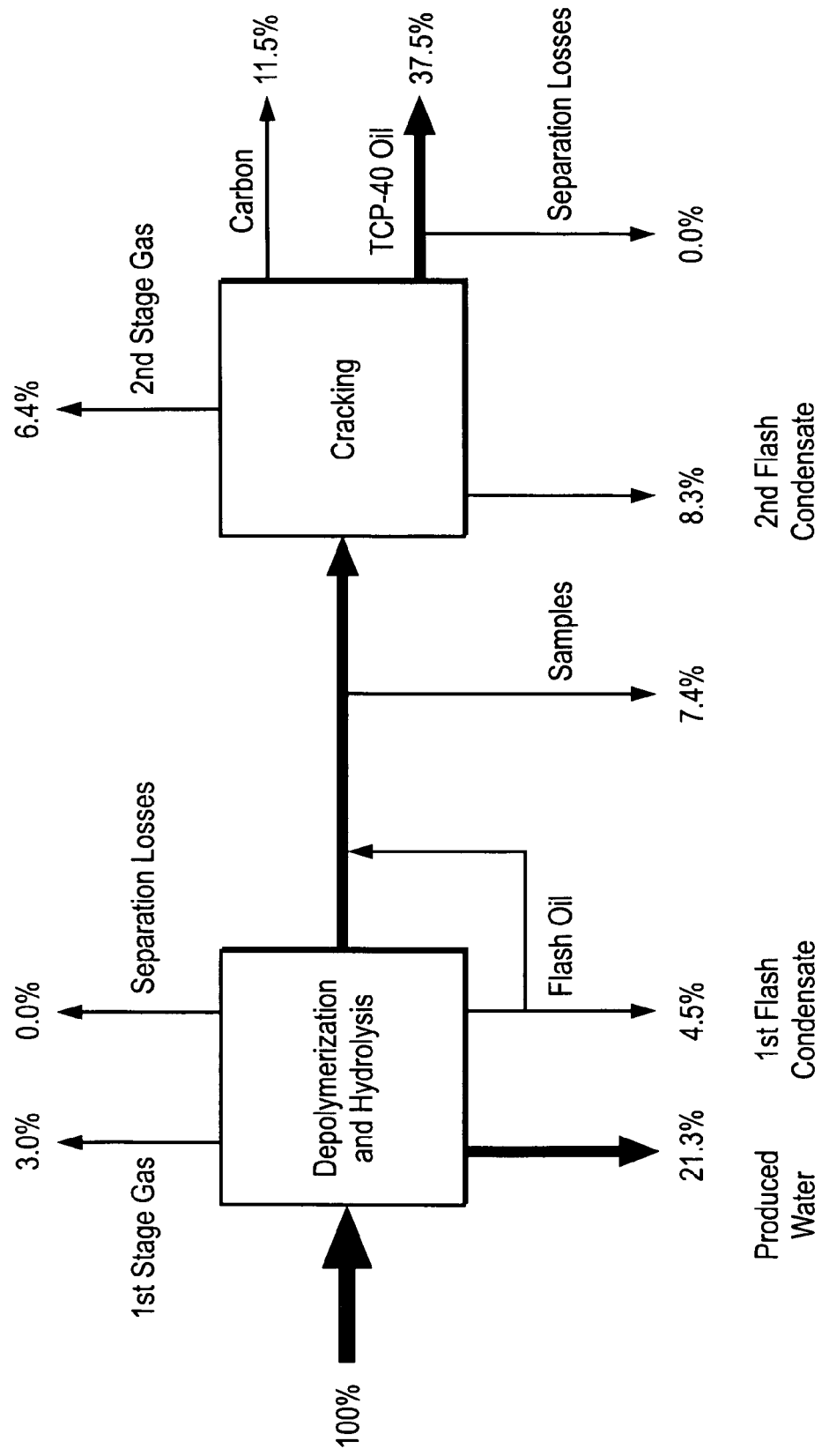
FIG. 23 is a diagram of the material balance for a process of the present invention as applied to shredder residue.

The above data is provided solely to illustrate the types of materials that may be found in a given SR sample and not to be construed as limiting the applications for the present invention. Depending on its origin, the composition of shredder residue material can vary from sample to sample. For example, SR can comprise fragments of plastics, rubber, glass, fabrics, paints, wood, foams, fines, elastomers, residual metals, etc. of different sizes as shown in FIG. 14. SR of old television sets and refrigerators, for instance, is likely to contain heavy metals or polychlorinated biphenyls (PCBs), a hazardous mixture of chlorinated compounds. Other toxic components potentially found in SR include polybrominated diphenyl ethers (PBDEs), which are commonly used as flame retardants and chemically similar to PCBs, and phthalates, which are found in PVC, an important component in automobile manufacturing.

The process of the present invention can handle and process a feedstock of mixed low-value waste materials without the need for presorting the material into pure streams. Additionally, the process of the invention can hydrolyze the oxygen-chlorine bonds in PVC and transfer metals and halides into the water. As with the hydrolysis of PVC, hydrogen ions in water combine with halide ions, e.g. Br and Cl, to produce relatively benign chemicals of use. Toxic chemicals, e.g. PCBs, PBDEs, that would otherwise leach out from SR are destroyed in the process, producing oil that is free from such contaminants and other debris. Characteristics of two batches of cracked oil products of SR are provided in the tables below. Another advantage of the present invention is its ability to handle and effectively process materials of heterogeneous size and composition. The need for particle sizing/reduction is obviated by the depolymerization step of the process, the mechanism of which will be evident from the following disclosure.

Figure 10:
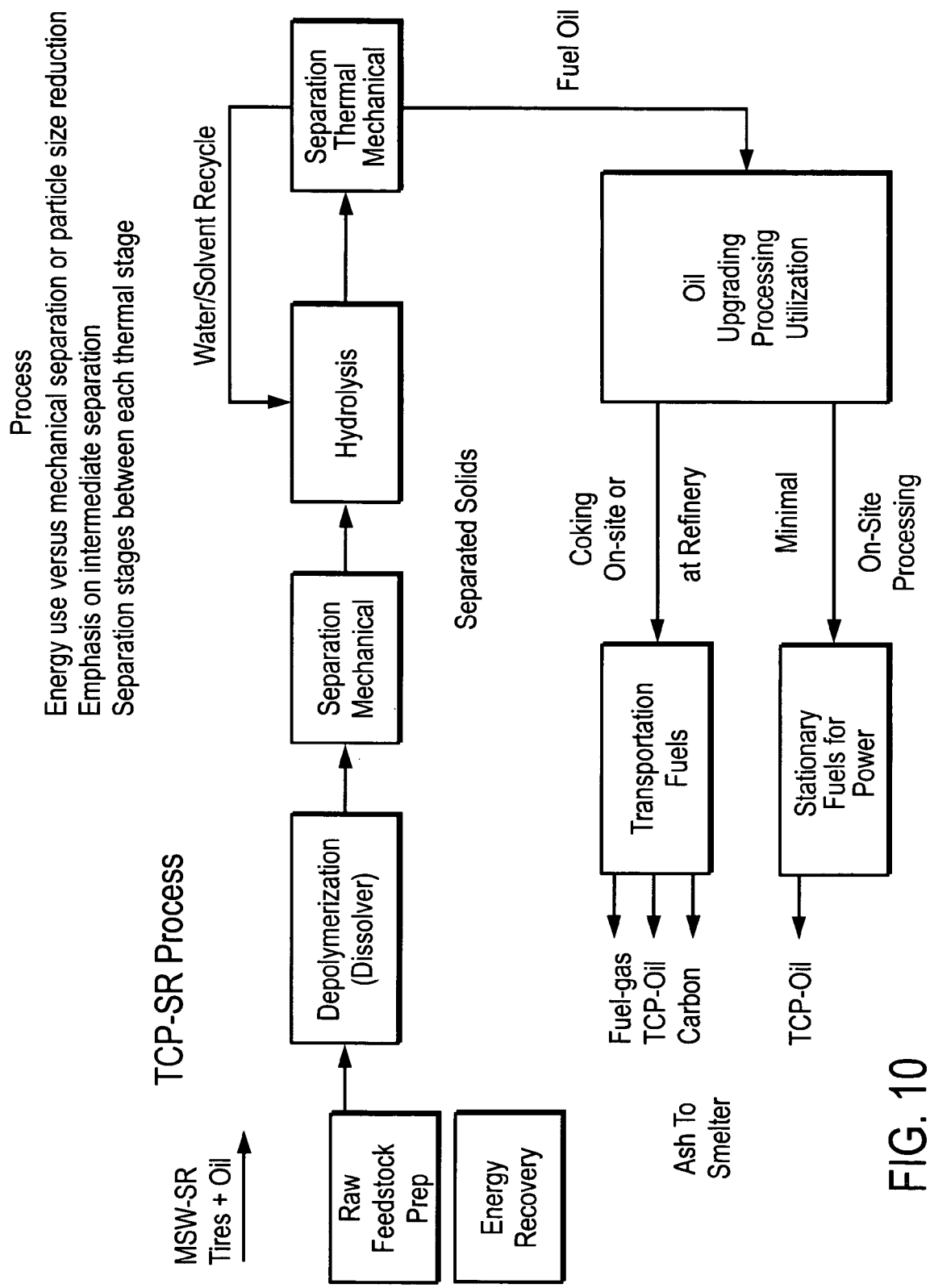
FIG. 10 shows a flow-chart of a process of the present invention, as applied to conversion of shredder residue.
Figure 11:
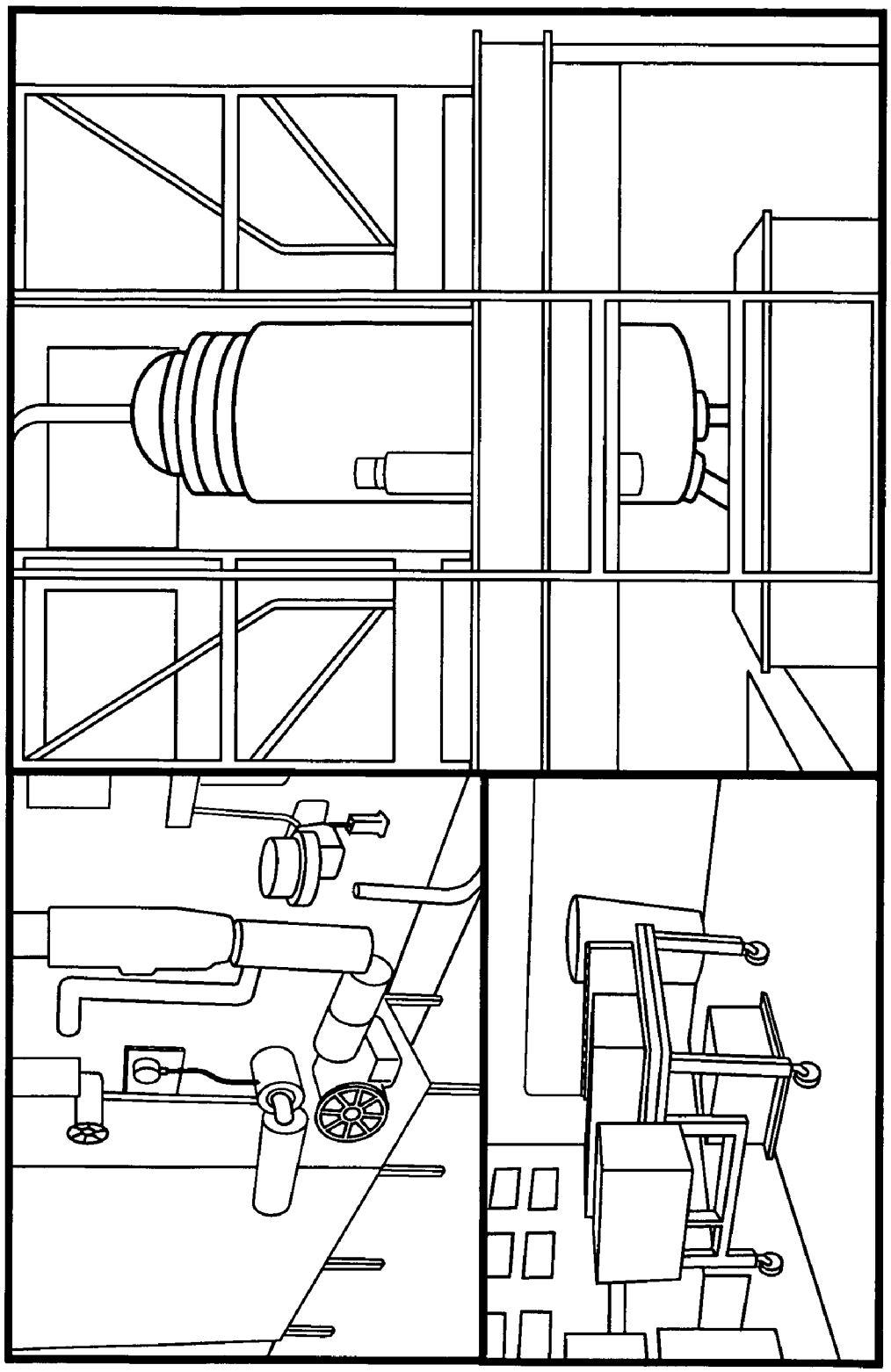
FIG. 11 depicts an embodiment of a depolymerization reactor and separation unit.

When applying the process of the present invention to SR, a portion of the produced oil is preferably recycled to the inlet to assist dissolving the SR in the incoming feedstock. A schematic of the process as applied to SR is depicted in FIG. 10. The raw feedstock is subjected to a preparation step 110, a depolymerization or "melting step," followed by mechanical separation, whereby solids are removed from the mixture. Depolymerization reduces the organic in the solid SR to a liquid, thereby enabling the separation of metal objects and other solid organics as well as improved contact of the organic with water in the subsequent hydrolysis step. In preferred embodiments of the invention, the depolymerization occurs at temperatures in the range of about 690° F. to about 785° F., more preferably in the range of about 700° F. to about 775° F., most preferably in the range of about 720° F. to about 750° F.

The resulting mixture is then subjected to a hydrolysis step equivalent to the Hydrolysis Stage 120 described herein. Hydrolysis of chlorinated and/or brominated organics in the mixture breaks the carbon-halide bond and transfers the halide to the water phase, effectively destroying compounds such as PCBs. Hydrolysis also allows transfer of metal ions to the water phase, making the resulting oil essentially free of contamination. In preferred embodiments of the invention, the hydrolysis occurs at temperatures in the range of about 430° F. to about 510° F., more preferably in the range of about 440° F. to about 500° F., most preferably in the range of about 450° F. to about 480° F.

The reacted feed produced then undergoes a thermal and mechanical separation step. In a process similar to delayed coking, the hydrolysis oil is heated to approximately 500° C. The heat transfer to oil is rapid and isothermal and only "dry" organic oil is heated to the final temperature. The fuel oil or organic liquor 500 obtained therefrom is fed to a Oil Finishing Stage for finishing. Fuel-gas 146, carbon solids 142, or oil 144 can be produced by coking the organic liquor either on-site or at a refinery. Alternatively, a hydrocarbon oil with similar constitutents as a #4 diesel oil can be produced with minimal on-site processing.

Characteristics of two different batches of cracked oil products of the process as applied to SR are provided below.

| Batch 1 | |
|---|---|
| | Distillate |
| API at 60° F. | 40.7 |
| Distillation, ° F. | |
| IBP | 119 |
| 10% | 234 |
| 50% | 451 |
| 90% | 652 |
| FBP | 691 |
| Sulfur wt % | 0.124 |
| Ash wt % | 0.003 |
| Nitrogen % | <0.1 |
| BTU/lb | 18,622 |
| BTU/Gal | 127,409 |

| Batch 2 | |
|---|---|
| | Distillate |
| API at 60° F. | 48.7 |
| Distillation, ° F. | |
| IBP | 96 |
| 10% | 206 |
| 50% | 396 |
| 90% | 643 |
| FBP | 652 |
| Sulfur wt % | 0.0625 |
| Ash wt % | <0.001 |
| Pour point, ° C./° F. | −36/−33 |
| Water & sediment | 0.2% |
| Cetane index | 52.2 |

Figure 24:
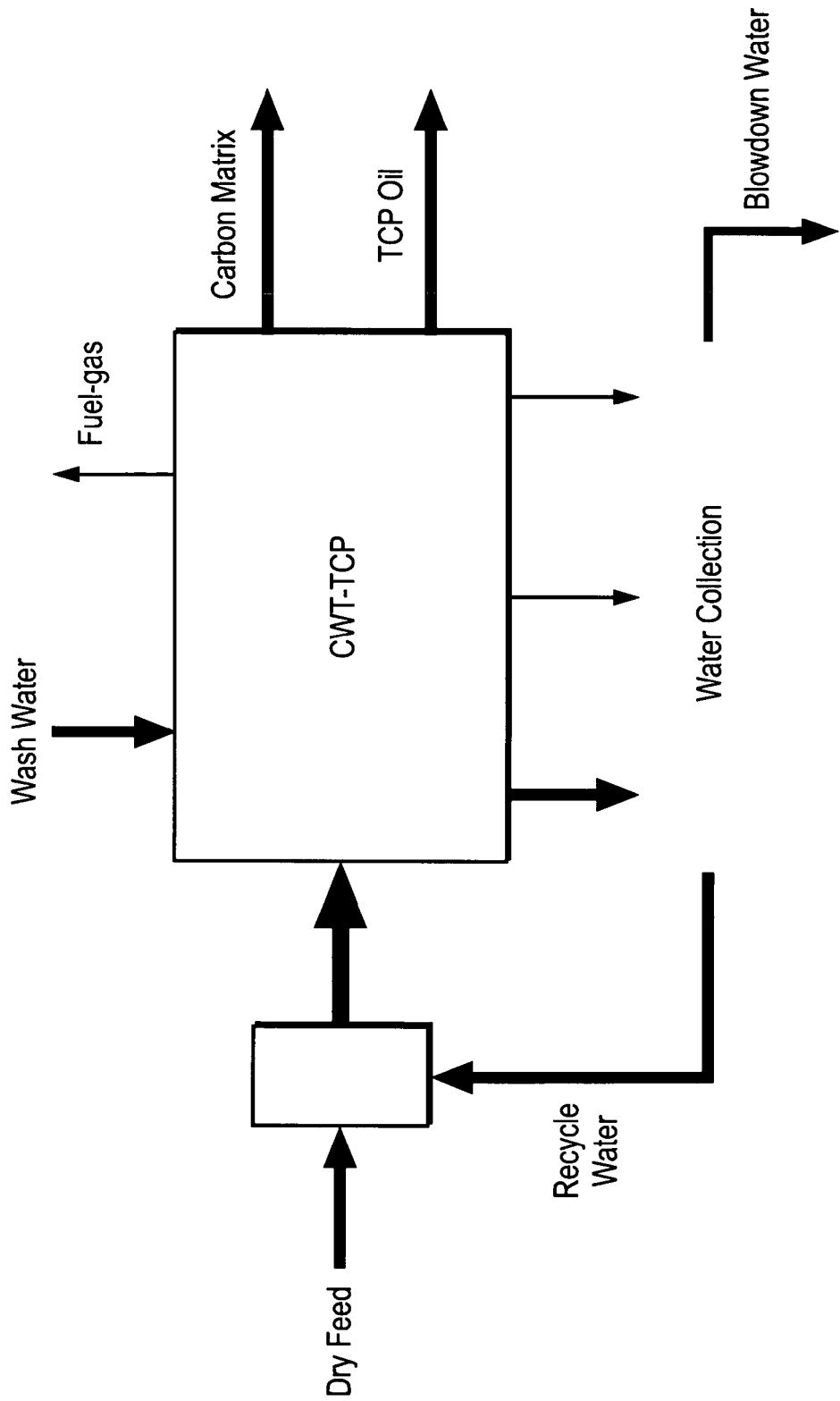
FIG. 24 outlines how water is used and recycled in a process of the present invention.
Figure 25:
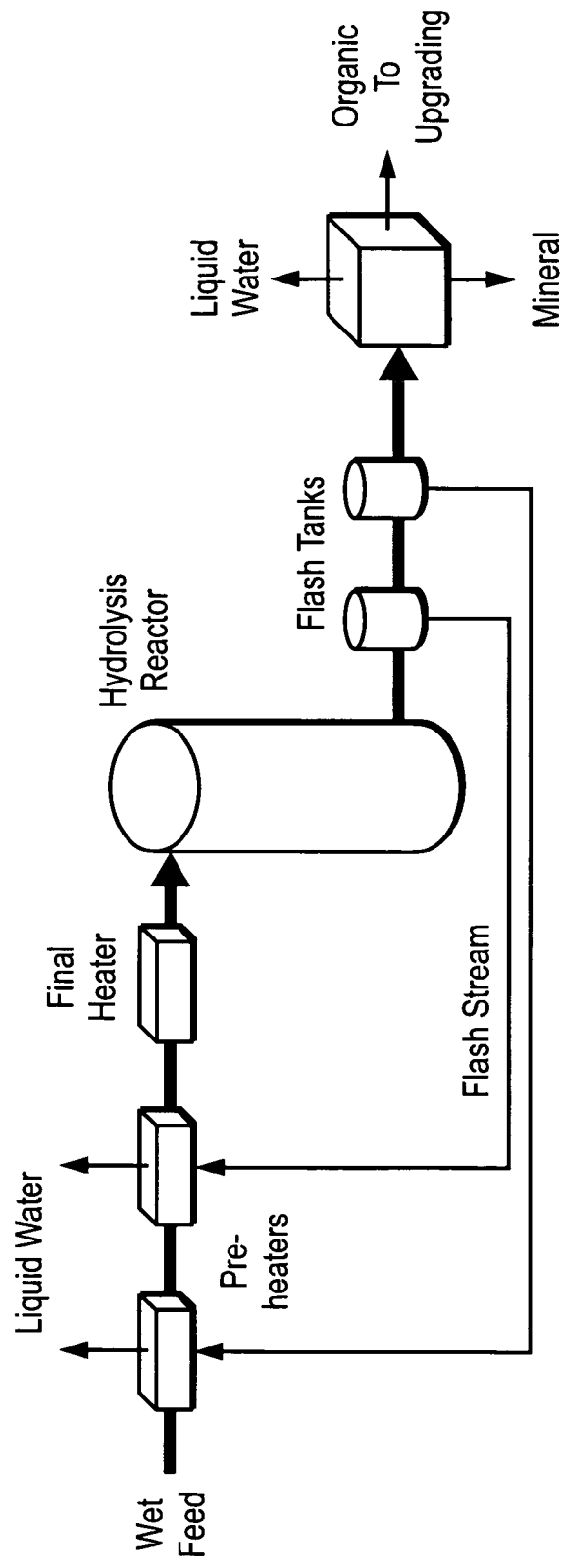
FIG. 25 diagrams the movement of water in an apparatus designed according to the present invention.

High energy efficiency is achieved in the process of the present invention through countercurrent heat exchange. The bulk of the energy is used to heat liquid water; water flashed in hydrolysis generates steam, which is separated out and diverted to pre-heat incoming feed. As illustrated by the schematics in FIG. 24 and FIG. 25, water flashed during the hydrolysis step is thus recycled. Given the varying chemical composition of the raw feed, energy efficiency can vary from run to run. However, using tests conducted with multiple runs, the energy efficiency of the process was determined to be about 91% as detailed in the following table. A temperature of 900° F. was selected for these runs since it is much more than adequate for the process and demonstrates that high energy efficiency can be achieved even when the mix is heated to extremely high temperatures.

| Energy Efficiency of Process as Applied to SR |
|---|
| Organic heating value: ~15,000 Btu/lb |
| 50:50 mix with water has Cp ~ 0.75 Btu/lb |
| Heat to 900° F.: 675 Btu/lb of mix (1.30 Btu/lb oil) |
| Efficiency = 100% − (1,350/15,000) = 91% |

Additionally, the apparatus of the present invention can be constructed using commercially available parts. Initial raw material handling can be done using live bottom bins, conventional augured conveyors, and/or bucket elevators under ambient conditions. Vibratory screens may be used for fines scalping to remove loose dirt and debris if desired. The powerful depolymerization step also eliminates any need for additional particle sizing of raw feed. As will be evident from the following disclosure, temperatures and pressure commonly used in current commercial applications, e.g. 750° F., 150 psig, are more than adequate for depolymerizing the raw feed. Depolymerization reactor designs can therefore be implemented using simple existing technologies, e.g. batch or flow through jacketed reactors, as relatively low pressures are being utilized in the current process. Readily accessible devices such as vibratory screens, single and double screw presses, and off-the-shelf centrifugal machines can also be used to effectuate depolymerization separation. Likewise, post hydrolysis processing can be performed using commercially available devices and processes, such as vapor recompression/distillation, calcining, fluidized bed systems, and desalting and centrifugal separation units.

Waste and low-value materials processed by embodiments of the present invention are generally converted into three types of useful materials, all of which are both valuable and are not intrinsically harmful to the environment: high-quality oil; clean-burning gases; and purified solids including minerals, and carbon solids that can be used as fuels, fertilizers or raw materials for manufacturing. Additionally, various sidestreams are produced during the process of the present invention, including in some instances to concentrates similar to "fish solubles." Typically, useful materials are considered to be those that have a higher economic value than the waste, low-value or other materials that served as the feedstock. Such useful materials may have, for example, higher calorific content, or may have a wider range of applications than the feedstock from which they were derived.

Figure 2:
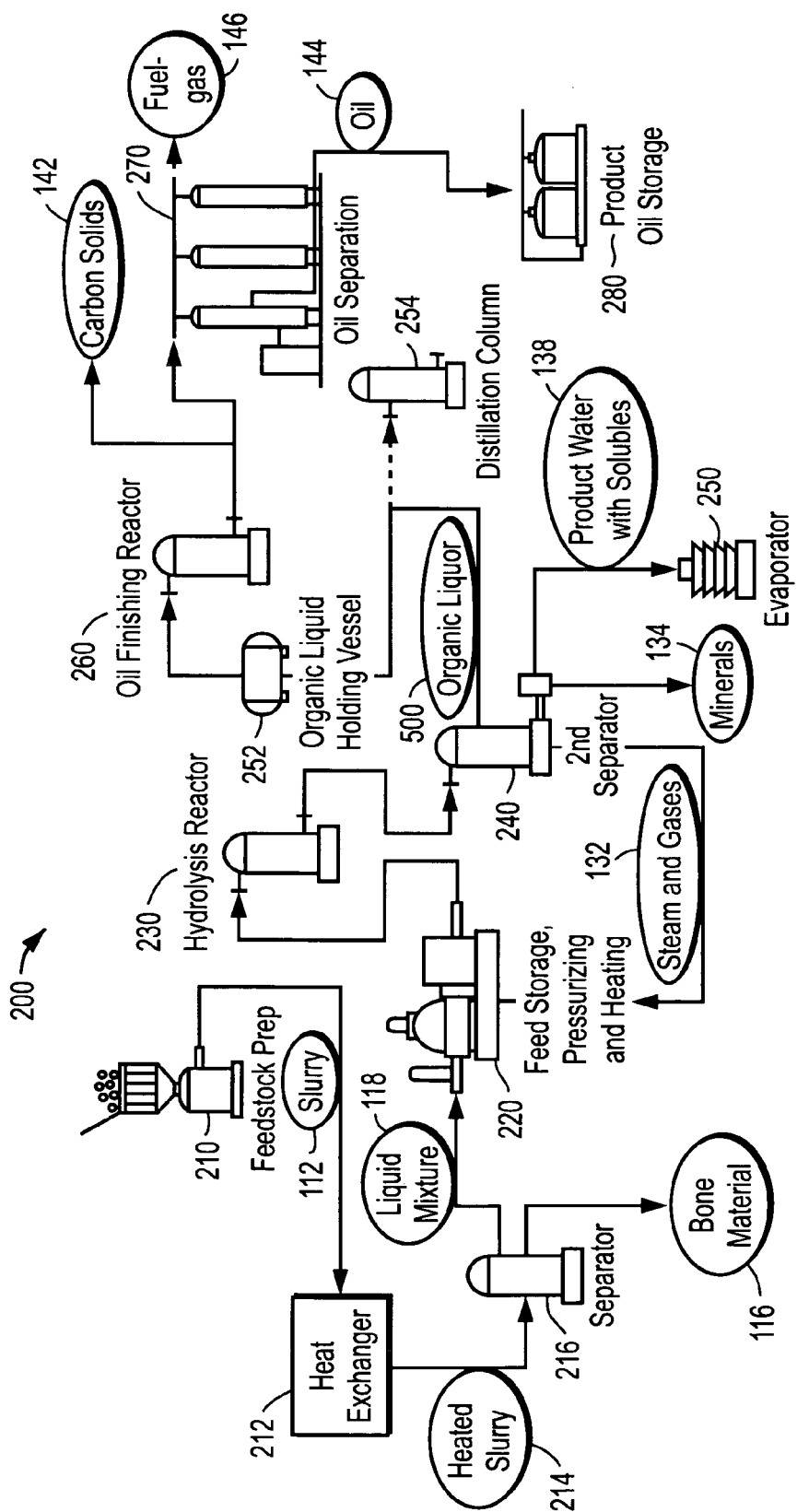
FIG. 2 shows a schematic of the apparatuses used in performing a process of the present invention.

The process of the present invention comprises a number of stages, as illustrated in FIGS. 1 and 2. FIG. 1 shows, in outline, principal features of an embodiment of the process of the present invention. FIG. 2 shows an exemplary apparatus 200 for carrying out a process according to the present invention.

The raw feed 100, shown in FIG. 1, may potentially be any waste material or low-value organic and/or inorganic stream. Preferably, the raw feed contains a substantial amount of carbon-containing material.

Raw feed 100 is subjected to a preparation stage 110. An aspect of the preparation stage is to reduce the size of the raw feed using pulping and other grinding technologies to a size suitable for pumping. The preparation stage may comprise one or more steps, and may comprise adding materials to, or driving materials off from the raw feed, and results in a slurry 112 that is passed to a Hydrolysis Stage 120. Slurrying may involve adding water (or other suitable fluid) to raw feed 100, depending upon its initial water content. Use of a slurry is beneficial because wet grinding, as in the preparation stage 110, reduces friction and energy consumption, and because a slurry may be easily transferred by pumps from one vessel to another. Suitable slurrying devices include: a pulper, an in-line grinder, or a maserator. A mixture of steam and gases 121 is given off from preparation stage 110.

Bone and other inorganic mineral matter is an integral part of animals and animal waste. Organic matter in the form of proteins, fat, and carbohydrates is physically and chemically attached to this inorganic mineral material making the processing of the organic into valuable products difficult unless the two are separated. Accordingly, at step 114, the slurry undergoes a depolymerization step, in which it is heated to a temperature between 275° F. and 380° F., preferably between 275° F. and 325° F., and even more preferably between 300° F. and 325° F., in order to separate inorganic matter, such as bone and other solid matter, from the organic constituents. Those of skill in the art will recognize that the composition of inorganic and organic matter will differ from batch to batch, depending on the nature of the feedstocks used. Bone material 116 is intended only to illustrate the type of inorganic matter provided in some embodiments of the invention. In instances where shredder residue, tires, plastics, or rubber, for example, constitute the raw feed, the inorganic material will not likely comprise bone material.

The depolymerization step, also referred to as heating step 114, takes place for at least 15 minutes and preferably for 45 minutes. The heating time depends on the temperature, with as little as 15 minutes required at higher temperatures, and more than an hour at lower temperatures in the range. Heating to such temperatures dramatically decreases the overall viscosity of the slurry and is consistent with a hydrolysis of the proteinaceous material in the feedstock into its amino acid building blocks—or di- and tri-peptides—so that the physical and chemical bonds with the mineral matter are broken. Such a reduction in viscosity permits separation of attached insoluble solids such as bone material 116 comprising unwanted mineral matter and pulverized bone from the slurry, thereby yielding a liquid mixture 118 that subsequently enters the Hydrolysis Stage.

The mineral matter that separates out at this stage principally comprises powdered and particulate bone material as well as some amount of minerals from sand, soil or other contaminants that have entered the feedstock. Separation of the mineral matter from the remaining material can be achieved by gravity separation or can utilize other separation apparatus familiar to one of ordinary skill in the art, such as a liquid/solid centrifuge, a screen, or a filter. The mineral matter so separated may be used as a mineral fertilizer. The separated mineral matter preferably is free of organic material, although, in practice trace amounts proceed through the separation process.

The liquid mixture 118 that arises from the separation typically comprises an oil phase containing fats and carbohydrates, and an aqueous phase in which are dissolved the amino acids and small peptides obtained from protein degradation. The liquid mixture may additionally comprise some insolubles that include some minerals and some peptides that have not been broken down. In light of the above, the composition of the liquid mixture is such that it may be diverted from the hydrolysis 120 pathway and applied directly to use or in a concentrated form as a food, fertilizer, fuel, or other products. In some embodiments of the invention, the concentrated liquid mixture can find application as a boiler or engine fuel, or be subjected to further processing, e.g. as in an oil refinery. In some embodiments of the invention employing hydrocarbon-based feedstocks, e.g. waste plastics, rubber, used tires, etc., an organic solvent can be combined with the raw feed 100 to maximize the organic fraction of the feedstock and thereby enhance the yield of utilizable liquid mixture.

As would be understood by one of ordinary skill in the art, depolymerization step 114 would also find application to other processes, such as animal rendering, in which animal waste containing bone and mineral matter is broken down to form other utilizable materials. In general, application of heat between 275° F. and 380° F., preferably between 275° F. and 325° F., and even more preferably between 300° F. and 325° F. to such a feedstock will effectuate a more efficient separation of the organic matter from the bone and mineral than has hitherto been possible. Such a process will thereby facilitate the separation of the bone and mineral matter from the rest of the feedstock and lead to a more pure organic portion as well as to reducing the amount of organic material that is wasted through being attached to un-utilizable mineral matter.

Accordingly the present invention further includes a process for rendering animal body parts that contain organic matter attached to insoluble solids, comprising: preparing a slurry from the animal body parts; heating the slurry to between 275° F. and 380° F., preferably between 275° F. and 325° F., and even more preferably between 300° F. and 325° F., to produce a liquid mixture and insoluble material; and removing the bone material. It is to be noted that previously existing processes for animal rendering typically do not heat the feedstock to as high a temperature, and generally only heat to temperatures under 212° F. (100° C.). Furthermore, previously existing processes for animal rendering typically generate two batches of products: meat and bonemeal in one batch, and fat in a second batch. By contrast, the process of the present invention generates two batches of different constituents: solid material, largely containing bone, that is entirely separated and may be used as, e.g., a mineral fertilizer; and a liquid portion that itself comprises a separate oil portion that may be used to create fatty acids and an aqueous portion (that contains amino acids dissolved in water) that may be used as an animal food supply.

In a Hydrolysis Stage 120, the slurry is subjected to heat and increased pressure wherein the slurry undergoes a hydrolysis step, also called a Hydrolysis Stage reaction. Such conditions of heat and pressure lead to breakdown of the cell structure of biological components of the slurry, to release constituent molecules such as proteins, fats, nucleic acids, and carbohydrates. Additionally, many polymeric organic materials are hydrolyzed by water in the slurry to mixtures of simpler organic products. In particular, fats may be partially split to give floatable organic materials such as fatty acids (containing carboxylic acid groups), and water soluble glycerols (i.e., molecules containing 3 hydroxyl groups). Proteins are typically broken down into simpler polypeptides, peptides, and constituent amino acids. Carbohydrates are largely broken down into simpler, water soluble, sugars. Oxygen and chlorine bonds of plastics such as PET and PVC are also broken in the Hydrolysis Stage. The presence of water in the Hydrolysis Stage is especially advantageous because it helps convey heat to the feedstock.

It is to be understood that the terms react, reacting and reaction, when used in conjunction with embodiments of the present invention, can encompass many different types of chemical changes. In particular, the term reaction can encompass a chemical change arising from the combination or association of two or more species that give rise to one or more products, and can encompass other types of decompositions or conversions that involve the breakdown or transformation of a single species, as induced by conditions of temperature, pressure, or impact of electromagnetic radiation, and can further encompass transformations involving a solvent, such as a hydrolysis. It is further to be understood that when the term "reaction", or "react" is used herein to describe a process, or a stage in a process, then more than one chemical change can be occurring simultaneously. Thus, a reaction can simultaneously involve a hydrolysis and a decomposition, for example.

A mixture of steam and gaseous products 126 is typically liberated from the slurry in the Hydrolysis Stage 120. The reacted feed 122 resulting from the Hydrolysis Stage typically consists of a mixture of reacted solid products and a mixture of reacted liquid products. These various products are typically characterized as an oil phase, a water phase, and a wet mineral phase. The water phase and the oil phase typically contain various dissolved organic materials. The mixture of steam and gases 126 produced in the Hydrolysis Stage 120 is preferably separated by a condenser, and the steam is used to pre-heat incoming slurry.

The reacted feed 122 is then subjected to a separation stage 130 in which a further mixture of steam and gases 132 is driven off, and a mixture of minerals 134 or other solid materials is separated out. Preferably, the solid materials obtained at this stage do not comprise carbon solids, unless carbon solid was present in the input feedstock. Separation stage 130 may comprise more than one individual separation. In some embodiments of the invention, the solid materials can undergo further processing in a calciner to burn off any residual organic therefrom and to be calcined. Other materials generated at various points of the process described herein, e.g. concentrated non-condensable gas, solid inorganic 116, and aqueous concentrate fuel, can likewise be fed to the calciner for further processing. In some embodiments of the invention, the calciner serves dual functions in producing calcined solids and producing hot oil and/or steam for use in a variety of applications. For example, the hot steam can be used to supply a steam turbine, e.g. in electric power plants or other industrial and manufacturing contexts.

The residual material from separation stage 130 consists of a mixture of liquid products that includes produced water 138 (water with solubles) and an organic liquor 500. The organic liquor 500 is typically a liquid that contains a mixture of carbon-containing species such as reacted liquid products from the Hydrolysis Stage. Preferably, most of the produced water 138 is separated off, and a liquid product such as the organic liquor 500 is directed to a Oil Finishing Stage 140. Thus, the organic liquor preferably comprises a reacted liquid product, separated from water and in most instances also separated from reacted solid product. The produced water 138 contains numerous compounds including sulfur- and chlorine-containing materials and is preferably diverted for concentration 139. It is desirable to separate out such compounds and, in preferred embodiments, concentration gives rise to a condensate 151 (whose purity is usually better than that of municipal-strength wastewater), and a concentrate 153 (that, in many instances, can be used as an organic fuel or liquid fertilizer similar to fish solubles).

Some of organic liquor 500 may be diverted to an optional separation 137 to form specialty organic chemicals 143 such as fatty acids or amino acids, for example via fractional distillation of the organic liquor. Residual fractions, fractionated liquor 145, often called 'heavy liquor', that comprises fractions that are not useful as specialty chemicals, may be redirected to Oil Finishing Stage 140.

When the feedstock is municipal sewage sludge, the reacted feed 122 from the Hydrolysis Stage reaction typically comprises produced water, a solid matrix of organic and inorganic material, and a small amount of organic liquor. The produced water from municipal sewage sludge is then diverted for concentration to form a product that finds application as a fertilizer.

In a Oil Finishing Stage 140, also known as "oil finishing", the organic liquor 500 is subjected to conditions wherein it undergoes a second reaction. The second reaction may involve one or more processes known in the art, such as simple dehydration, distillation for fatty acids, thermal cracking, catalytic cracking, sludge removal, etc. It is also possible that the organic liquor contains some quantity of reacted solid product that is also passed to the Oil Finishing Stage. Together, the organic liquor and reacted solid product may be referred to as a solid matrix. In the second reaction, the organic liquor is converted to a mixture of useful materials that usually includes carbon solids 142, and a mixture of hydrocarbons that is typically released as hydrocarbon vapor and gases 148. Such a conversion may involve a decomposition of one or more materials in the organic liquor. Suitable conditions in the Oil Finishing Stage typically use temperatures that are elevated with respect to the Hydrolysis Stage, and use pressures that are reduced with respect to the Hydrolysis Stage. The Oil Finishing Stage typically does not involve the use of added water. A number of different apparatuses may be employed to effect the Oil Finishing Stage, as further described herein.

Carbon solids 142 are typically similar to coke, i.e., usually hard carbonaceous materials with a high calorific value suitable for use as a fuel. Carbon solids 142 preferably contain little, if any, non-combustible minerals that typically result from the incineration of carbon-containing materials in an oxygen-deficient atmosphere. The mineral content of carbon solids 142 is preferably less than 10% by weight, more preferably less than 5% by weight, still more preferably less than 2% by weight, and most preferably less than 1% by weight. Where carbon solids 142 contain minerals, they may also be described as a carbon-mineral matrix.

The hydrocarbon vapor and gases 148 are referred to as "bio-derived hydrocarbons" whenever biological material is the feedstock to the process of the present invention. The hydrocarbon vapor and gases can be variously referred to as "tire-derived", "rubber-derived" or "plastic-derived" if the raw feed stock comprises tires, rubber, or plastics, respectively. Hydrocarbon vapor and gases 148 typically comprise hydrocarbon gases, with possibly some trace impurities of non-hydrocarbon gases. The hydrocarbon gases include gases such as fuel-gas 146; the hydrocarbon vapors may be readily condensed to liquids or oils 144 such as the lighter constituents of #2 diesel oil. One of ordinary skill in the art understands that a #2 diesel oil is an oil with a relatively low viscosity or density.

When the feedstock is municipal sewage sludge, the solid products from the Oil Finishing Stage typically comprise a mixture of hydrocarbon oils, fuel gas, and a mixture of minerals with carbon, in solid form.

It is to be understood that the operating parameters of the process of the present invention may be adjusted in one or more instances in order to accommodate different types of raw feed materials. For example, in the context of raw feed such as turkey offal, the major components are animal fats, proteins, carbohydrates, and minerals. Thus, the balance of the major components may determine some aspects of the operating conditions of the present invention. Furthermore, the temperature ranges of the first and Oil Finishing Stage reactors can be controlled to produce specific products, thereby maximizing the economic value that can be obtained from the yield of various products.

An apparatus 200 for carrying out a process according to the present invention is shown in FIG. 2. Based on the teachings of the present invention, the assembly of the various components of apparatus 200 would be within the capability of one of ordinary skill in the art of process engineering or chemical engineering. Accordingly, such technical details as would be familiar to an artisan of ordinary skill are omitted from the present description. Furthermore, as is discussed herein, one of ordinary skill in the art would be able to substitute various pieces of apparatus for individual pieces shown in FIG. 2, and perform the process of the present invention.

Feedstock preparation and slurrying may be carried out in a feedstock preparation apparatus 210. After feed preparation and feed slurrying, the slurry is passed to a low pressure vented vessel 220 referred to as a feed storage tank. Preferably the feed is subjected to heating in or before the feed storage tank to produce a heated slurry that is optionally subjected to pressurizing prior to entering the Hydrolysis Stage reactor. Such heating and pressurizing typically take place in equipment that comprises a vessel to retain the slurry, a pump for increasing the pressure of the slurry, and a heat exchanger to heat the slurry. Typically conditions of about 140° F. and 1 PSI are employed, to keep the feed slurry in a liquid state, and to limit biological activity. In a preferred embodiment, the feed storage tank comprises a first tank and a second tank. In such a preferred embodiment, the first tank is heated to a temperature of about 140° F. (about 60° C.) and subjected to a pressure of about 1 p.s.i. Such conditions in the first tank effectively bring about a cessation of biological activity. In an exemplary embodiment, such a first tank may have a capacity of about 1,000,000 U.S. gallons; thus, for a throughput of 100-150 gallons/minute, the effective residence time in such a tank is about 700 minutes. The second tank in such an embodiment may be maintained at a temperature of about 300° F. and subjects the contents to a pressure of up to about 100 p.s.i. The pressure is generally slightly above the saturation pressure of the mixture at a given temperature. For example, the saturation pressure of the mixture is 66 p.s.i. at about 300° F. (about 150° C.). The conditions in the second tank are typically harsh enough to breakdown proteinaceous materials in the slurry, to loosen the slurry, and to drive off ammonia. The capacity of the second tank is typically less than that of the first tank, and may be as small as 2,500 U.S. gallons. Thus, in one embodiment, a flow rate of about 40 gallons per minute gives a residence time of about an hour in the second tank. Longer, preferred residence times for particular feedstocks, for example of several hours in the second tank, may be achieved with lower flow rates.

The Hydrolysis Stage of the present invention is carried out in a Hydrolysis Stage reactor 230, which preferably comprises a multi-chamber vessel so that there is a narrow distribution of residence times of the constituent materials of the slurry. In an alternate embodiment, the Hydrolysis Stage reactor can also be an augured reactor. Preferably the vessel is equipped with baffles, and a multi-blade motorized stirrer that can simultaneously stir the slurry in each of the chambers. In a preferred embodiment, there are four chambers in such a vessel. In another preferred embodiment, the heating of the slurry takes place in several stages ahead of this vessel.

The flashing of the reacted feed after the Hydrolysis Stage can be achieved in a flash vessel 240 (a "second stage separator") with a vent. Preferably the pressure in the flash vessel 240 is considerably lower than that in the Hydrolysis Stage reactor 230. In one embodiment, the pressure in the flash vessel is about 300 psi, where the pressure in the Hydrolysis Stage reactor is around 600 psi.

Various equipment can be used to achieve various second stage separations of the feed that comes out of the Hydrolysis Stage reactor 230. Preferably such separations provide a mixture of steam and gases 132, organic liquor 500, minerals 134, and produced water with solubles 138. Steam and gases 132 are preferably diverted back to the preparation stage to assist with feed heating.

Separation of the minerals from the organic liquor and water can be achieved with centrifuges, hydrocyclones or with a static tank. Drying of the minerals 134 can be achieved with, for example, a drying kiln or other mineral drier such as a "ring" dryer (not shown in FIG. 2). (In an alternate embodiment, separation can be facilitated by adding a chemical to break the emulsion.)

Produced water with solubles 138, resulting from the separation of the organic liquor from the water, can be concentrated in an evaporator 250 of a type that is typically available in the industry. The organic liquor 500 that has been separated from the minerals and the water may be contained in an organic liquor holding vessel 252 prior to transfer to the Oil Finishing Stage reactor 260. Such a holding vessel may be an ordinary storage vessel as is typically used in the industry.

In exemplary embodiments of the invention, some or the entire portion of organic liquor 500 may be diverted to give one or more specialty chemicals. Typically this involves subjecting the organic liquor to fractional distillation. The organic liquor that is subjected to fractional distillation is typically distilled in a distillation column 254. The organic liquor may be subjected to an acid wash to separate out trace amino acids before passing it to the distillation column. More volatile materials from the organic liquor, such as fatty acids, are distilled off and collected. Any heavier materials such as non-volatilized fats and fat derivatives that are found in the bottom of the distillation column are passed on to the Oil Finishing Stage reactor 260.

In other exemplary embodiments of the invention, some or the entire portion of organic liquor 500 is diverted to give a carboxylic oil. The carboxylic oil can be used directly as an adaptable fuel source, i.e. in a boiler, heater, or engine. In some embodiments of the invention, the carboxylic oil is subjected to further processing, e.g. as in an oil refinery. Alternatively, the carboxylic oil may be further processed or purified via filtration and/or centrifugation prior to use. For example, the carboxylic oil can undergo hydrotreatment, a process commonly used in oil refineries to remove nitrogen and sulfur from crude petroleum oils, to yield a cleaner-burning fuel as the presence of nitrogen and sulfur can lead to NOx and SOx formation during combustion. As illustrated in the Examples section, the carboxylic oil provided by the present invention is low in sulfur content, typically <0.2%, and therefore requires little amount of hydrogen for hydrotreatment purposes. The ease of upgrading the carboxylic oil is also attributed to the low nitrogen content, most of which exists in amine form rather than heterocyclic ring.

Various feedstocks can be employed to generate usable carboxylic oil at this point of the process. Feedstocks comprising fat/grease, e.g. animal fats, oil seeds-soybean, canola, trap grease, and a protein source are preferred to maximize the yield of usable carboxylic oil. Materials suitable for this purpose include, non-exclusively, animal waste, plant waste, waste, and low value streams (DDG) from ethanol production facilities.

The organic liquor that comes from the second stage separation can also passed to the Oil Finishing Stage reactor 260 wherein a second reaction takes place in which the organic liquor is converted into one or more useful materials such as oil, and carbon solids 142. The oil that comes out of the Oil Finishing Stage reactor may be subjected to further separation in a separator 270, to produce oil 144 and fuel-gas 146. The separation may comprise condensing the oil in various steps, and diverting it to oil storage 280 in a storage vessel. The carbon solids 142 that come from the Oil Finishing Stage reactor are cooled and may also be stored, or further heated and then treated to activate them according to methods that are known to one of ordinary skill in the art. For example, the carbon solids may be heated in an additional reactor, and be activated by the injection of superheated steam.

As discussed hereinabove, exemplary raw feed materials include waste materials from the agricultural and food processing industries. Such waste materials can comprise animal parts such as wings, bones, feathers, organs, skin, heads, blood and necks, soft tissue, claws and hair. Typical animal parts are those found in turkey offal and remnants of carcasses from slaughterhouses. Other waste materials from the food processing industry that are suitable for processing with the methods of the present invention include unused grease from fast food establishments such as burger franchises, and materials such as dissolved air flotation ("DAF") sludge from food processing plants. Agricultural waste materials can include animal dung or manure from sheep, pigs, and cows, and also other materials such as chicken litter and crop residuals. In an exemplary embodiment illustrated in FIGS. 3-5, raw feed 100 is a food processing byproduct such as turkey offal.

Figure 3:
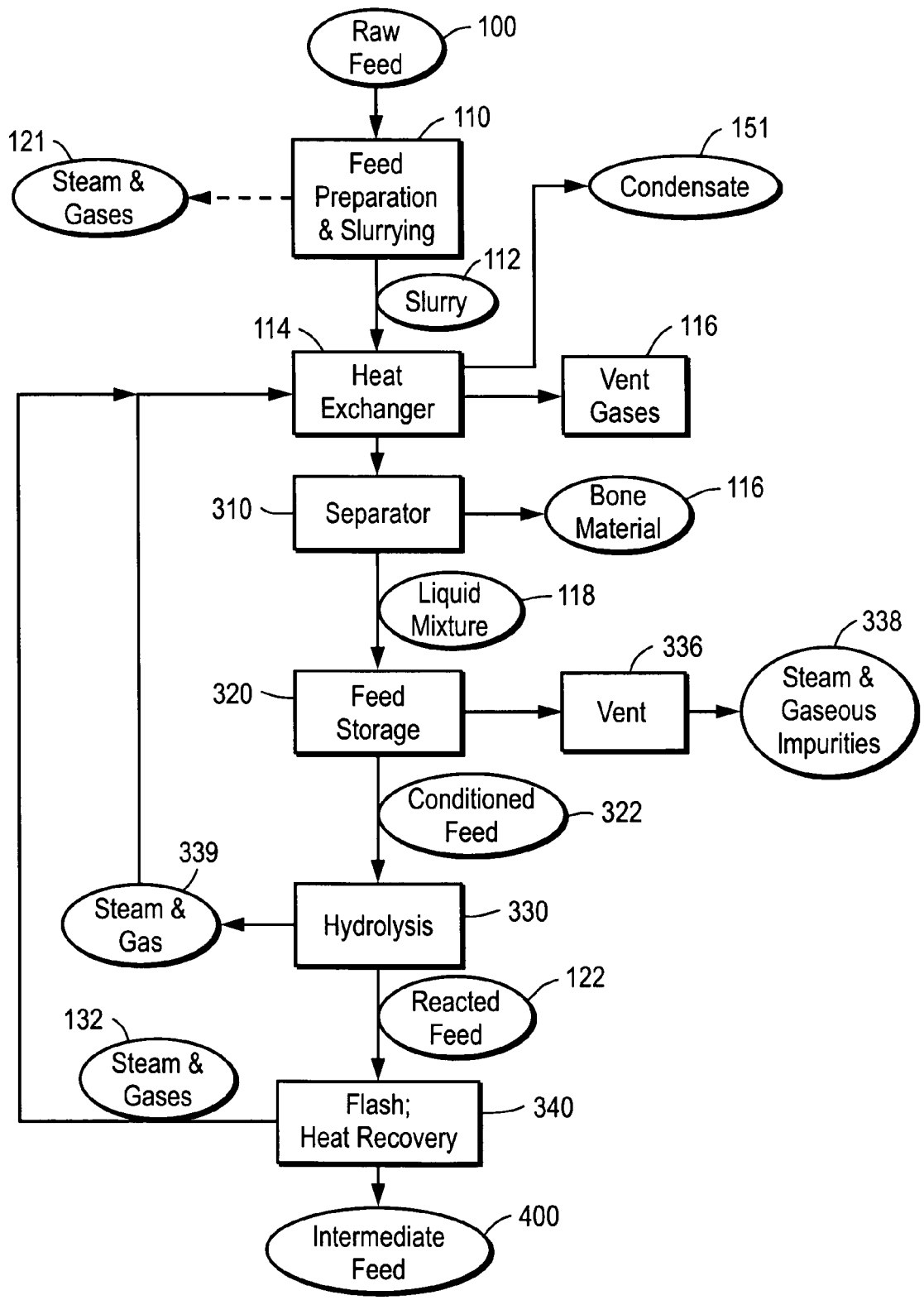
FIG. 3 shows a flow-chart of a preparation and Hydrolysis Stage reaction of a process of the present invention.

As shown in FIG. 3, raw feed 100 is initially subjected to preparation and slurrying 110 to produce a feed slurry 112, accompanied by steam and gases 121. Slurry 112 may be transferred to feed storage 320 in a feed storage tank ("FST" or homogenizer) via a heat exchanger 114 where it is heated to break down proteinaceous material that is attached to bones and other hard body parts in the mixture. For a feedstock such as food processing waste or municipal sewage sludge, heating for such purpose is to a temperature between 275° F. and 380° F., preferably between 275° F. and 325° F., and even more preferably between 300° F. and 325° F. Heating in the range 300° F. to 325° F. should preferably be for about an hour. The result of such heating is to lower the viscosity of the slurry, biologically inactivate the contents, and to produce a mixture of mineral materials (including powdered and particulate bone), and a liquid mixture. At step 310, the insoluble solids comprising minerals and bone material 116 are separated from the liquid mixture 118, e.g., by gravity separation or by liquid/solid centrifuge, or screen or filter. The liquid mixture, comprising a mixture of water and water-insoluble organic components and some trace minerals, is cooled and directed to the feed storage tank 320 ("FST" or homogenizer). The contents are heated to about 275-280° F. in the FST and subjected to pressure of about 50 p.s.i. in order to produce conditioned feed 322, a relatively homogeneous feed suitable for passing to the Hydrolysis Stage reactor. During feed storage, steam and gaseous impurities 338 are preferably vented 336.

Thus, one advantage of the present invention is that degassing occurs in the FST to remove unwanted gaseous impurities early in the general process of the present invention. Feed slurry 112 may remain in feed storage 320 for any convenient time until it is due to be further processed by the methods of the present invention. Preferably, the FST supplies a constant feed stream to a high-pressure slurry pump that pressurizes the feed and transports it to the Hydrolysis Stage reactor. In a preferred embodiment, feed slurry 112 may remain in a large storage tank for any convenient time until it is due to be further processed by the methods of the present invention.

For raw feed materials that contain significant amounts of ammonia ($NH_3$), such as turkey offal, it is advantageous to remove the free ammonia, either during preparation 110, in which case it is one component of steam and gases 121, or during storage 320, where it is vented along with steam and gaseous impurities 338. One source of ammonia is the breakdown of uric acid found in residual quantities of urine that are often present in aggregates of animal body parts. Methods of removing ammonia are within the knowledge of one of ordinary skill in the art and include, but are not limited to, separation of the urine content prior to slurrying, use of enzymatic degradation, and application of heat. Additionally, ammonia can be converted by acidification to a salt such as ammonium sulfate, or ammonium phosphate. In a preferred embodiment, the FST comprises two vessels maintained at different conditions. The first such vessel performs the role of storage; the second vessel effects the breakdown of proteins, and releases ammonia.

The conditioned feed slurry 322 that emerges from feed storage 320 is subjected to a Hydrolysis Stage 330, wherein water content in the conditioned feed slurry 322 effects a hydrolysis of many of the biopolymers present. Sufficient agitation (provided by mixers and/or recirculation devices) is provided so that solids are kept in suspension. The Hydrolysis Stage typically takes from about 5 to about 60 minutes. The output from the Hydrolysis Stage is a reacted feed 122. Typically steam and gas 339 are also released from the Hydrolysis Stage.

In the Hydrolysis Stage 330, some degasification takes place in which partial removal of nitrogen and sulfur compounds occurs, and deamination and decarboxylation reactions can take place in which significant quantities of protein also dissociate into products such as ammonia, and potentially carbon dioxide. In practice, for the process of the present invention, decarboxylation reactions are unwanted because the products, other than carbon dioxide, are amines which tend to be water soluble, and volatile. Thus, in general, deamination reactions are preferred to decarboxylation reactions, and the reacted liquid products obtained from the Hydrolysis Stage typically include carboxylic acids when the feedstock includes material such as proteins and fats. Accordingly, since decarboxylation reactions typically occur at higher temperatures than deaminations, the Hydrolysis Stage is preferably run at the lowest temperature possible at which fat molecules are split. As an alternative, the pH in the Hydrolysis Stage can be shifted by adding acid, thereby discouraging decarboxylation reactions.

Removal of the nitrogen and sulfur compounds at this stage, and the prior preheating stage, prevents formation of organic nitrogen compounds, ammonia, and various sulfur compounds that might become undesirable components of the resulting bioderived hydrocarbons if allowed to become processed through certain types of Oil Finishing Stage reactor.

Typical conditions for carrying out the Hydrolysis Stage in this example are from 150° C. to 330° C., though preferably around 250° C., and around 50 atmospheres pressure, or about 600 psi, as may be obtained in a Hydrolysis Stage reactor. Generally, the pressure in the Hydrolysis Stage reactor is in the range 20-120 atmospheres. The total preheat and Hydrolysis Stage heating time is up to around 120 minutes. Such conditions may be varied according to the feeds to be used. In one aspect of the present invention, as applied to feedstocks that contain PVC, the operating temperature in the Hydrolysis Stage is high enough, and is followed by washing steps, so that chlorine-containing products are removed.

Generally, the Hydrolysis Stage is carried out at temperatures in the range from about 150° C. to about 330° C. so that at least one of the following three transformations can be accomplished. First, proteins are degraded to the individual amino acid residues of which they are composed. This can be achieved by hydrolyzing the peptide amide linkage between each pair of amino acid residues in the backbone of the protein at temperatures in the range about 150-220° C. Second, fat molecules can be broken down to fatty acid molecules, a process that can occur in the range of 200-290° C. Fats are hydrolyzed to split apart triglycerides to form free fatty acids and glycerol. Third, deamination and decarboxylation of amino acids can occur in the Hydrolysis Stage. The carboxylic acid groups, if allowed to proceed to the Oil Finishing Stage reactor, still attached to their respective amino acid moieties, will all be converted to hydrocarbons at relatively mild operating conditions. Additionally, there may be some amino acids that are deaminated, a process that typically occurs in the temperature range 210-320° C. Thus, in the Hydrolysis Stage alone, virtually all the protein present in the slurry will be converted to amino acids at relatively low Hydrolysis Stage operating temperatures. Furthermore, the degree of amino acid deamination can be controlled by a judicious choice of Hydrolysis Stage operating temperature.

As would be understood by one of ordinary skill in the art, the actual conditions under which the Hydrolysis Stage reactor is run will vary according to the feedstock employed. For example, animal offal typically utilizes a Hydrolysis Stage temperature in the range about 200° C. to about 250° C. Municipal sewage sludge typically utilizes a Hydrolysis Stage temperature in the range about 170° C. to about 250° C. A feedstock comprising mixed plastics typically utilizes a Hydrolysis Stage temperature in the range about 200° C. to about 250° C. Tires typically utilize a Hydrolysis Stage temperature in the range about 250° C. to about 400° C. A typical operating condition for tire processing in the Hydrolysis Stage reactor of the process of the present invention, would be at 275° C. and 300 psi, with a solvent to tire ratio of 1:1 or less by weight. Such a processing pressure for a given temperature is far lower than those reported in other methods of tire processing and is therefore more economic.

The Hydrolysis Stage of tire processing may also involve water for removal of materials containing elements such as chlorine. Preferably such materials are almost completely removed under normal operating conditions. The tire material, solvent and water can be mixed together for the Hydrolysis Stage, or the tire may be contacted by the solvent and the water sequentially.

The pressure in the Hydrolysis Stage reactor is typically chosen to be close to the saturation pressure of the water at the operating temperature in question. The saturation pressure is the pressure that needs to be applied at a given temperature to keep the water from boiling, and also depends on the presence and quantity of other gases in the purified feed slurry. The total pressure in the reactor is greater than the vapor pressure of the water in the slurry mixture, so that the water does not boil off. The pressure is preferably in the range 45-55 atmospheres, may be in the range 40-60 atmospheres, and may also be in the range 30-70 atmospheres. Typically, the pressure is adjusted by amounts up to, and in the range of, 0-100 psi above saturation so that unwanted gases may be vented 336 from feed preparation, feed storage, or the Hydrolysis Stage reactor.

One advantage of the present invention is that the venting during the feed preparation 110, feed storage 320, and Hydrolysis Stage permits gaseous impurities such as ammonia, carbon dioxide, and sulfur-containing gases to be removed. Typically, the Hydrolysis Stage 330 gives rise to sulfur-containing gases from the breakdown of sulfur-containing moieties in the various bio-materials. A principal source of sulfur is protein molecules, many of which have sulfur-bridges between cysteine residues. The sulfur-containing gases are typically hydrogen sulfide ($H_2S$), and mercaptans (alkyl-sulfur compounds) such as methyl mercaptan. Additionally, some salts such as calcium sulfide (CaS) may be produced, and these are normally separated during later stages.

After the Hydrolysis Stage, the reacted feed 122 that typically comprises at least one reacted liquid product and at least one reacted solid product and water, is flashed 340 to a lower pressure, and permitted to release excess heat back to the heating stages prior to the Hydrolysis Stage. Typically, flashing is achieved through multiple pressure reductions, preferably in two to three stages. The effect of flashing is to vent off remaining steam and gases 132 associated with the reacted feed. Dehydration via depressurization is efficient because water is driven off without using heat. The effective use of the excess heat is known as heat recovery, and represents a further advance of the process of the present invention. The fact that the Hydrolysis Stage uses water, which may be vented as steam, along with other gases 339, lends itself to efficient energy recovery. Water and steam are effective in heat exchange and may be redirected to the heating stages before the Hydrolysis Stage using one or more condensers. Condensers are quite compact and promote efficiency. Thus, steam and gases 132 vented from the reacted feed 122 are also preferably used to assist in heating the influent feed and in maintaining the temperature of the Hydrolysis Stage, thereby reducing the energy loss of the process of the present invention. Steam and gases 339 may also be passed to one or more heat exchangers placed prior to, or after, feed storage 320. Steam may also be directly injected back into the incoming feed 100 in some cases. Preferably, steam and gases 339 from Hydrolysis Stage 330 are combined with steam and gases 132 prior to passing to heat exchanger 114.

In the heat exchanger 114, the steam and gases are separated from one another. Most of the steam condenses to give a condensate 151. Preferably this condensate is redirected to combine with "produced water" that results from later stages of the process of the present invention, further described hereinbelow. Residual, small, amounts of steam are vented 116 along with the gases. Preferably these vented gases are combined with other gases that are produced by later stages of the process of the present invention to give fuel gas.

After the reacted feed has been flashed 340, and heat has been recovered, the intermediate feed 400 typically comprises at least one reacted liquid product, at least one reacted solid product, and water. The at least one reacted liquid product is typically a constituent of an organic liquor; the at least one reacted solid product typically comprises minerals. The intermediate feed preferably is substantially free of gaseous products.

Figure 4:
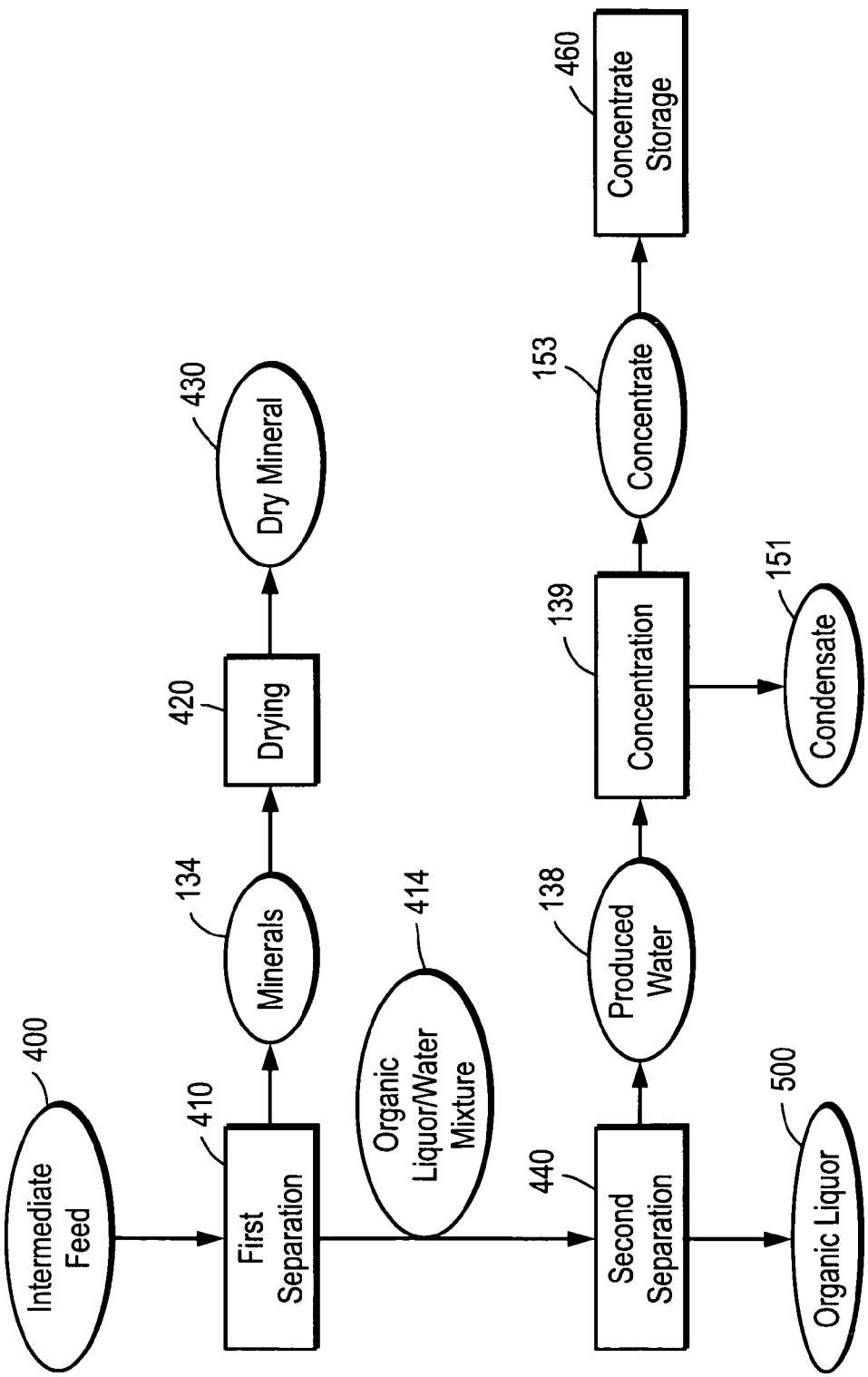
FIG. 4 shows a flow-chart of a second separation stage of a process of the present invention.

FIG. 4 shows a sequence of separations that is applied to the intermediate feed. It is another advantage of the process of the present invention that the intermediate feed that results from the Hydrolysis Stage is subjected to one or more separation stages that removes minerals and water before processing in the Oil Finishing Stage reaction. The separation stage uses separating equipment such as centrifuges, hydrocyclones, distillation columns, filtration devices, and screens, and may also use distillation to remove very fine carbon solids from an intermediate feed 400. In general, further pressure reduction recovers more steam, and facilitates solid/liquid separation to recover minerals and other solids.

Intermediate feed 400, typically comprising organic liquor, water, and minerals is preferably subject to a first separation 410 that removes most minerals 412 and produces a mixture of organic liquor and water 414 that is low in ash. Such a separation is characterized as a solid/liquid separation and may be achieved with a first centrifuge or via a solid/liquid separation device, for example by mechanical, or non-mechanical methods such as gravity settling. Minerals 412 that are separated out are typically wet and are thus subjected to a drying stage 420 before passing to a dry mineral storage 430. The drying stage typically takes place under normal atmospheric conditions. The resulting dry minerals may find considerable commercial application as a soil amendment or other industrial precursor.

The organic liquor/water mixture 414 is subject to a second separation 440 to drive off the water and leave the organic liquor 500. Such a second separation may be achieved using a second liquid/liquid centrifuge (or other separation device). Differences in gravity allow centrifugal separation of the produced water and organic liquor. The produced water 138 that is driven off contains significant amounts of dissolved small organic molecules such as glycerol and some water soluble amino acids that derive from the breakdown of proteins. The produced water also typically includes chloride impurities. Separating out such impurities prior to the Oil Finishing Stage reaction represents an additional benefit of the present invention because later products are thereby not contaminated.

The produced water 138 may be subject to concentration 139, such as by evaporation, producing a water condensate 151 that may be recycled within the process of the present invention, and a concentrate 153 that is dispatched to a concentrate storage 460. Evaporation is typically achieved by application of a slight vacuum. The concentrate, which largely comprises a slurry of amino acids, glycerol and, potentially ammonium salts such as ammonium sulfate or phosphate, will typically have commercial value as, for example, fertilizers known as "fish solubles" that are sold in domestic garden stores.

It is to be understood that the present invention is not limited to a separating stage comprising two steps. Nor is the present invention limited by the order in which any separation steps are carried out. Thus, it is consistent with the present invention if the separation of the intermediate feed 400 into products such as organic liquor, minerals, and water occurs in a single step or in more than two steps. Furthermore, minerals may, in some instances, be left in the organic feed by design, and their separation thus need not occur prior to Oil Finishing Stage processing.

When processing tires with an embodiment of the present invention, a portion of the organic liquor may be used as a final product that is a devulcanized tire feedstock for the manufacture of rubber products.

Figure 5:
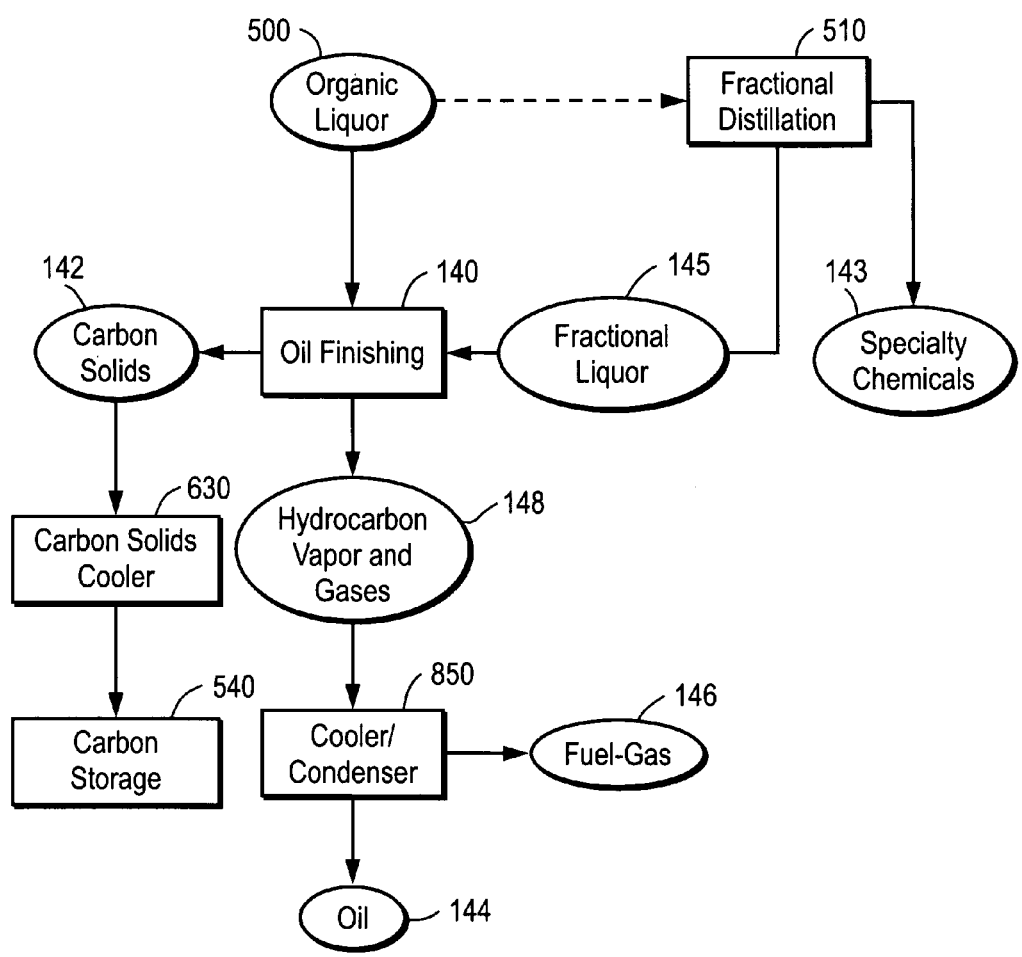
FIG. 5 shows a flow-chart of an Oil Finishing Stage reaction of a process of the present invention.

FIG. 5 shows a stage of the process of the present invention wherein organic liquor 500 resulting from a separation stage of FIG. 4 is subjected to a Oil Finishing Stage 140 to produce one or more useful products. The organic liquor 500 ordinarily goes to a holding vessel before it is processed further. It would be understood by one of ordinary skill in the art that the exact distribution of products obtained from Oil Finishing Stage 140 will vary according to the conditions employed in the Oil Finishing Stage, including the type of apparatus employed therefor. For example, in some Oil Finishing Stage reactions, the predominant product is hydrocarbon vapor and gases 148, with very little or no carbon solids.

A portion, or all, of organic liquor 500 can optionally be directed for processing ahead of the Oil Finishing Stage 140 to yield one or more specialty chemicals 143. According to such an optional process, some desired portion of organic liquor 500 is typically subjected to a separation process such as fractional distillation 510 or reacted with a compound such as alcohol to form another compound, as would be understood by one of ordinary skill in the art. Such a separation process generates specialty chemicals 143, and leaves behind a fractionated liquor 145, often referred to as a "heavy liquor", that comprises higher molecular weight organic molecules such as triglyceride oils. Fractionated liquor 145 may be redirected to the Oil Finishing Stage 140 for processing in a similar manner to organic liquor 500.

Specialty chemicals 143 are typically organic compounds such as fatty acids, fatty acid esters, fatty acid amides, or a range of amino acids. Preferably the specialty chemicals 143 are fatty acids. More preferably, specialty chemicals 143 are fatty acids in the range $C_{12-20}$. Even more preferably, the specialty chemicals 143 are fatty acids in the range $C_{16-20}$. When the specialty chemicals 143 are fatty acid amides and fatty acid esters, they are typically formed by reaction with fatty acids. The specialty chemicals 143 resulting from a feedstock such as turkey offal may find application as lubricants and coatings and paints.

In the Oil Finishing Stage 140, the water content of the organic liquor 500 is almost zero, so that the conditions of the Oil Finishing Stage are such that the remaining organic molecules are broken down largely by application of a high temperature, rather than by hydrolysis by excess, or added, water or steam. Typical conditions for carrying out the Oil Finishing Stage are around 400° C., as may be obtained in a Oil Finishing Stage reactor, or other vessel. The optimal temperature will vary according to overall reaction conditions. The Oil Finishing Stage typically takes from about 5 minutes to about 120 minutes, though the precise time will vary according to the type of reactor employed. In practice, the various phases of the liquor spend varying amounts of time in the Oil Finishing Stage reactor. For example, the vapors pass through relatively quickly, and the liquids take longer. The output from the Oil Finishing Stage comprises, separately, a mixture of hydrocarbon vapor and gases 148, where the non-hydrocarbon gases can include carbon dioxide, CO, and nitrogen and sulfur containing compounds, and carbon solids 142. The carbon solids 142 preferably resemble high quality coke. The mixture of hydrocarbon vapor and gases 148 typically contains oil vapor. The conditions of the Oil Finishing Stage are preferably selected to optimize the purity of the carbon solids 142, as well as the mixture of hydrocarbon vapor and gases 148. Rapid quench of hot vapors, such as the mixture of hydrocarbon vapor and gases 148, stops reactions and minimizes carbon char formation after the Oil Finishing Stage. In a preferred embodiment, rapid quenching of vapors may be achieved by directing the vapors into a drum full of water or by multiple quenching steps using thermal fluids and cooling mediums. Where such multiple quenching steps are employed, it is advantageous to take multiple cuts (diesel, gasoline, etc.) from the oil so that the various fractions can be diverted to separate commercial applications. Alternatively, in another embodiment, the oil vapor may be quenched in the presence of the incoming organic liquor, thereby also facilitating energy recovery.

Generally, the Oil Finishing Stage is carried out at temperatures in the range of about 310° C. to about 510° C., so that at least one of the following two transformations can be accomplished. First, fatty acids are broken down to hydrocarbons. This can be achieved by removing the carboxyl group from each fatty acid molecule at temperatures in the range approximately 316-400° C. Second, hydrocarbon molecules themselves are "cracked" to form a distribution of molecules of lower molecular weights, a process that can occur in the range approximately 450-510° C. Typically, however, hydrocarbon cracking occurs at temperatures above 480° C. Preferably, the Oil Finishing Stage is carried out at a higher temperature than that for the Hydrolysis Stage. It would be understood that the temperatures described herein applicable to the Oil Finishing Stage could be varied without departing significantly from the principles of the present invention. For example, the Oil Finishing Stage can be effectively carried out in the temperature range about 300-525° C., as well as in the range 400-600° C. In some embodiments, the temperature of the Oil Finishing Stage reactor is between about 400° C. and about 510° C.

Furthermore, in at least one embodiment, the Oil Finishing Stage reactor is slightly pressurized, to a pressure between about 15 psig and about 70 psig, i.e., from about 15 psi above atmospheric pressure, to about 70 psi above atmospheric pressure. Preferably the pressure in the Oil Finishing Stage reactor is lower than that in the Hydrolysis Stage reactor.

Any carbon solids 142 that are generated from the. Oil Finishing Stage are typically first passed to a carbon solids cooler 630 wherein the carbon is permitted to lose its residual heat. After cooling, the carbon solids 142 are passed to carbon storage 540 and may be sold for a number of useful applications. For example, the carbon may be sold as a "soil amendment" for use in domestic horticulture because many of the bacteria in soil need a source of carbon. In particular, the carbon that is produced is of a quality similar to many forms of "activated carbon" and thus may also find application as a material for absorbing vapor emissions in automobiles, or for use in domestic water filters. Additionally the carbon, because of its level of purity, may find application as a solid fuel, like coal, but without the disadvantage of producing noxious emissions arising from combustion of the contaminants typically found in coal products. Also, many environmental toxicants can be neutralized in a soil matrix by the use of a carbon additive like the carbon solids that results from the process of the present invention.

Instead of, or in addition to carbon solids 142, a useful product generated by the process of the present invention can be clean coal. Clean coal is generated when the raw feed is raw coal. It has been found that coal fines produced by the process of the present invention are advantageously freer of sulfur- and chlorine-containing contaminants than raw coal typically available. These properties of the coal generated by the process of the present invention makes them particularly attractive as sources of clean-burning fuel.

The mixture of hydrocarbon vapor and gases 148 produced by the Oil Finishing Stage reactor is typically directed to a cooler/condenser 850 which separates the mixture into fuel-gas 146 and a hydrocarbon oil 144. The fuel-gas 146 has calorific value and may itself be redistributed internally within the process of the present invention for the purposes of providing energy for heating at various stages or can be used to produce electrical or other forms of energy for external or internal use. The oil 144 typically comprises hydrocarbons whose carbon chains have 20 or fewer carbon atoms. In this respect the mixture resembles the lighter components of a fuel-oil such as a #2 grade diesel oil. Such a product is also commercially saleable. It is to be understood, however, that the precise composition of the oil 144 depends upon the feedstock, and also upon the reaction conditions of the Oil Finishing Stage. Thus the oil may comprise paraffins, α-olefins, and aromatics, as well as saturated aliphatic hydrocarbons. For example, the composition of the oil obtained when the feedstock is composed of tires is different from the composition obtained when the feedstock is turkey offal. It has been found that the oil resulting from feedstocks that have a high fat content is rich in olefins, and di-olefins. If not desired, such olefins may be removed from the oil by resaturation or by various separation methods familiar to one of ordinary skill in the art.

When the raw feedstock is tires, it has been found that the final stage oil obtained from hydrocarbon oil 144—in this case tire-derived hydrocarbons—is a superior solvent for tires as compared to other solvents presently utilized in the art. Following a general principle of chemistry that "like dissolves like", since the final stage oil comes ultimately from the tires, its chemical nature is similar to the original tires and so it is a good solvent for them. When the raw feed used with the process of the present invention comprises tires, at least some of the tire-derived hydrocarbons are redirected to the input raw feed to assist with dissolving it prior to or during the preparation of a slurry. Typically the tire-derived hydrocarbons have a boiling range of about 100° C. to about 350° C. In a preferred embodiment, the tire-derived hydrocarbons are heated prior to application to the tires. In another embodiment, the tire-derived hydrocarbons are applied to the tires and the mixture is heated to a temperature between about 200° C. and 350° C. The use of the final stage oil product eliminates the recurring costs of other solvents, and make-up quantities thereof.

In various embodiments of the present invention, the entire spectrum of constituents of the final stage oil, or only a portion of these constituents, are used to dissolve tires. Preferably all of the tire-derived hydrocarbons are redirected to the input raw feed. In another embodiment, only the final stage heavy oil product is redirected in this manner. If a portion of constituents is used, the separation of the solvent into parts can take place during either final stage processing or the 1st stage processing. The use of the final oil product as a solvent makes the process of the present invention far more economic than other approaches. Because this oil will ordinarily not be available for the first batch of tires to be processed on any given occasion, another solvent may additionally be employed to assist with initial breakdown of the tires. Such a solvent is toluene; others are known to one of ordinary skill in the art.

When the raw feed is municipal sewage sludge, it is preferable to facilitate the separation of the organic from the inorganic materials. Accordingly, in a preferred embodiment, some of the hydrocarbon oil 144, in this case bio-derived hydrocarbons, are redirected to the raw feed or the product of the Hydrolysis Stage, in order to assist with floating the material. In other embodiments, materials such as trap grease, as are obtained from fast food outlets for example, can be used. The principle behind floating the material is that a material that is lighter than water is introduced to the raw feed, or the product of the Hydrolysis Stage, to assist with floating the heavier than water organic materials, thereby facilitating the separation of organic from inorganic materials. The result is a sludge that is easier to centrifuge than would otherwise be the case.

A further advantage of the process of the present invention is that all of the products are DNA and pathogen-free. That is, they are free of pathological materials that are derived from animal cells, bacteria, viruses, or prions. Such materials do not survive the process of the present invention intact. This is an important outcome because there is no risk of using any of the products of the process of the present invention in agricultural applications where there would be a danger that such molecules could re-enter the food-chain.

An apparatus for converting reacted liquid product from the separation stage, such as an organic liquor, into a mixture of hydrocarbons, and carbon solids, is a suitable Oil Finishing Stage reactor for use with the process of the present invention.

Figure 6:
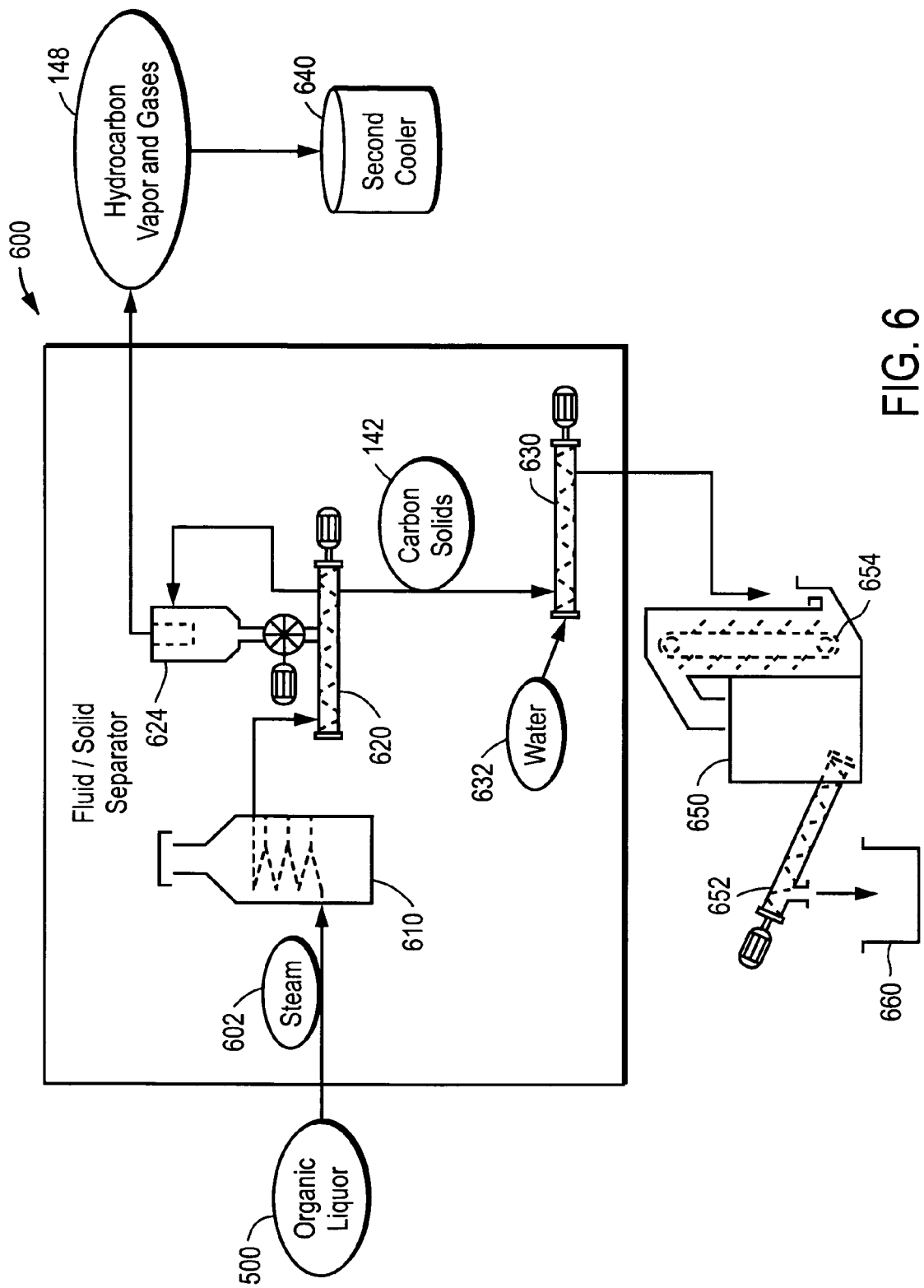
FIG. 6 shows an apparatus for carrying out an Oil Finishing Stage of the process of the present invention.

As shown in FIG. 6, a preferred Oil Finishing Stage reactor 600 according to an embodiment of the present invention comprises a heater 610 for heating the organic liquor, thereby producing a mixture of liquid and vaporized oil; a reactor 620 for converting the mixture of liquid and vaporized oil into carbon solids 142, and a mixture of hydrocarbon vapor and gases 148; a first cooler 630 for accepting the carbon solids 142; and a second cooler 640 for accepting the hydrocarbon vapor and gases. Oil Finishing Stage reactor 600 may additionally comprise a fluid-solid separator 624 communicating with reactor 620 for separating hydrocarbon vapor and gases 148 from carbon solids 142.

The heater 610 is preferably efficient and compact, comprising a large number of internal tubes that give rise to a large surface area for heat exchange. The heater 610 is typically a "fired heater". Heater 610 typically has an inlet for accepting organic liquor and steam 602, and an outlet for directing heated organic liquor/steam mixture to reactor 620. Steam 602 in an amount approximately 2-5% by weight accompanies the organic liquor as it enters heater 610. Such a quantity of steam helps uniform heating and prevents residue build-up on the inside of the heater. In a preferred embodiment, one or more pre-heaters are used to heat organic liquor 500 prior to mixing it with steam and/or transferring it to heater 610. Pressure for the Oil Finishing Stage is imparted by a pump system after storage 500.

Reactor 620 preferably comprises at least one heated auger, and has and inlet and an outlet configured, respectively, to accept a heated mixture of liquid and vaporized oil from heater 610, and to direct carbon solids and a mixture of hydrocarbons and gases into a fluid-solid separator. The heated mixture of liquid and vaporized oil with steam is passed into the reactor 620 where it splits into carbon solids, and a mixture of hydrocarbon gases that preferably contains constituents of oil and fuel gas. Typically, the carbon solids produced amount to about 10% by weight of the mixture of liquid and vaporized oil. In other embodiments, depending upon the constituents of the raw feedstock, the carbon solids produced are between about 5% and about 20% by weight of the mixture of liquid and vaporized oil. In some embodiments of the present invention, to avoid build up of excess carbon solids in reactor 620, the amount of feedstock processed is adjusted.

An auger is suitable for producing carbon solids and a mixture of hydrocarbons because it permits control of residence time and temperature of the incoming organic liquor, and because it permits efficient separation of the carbon solids and the volatile products. Preferably the dimensions of the auger are selected so that the purity of the resulting hydrocarbon mixture and the carbon solids is optimized. For example, the cross-sectional diameter of the auger principally determines the rate of flow of vapors through it. Preferably the rate of flow is not so high that dust is carried through with the vapors to produce an impure hydrocarbon mixture. The residence time of the heated mixture of organic liquor, vapors and steam, as it reacts, also determines the size of the auger. Preferably, the Oil Finishing Stage reactor is able to process at least 1,000 tons of organic liquor per day.

Preferably the Oil Finishing Stage reactor 600 includes a fluid-solid separator that communicates with the outlet of the reactor 620. The fluid-solid separator preferably has a first outlet for hydrocarbons and gases, and a second outlet for carbon solids. Some of the fuel gas from the mixture of hydrocarbons and gases is preferably redirected back to heater 610 and burned to help maintain the temperature in the heater, thereby promoting overall efficiency of the process of the present invention.

The carbon solids—often at a temperature as high as about 500° C.—are directed into a first cooler, carbon solids cooler 630, which is preferably a cooling auger which communicates with the reactor through an air lock device, or optionally the fluid-solid separator. In some embodiments of the present invention, more than one cooling auger 630 may be employed. It is preferable to introduce water 632 into carbon solids cooler 630 to assist with the cooling process. The carbon solids are transferred to a finished product storage system 650, optionally via a transfer auger or some other conveyancing device such as a bucket elevator 654 or to another heater/reactor to activate the carbon solids.

The second cooler 640 for accepting the mixture of hydrocarbon vapor and gases preferably comprises a carbon particulate separator for separating out any residual carbon solids and returning them to reactor 620.

The preferred Oil Finishing Stage reactor in FIG. 6 is advantageous because the augur permits the thermal cracking of the hydrocarbons of the heated organic liquor to be carried out continuously, without the attendant build-up of carbon solids that is normally associated with cracking. Other devices, such as 'delayed cokers' used in petrochemical refining, are known to one of ordinary skill in the art to accomplish thermal cracking of hydrocarbons and achieve cracking on a much larger scale than the reactor of FIG. 6, but accompany cracking with a build-up of carbon solids on the insides of the reactor walls. This build-up needs to be removed periodically, requiring either significant down-time or even replacement of a reactor vessel. Nevertheless, such apparatuses could be considered viable to achieve the Oil Finishing Stage reaction of the present invention, depending upon the prevailing economic conditions. A delayed coker would generate a different distribution of products from the reactor of FIG. 6. For example, a delayed coker will initially decarboxylate fatty acid molecules to give hydrocarbons which will then be cracked further to give shorter chain hydrocarbons.

In addition to a delayed coker apparatus, the Oil Finishing Stage reaction of the present invention can also be accomplished with other apparatuses suitably adapted therefor. Examples of suitable apparatuses and processes can be found in *Chemistry of Petrochemical Processes*, 2nd Ed., S. Matar and L. F. Hatch, (Gulf Professional Publishing, 2001), in particular at Chapter 3. Suitable processes are typically of two types, thermal, such as is achieved with a hydrotreater, or catalytic, such as is achieved with a fluidized catalytic cracker.

Thermal conversion processes include, principally, coking processes, viscosity breaking, and steam cracking. Coking processes are typically applied to heavier fractions, such as those with high asphaltene contents. Coking processes produce hydrocarbon gases, predominantly of a highly unsaturated nature, cracked naphtha, middle distillates, and coke. The gas and liquid components are typically subjected to hydrotreatment to saturate and desulfurize the various products. The basic reactions that underly thermal cracking are based on homolytic fission of carbon-carbon bonds to produce pairs of alkyl radicals. Each alkyl radical tends either to crack further, yielding an alkene, or to abstract a hydrogen atom from another hydrocarbon, thereby producing another akyl radical. The reaction products, overall, tend not to be branched hydrocarbons, mainly because the alkyl radicals themselves do not isomerize.

There are two principal types of thermal cracking processes: delayed coking and fluid coking. In delayed coking, the reactor system has a short contact-time heater coupled to a large drum which soaks batches of preheated feed. Vapors from the top of the drum are diverted to a fractionator for separation into gases, naphtha, kerosine, and gas oil. Operating conditions are typically 25-30 psi at 480-500° C. Improved yield of liquid product can be obtained by operating at lower pressures such as 15 psi. High temperature conditions produce more coke and gas but less liquid product. Although coke quality is ultimately determined by the quality of the feed, it may also be subject to variations in drum size, heating rate, soak time, pressure, and final reaction temperature. When the drum fills with coke, flow of batch feed is diverted to a second drum, so that the first drum can be emptied, or 'decoked'. Typically decoking a drum can be achieved with a system of hydraulic jets that direct water of at least 3,000 psi pressure into the coke. One of ordinary skill in the art is capable of implementing a delayed coker apparatus for carrying out the Oil Finishing Stage reaction of the present invention.

In fluid coking, coke produced is used to fuel the cracking reaction. Fluid coke is produced by spraying the hot feed on previously-formed coke particles in a fluidized-bed reactor. The reactor temperature is typically 520° C. This process has a principal drawback that ti does not reduce the sulfur content of the coke. A variant of fluid coking, known as 'Flexicoking', is preferred because it employs coke gasification in conjunction with fluid coking. Implementation of both a fluid coking and a flexicoking apparatus for performing the Oil Finishing Stage reaction of the present invention is within the ability of one of ordinary skill in the art.

Viscosity breaking is a mild process applied to thermally crack highly viscose feedstocks, such as those that contain waxy materials, to form less viscous product mixtures. Typically, viscosity breaking uses a temperature of 450° C. and short heating times. It would usefully be employed in the present invention in situations where the organic liquor from the separation stage is particularly viscous.

Catalytic processes for converting mixtures of hydrocarbons include many different processes familiar to one of ordinary skill in the art. Examples include catalytic reforming (especially as applied to naphtha), catalytic cracking, hydrocracking, hydrodealkylation, isomerization, alkylation, and polymerization. Some hydrotreatment processes, also referred to herein, employ one or more catalysts. Each of these catalytic processes, and apparatuses therefor, can be adapted by one of ordinary skill in the art to accomplish the Oil Finishing Stage reaction of the instant invention.

Catalytic cracking is particularly suited to carrying out the Oil Finishing Stage reaction of the present invention. Catalytic cracking cracks lower value stocks to produce higher-value light and middle distillates, as well as light hydrocarbon gases. Typical catalysts employed in catalytic cracking are synthetic amorphous silica-alumina, with or without zeolites. Since these catalysts promote isomerization reactions to form carbonium ion during the reactions, and since carbonium ions tend to undergo rapid spontaneous rearrangements, but are also longer-lived and are therefore more selective in their reactivity, the product distribution tends to have more branched hydrocarbons and fewer unsaturated products than those obtained from thermal cracking. This is beneficial, because branched products tend to improve the octane number of the hydrocarbon mixture produced, and because saturated products tend to be more stable than their unsaturated counterparts.

Catalytic cracking typically employs a fluid bed or, less commonly, a moving bed. In a fluidized bed process, preheated feed enters a reactor accompanied by hot regenerated catalyst. The catalyst is employed as a highly porous powder. Conditions in the reactor are typically 450-520° C., and a pressure of approximately 10-20 psig. Fluidized catalytic crackers typically produce light ($C_3$-$C_5$) unsaturated hydrocarbons, gasolines with high octane numbers, gas oils, and tar. Gas and gasoline yields are improved by applying higher temperatures, longer residence times, and higher catalyst/oil ratio. It is also consistent with the present invention that the Oil Finishing Stage can be accomplished with 'deep catalytic cracking'. This method is advantageous because it produces a high yield of light unsaturated hydrocarbons.

In moving bed processes, the catalyst is in the form of hot beads that descend by gravity through the feed into a catalyst regeneration zone. This method produces a mixture of saturated and unsaturated light hydrocarbon gases, and a gasoline product that is rich in aromatics and branched paraffins.

Additionally, the Oil Finishing Stage reaction of the present invention can employ a hydrocracking process, which is essentially catalytic cracking in the presence of hydrogen. This process gives predominantly saturated hydrocarbon products.

Still other methods for achieving the Oil Finishing Stage reaction of the present invention have been described in "Liquid hydrocarbon fules from biomass", D. C. Elliott, and G. F. Schiefelbein, *Amer. Chem. Soc. Div. Fuel. Chem. Preprints*, 34, 1160-1166, (1989).

A modified version of the process of the present invention can be used to inject steam into underground tar-sands deposits and then refine the deposits into light oils at the surface, making this abundant, difficult-to-access resource far more available. Experiments also indicate that the process of the present invention can extract sulfur, mercury, naptha and olefin—all saleable commodities—from coal, thereby making the coal burn hotter and cleaner. Pre-treating via the process of the present invention also makes some coals more friable, so less energy is needed to crush them prior to combustion in electricity-generating plants.

Figure 7:
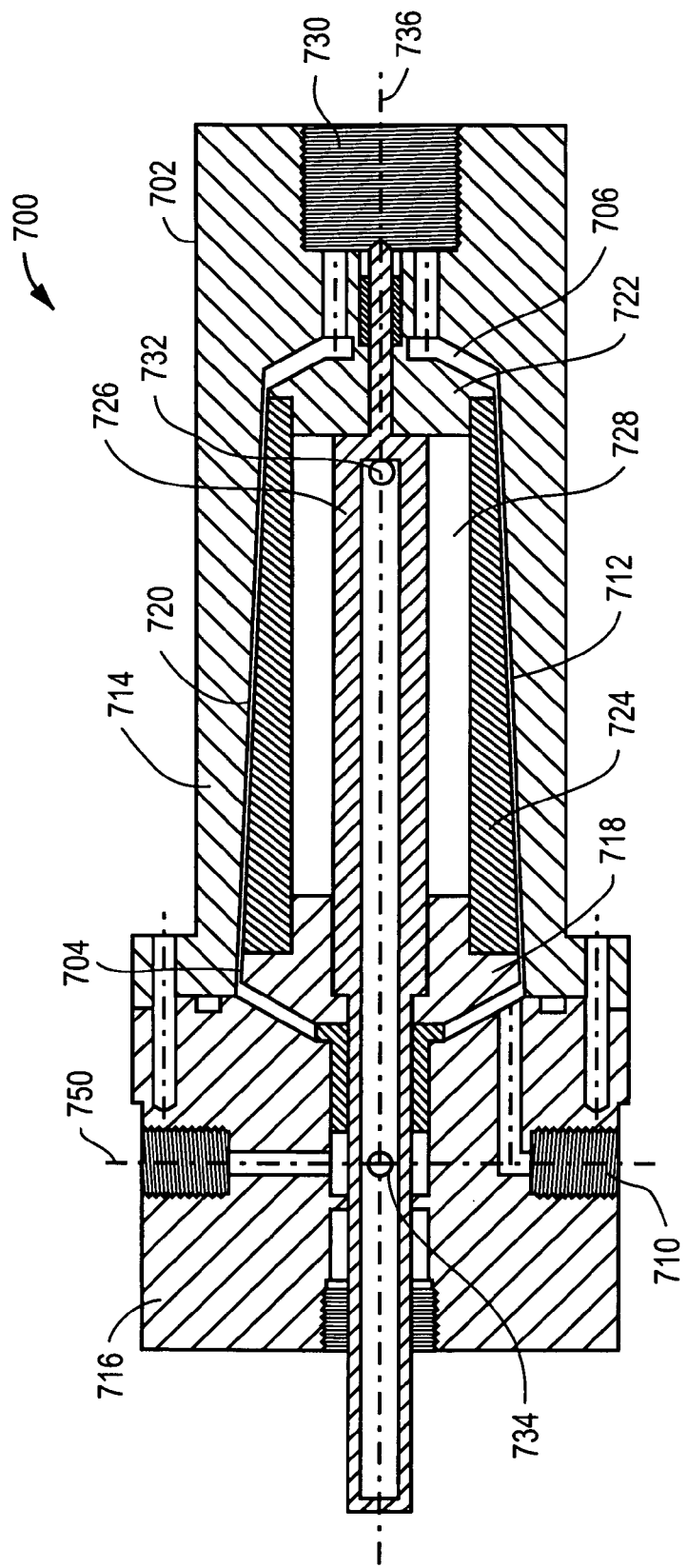
FIG. 7 shows an apparatus for separating fine suspended solids from a fluid.

For some feedstocks, the process of the present invention employs a device for separating fine suspended solids from a fluid as part of the feed preparation stage. In addition, many other industrial and commercial applications require suspended solids to be separated from a liquid. FIG. 7 illustrates a separating device 700 according to a preferred embodiment of the invention that is useful for such separations. Another example of an application requiring the separation of a solid suspension is the separation of red and white blood cells from whole blood. When the size of the suspended solid particles is large, or their density is significantly different from that of the fluid, there are many different types of apparatus that can separate them. For example, filters of many different configurations with openings smaller than the suspended solid particles can be used for solid material that does not deform significantly under strain. Clarifiers, settling chambers, and simple cyclones can be used effectively when there is a significant density difference between the solid particles and the fluid. As the size or density difference become smaller, active devices using centrifugal forces can be effective. However, the efficiency of all these separating devices decreases dramatically for very small particle sizes with deformable material that has a density only slightly different from that of the suspending fluid.

With respect to a preferred process of the present invention, one application where the suspended solids are small, deformable, and have small density difference is municipal sewage sludge (MSS). The suspended material in MSS consists primarily of cellular material and cellular debris from bacteria and typically has dimensions of about 1 micrometer. This material is deformable and has an effective density within 10% of that of the suspending water medium. Separating this solid material from water is a preferred step in preparing MSS as a feedstock for the process of the present invention. Such separation may be achieved through use of centrifuges; however, in a preferred embodiment, separating device 700 is employed.

According to a preferred embodiment of the present invention, it is preferable to employ separating device 700, as illustrated in FIG. 7, for separating solid and liquid components of a raw feed such as MSS, prior to further processing by the methods of the present invention. Such a device may also be applied to other industrial or commercial wastewater sludges whose solid particulates are deformable, or whose effective density is within about 10% of that of the liquid phase.

Device 700 preferably comprises a housing 702 that contains a spinning assembly 704 mounted in an inner chamber 706 having a frusto-conical shape. The shape of inner chamber 706 typically comprises a frusto-conical section that has an angle of taper, with additional sections at the base and/or at the top of the frustum that house other parts of spinning assembly 704. The housing 702 preferably comprises a spinner case bottom 714 and a spinner case top 716 that are joined to one another, and that enclose the spinning assembly 704. Separating device 700 further comprises an inlet 710 and a first outlet 730 that communicate with the inner chamber, and a second outlet 750. Inlet 710 permits introduction of the fluid that contains the suspended solids into an annular space 712 between a stationary inner wall 720 of the inner chamber, and the spinning assembly.

The spinning assembly comprises a frusto-conically shaped cylinder with a hollow interior, which is preferably made from a spinner bottom 722, connected to a tapered cylindrical wall 724 which itself is connected to a spinner top 718. The spinning assembly is concentrically mounted on a longitudinal axis 736 of a hollow spindle 726 which rotates at speeds typically in the range about 1,000 r.p.m. to about 50,000 r.p.m. In a preferred embodiment for separation of MSS, the rotation speed is about 10,000 r.p.m. Preferably the rotation speed is chosen so as to minimize chaotic flow. The spinning assembly is tapered so that the effective cross-sectional area decreases as the width narrows. Typically the angle of taper is between about 1° and about 10°. In a preferred embodiment, the angle of taper is between about 2° and about 2.5°, and is even more preferably about 2.25°. The hollow interior of the spinning assembly communicates with a second outlet 750.

Preferably there is a pressure differential between the inlet 710 and the interior of the separator device 700. Typically, this pressure differential is between about 3-150 p.s.i. and is controlled by two pumps (not shown in FIG. 7).

The flow rate for different sized separators will scale with the surface area of the rotating cylinder. Preferably, the inlet and the annular gap are configured to provide a flow rate between about 1 and about 200 gallons per minute. More preferably, the flow rate is between about 1 and about 20 gallons per minute. Even more preferably for handling MSS, the flow rate is about 10 gallons per minute.

The wall 724 of the spinning assembly is perforated. The pore size in the wall 724 is typically between about 1 and about 200 micrometers. Preferably, the pore size is about 50 micrometers. The wall 724 is preferably made of a plastic material such as HDPE or any other material that is not hygroscopic, to avoid closure of the pores during operation.

The fluid and suspended material flow along the annular passage 712 in a generally axial direction while a portion of the fluid flows through the perforated rotating wall 724 into the hollow interior 728 of the cylinder. Hollow interior 728 communicates with hollow spindle 726 through spindle inlet 732. Most of the suspended particles are prevented from flowing with the fluid through the perforated cylinder due to shear and centrifugal forces at the surface of the rotating cylinder. The rotational speed of the cylinder effectively sets the shear and centrifugal forces on the suspended particles, and so can be used to control the minimum size of the particle that can be prevented from following the fluid through the perforated cylinder. The water and particles that flow into the interior of the cylinder 728 subsequently flow through spindle inlet 732 into the center of hollow spindle 726, and flow towards spindle outlet 734 before being discharged through a second outlet 750.

The material in the annular passage 712 follows a tight spiral flow path in response to the motion of the rotating cylinder. Preferably the thickness of annular passage 712 is constant along its length. For some applications this annular space may vary from top to bottom. Variations in annular space can impart flow conditions near the perforated spinner surface. A first outlet 730 for discharging the now concentrated fluid stream is provided at the end of the annular passage away from the entrance.

The operation of the device of FIG. 7 is preferably orientation-independent. In a preferred embodiment, the axis of the tapered cylinder is oriented vertically with the first outlet 730 at the bottom.

An advantage of the device of FIG. 7 over other separation devices known in the art is that it can process sludges with a wide range of particle characteristics, in particular including those with deformable suspended solids in the size range below 1 micrometer or those that have densities within 10% of the suspending fluid. In a preferred embodiment, the annular gap and the pore size in wall 724 are configured for separating a suspension of municipal sewage sludge. In some embodiments of the process of the present invention, many such separators are used, in parallel, to achieve high throughput separation of a raw feedstock.

It is to be understood that the separator 700 depicted in FIG. 7 is not drawn precisely to scale, though the various elements are in approximate proportion to one another. Thus, separator 700 may be constructed according to ordinary principles familiar to one of ordinary skill in the art of mechanical engineering and design.

In a preferred embodiment, the outer diameter of spinner bottom 722 is about 2", and the outer diameter of the spinner top 718 is about 2.2". The preferred length of spinner case bottom 714 is between about 7" and about 8". The preferred length of spinner wall 724 is between about 4" and about 6", and its preferred thickness is preferably constant along its length and is about 1.5". The preferred diameter of outlet 730 in conjunction with such a spinner is about 0.8" and the outer diameter of the spinner case bottom is preferably about 3". The outer diameter of spinner case top is then preferably about 4". Spindle 726 is hollow and preferably has an inside diameter of about 0.25". The outside diameter of spindle 726 may vary along its length and may be between about 0.5" and about 0.75". The distance between spindle inlet 732 and spindle outlet 734 may be about 6" in such an embodiment. The thickness of annular passage 712 is preferably about 0.05 to about 0.50 inches.

The preferred dimensions presented herein are to be taken as but one illustration, and, according to design choice and desired throughput, a mechanical engineer of ordinary skill in the art would be able to scale up or down the size of the various elements of separator 700 in order to achieve operating efficiency.

The overall apparatus for carrying out the process of the present invention is preferably accompanied by a computerized control system that comprises simple controllers for valves, pumps, and temperatures. Development of such a system is within the capability of one of ordinary skill in the art of computer process control engineering.

The apparatus of the present invention may be scaled according to need. For example, plants that handle many thousands of tons of waste per day can be envisioned, whereas portable plants that could be transported on the back of a flatbed truck and that might only handle one ton of waste per day can also be built.

The following examples are provided to illustrate methods and materials of the present invention, but not to limit the claimed invention.

EXAMPLES

Example 1

Pilot Plant—Shredder Residue Processing

A pilot plant has been built employing apparatus and processes of the present invention.

According to one exemplary application of the pilot plant, the experimental feedstock was shredder residue. Of the 3000 lbs. of SR material received for this pilot run, 1072 lbs of dirt/fines was removed and washed with hot water, 715.5 lbs of fines-free SR were processed through the depolymerization unit, and 1212.5 lbs of fines-free SR were held back for future testing. The fines-free SR material was processed through the depolymerization unit along with 79.5 lbs of shredded tires and about 1741 lbs of used motor oil. Samples of the various products were sent out for analysis to determine the fate of heavy metals and of contaminants such as PCBs and chlorine.

Based on results from comparative sample analyses, PCBs were found to be reduced by an order of magnitude, from 35-65 ppm down to less than 2 ppm.

Thermal cracking of this hydrolyzed oil was performed in bench-scale reactors to simulate a typical oil refinery process for making transportation fuels. The hydrolyzed oil produced by the process of the invention was cracked at temperatures near 500° C., similar to temperatures used in a delayed coker in an oil refinery. The products produced were hydrocarbon fuels, a fuel-gas, and a solid carbon product. The distribution of fuel/gas/carbon fractions was 84%, 10%, and 6%, respectively. This cracking generated gasoline, diesel, and residual-weight hydrocarbon oils. The distribution of products from the cracking was: gasoline (12%); kerosene (38%); diesel (32%); heavy-oil (15%); and gas (3%).

A sample was removed from the original 3000 lbs. of SR material for initial testing. To improve material handling of the SR, the remaining SR was then screened through a 1/16" vibrating screen to remove dirt and fines. The SR material contained about 1072 lbs. of dirt and fines, constituting approximately 36% of the total sample and 1½ times the amount anticipated from initial sample analysis.

The dirt and fines removed by screening were washed with hot water and sent for PCB analysis. A portion of the remaining fines-free material was processed through the pilot-scale depolymerization unit. Another portion was stored for future testing. An amount of 715.5 lbs. of fines-free SR material was put into the depolymerization unit.

Depolymerization

Feedstock for the depolymerization tests consisted of 715.5 lbs of fines-free SR, which was co-processed with 79.5 lbs of waste tires and 1,741 lbs of low-value oil. This was processed into a gel and a heavy oil/solids matrix using a depolymerization unit comprised of a 75-gallon vessel capable of operation at temperatures up to 340° C. (650° F.) and pressures up to 100 psig. To offset the restriction on maximum operating temperature to 300° C. (572° F.) from the particular equipment configuration employed in the pilot tests and hot oil system operating temperature, the residence time of the runs was increased to fit within an 8-hour day. At higher temperatures, the depolymerization process typically takes less than one hour.

The heavy oil/solids matrix was washed using diesel fuel as a convenient solvent yielding a 55:45 ratio of extractable gel and unconverted solid material. This extractable gel was combined with the easily removed gel from the depolymerization unit and used as the feedstock for the hydrolysis step. Of the 2,536 lbs of SR-tires-oil feedstock that were processed in the depolymerization unit, 1,925 lbs were converted to a low-ash gel. Those of ordinary skill in the art will appreciate that the amount of gel generated from the process described will vary due to a number of factors, e.g. test duration and the amount of inorganics in the raw feed, etc. There were approximately 113 lbs of overhead vapors and about 343 lbs of unconvertible solids.

As previously noted, 1741 lbs. of low-value oil was also circulated through the SR/tire feedstock entering the depolymerization unit so as to significantly increase the heat transfer rate to the SR/tires and speed up the heating process. Although waste motor oil was used in this instance, any oil with a low vapor pressure, including recycled oil generated from the process of the present invention, can be employed for the same purpose. To further enhance the organic fraction of the feedstock and the final oil yield, waste tires were added to the SR sample for their high organic content.

At the end of the depolymerization process, water and gas from the unit were flashed to atmospheric pressure. The unit was cooled to 200° F. before transferring the depolymerized SR to a storage tank. The solid metal and inorganic objects retained in the depolymerization unit were removed after the liquid has been drained.

Hydrolysis

A portable tank and low-flow, high-temperature positive displacement pump were used to feed depolymerized SR to two hydrolysis reactors. The reactors were connected to a receiving tank through the existing pilot plant pressure letdown control valve. Steam from the hydrolysis reactors was condensed and sent to a condensate tank. The hydrolysis runs processed a portion of the depolymerization product. About 800 lbs of depolymerized SR/tires/oil, along with 800 lbs of waste motor oil to add fluidity to the cold depolymerization product, and 900 lbs of water were processed through the hydrolysis step at a rate of 3 lb/minute. The mixture was subjected to temperatures with the range from about 440° F. to about 500° F. After hydrolysis, the oil from the shredder residue was flashed and stored in a flash tank. Post-hydrolysis processing included solid/liquid separation to remove residual solids objects such as wood chips, and liquid/liquid separation to remove oil from water. Centrifuges were used for these separations.

The nearly complete removal of chloride, bromide, and PCBs from the SR/tire feedstock in hydrolysis is shown in the tables below. This shows that the produced oil, and any refined products from this oil, will be virtually free of undesirable PCBs, chlorides, or other halides.

| HEAVY METALS | SR Feed | Depolymerized Gel | Hydrolysis Oil* |
|---|---|---|---|
| Arsenic (total) | 13 | ND | ND/ND |
| Barium | 370 | 58 | 13/4.7 |
| Cadmium (total) | 13 | 5.5 | 2.7/ND |
| Chromium | 94 | 4.5 | ND/6.1 |
| Copper | 4167 | 58 | 36/36 |
| Iron | — | 1000 | 560/1200 |
| Lead | 740 | 58 | 13/29 |
| Mercury | 1.23 | 0.21 | 0.16/ND |
| Nickel | — | ND | ND/ND |
| Selenium | ND | ND | ND/ND |
| Silver | ND | ND | ND/ND |
| Zinc | 5233 | 850 | 870/760 |

| HALIDES & PCBs | SR Feed | Depolymerized Gel | Hydrolysis Oil |
|---|---|---|---|
| Bromine | 94 | 133 | ND/ND |
| Chlorine | — | 3200 | 209/118 |
| PCBs | 22 | 31 | ND/ND |

Separation

A decanter and a liquid-liquid centrifuge were used for the post-hydrolysis separation step.

Thermal Cracking

Figure 12:
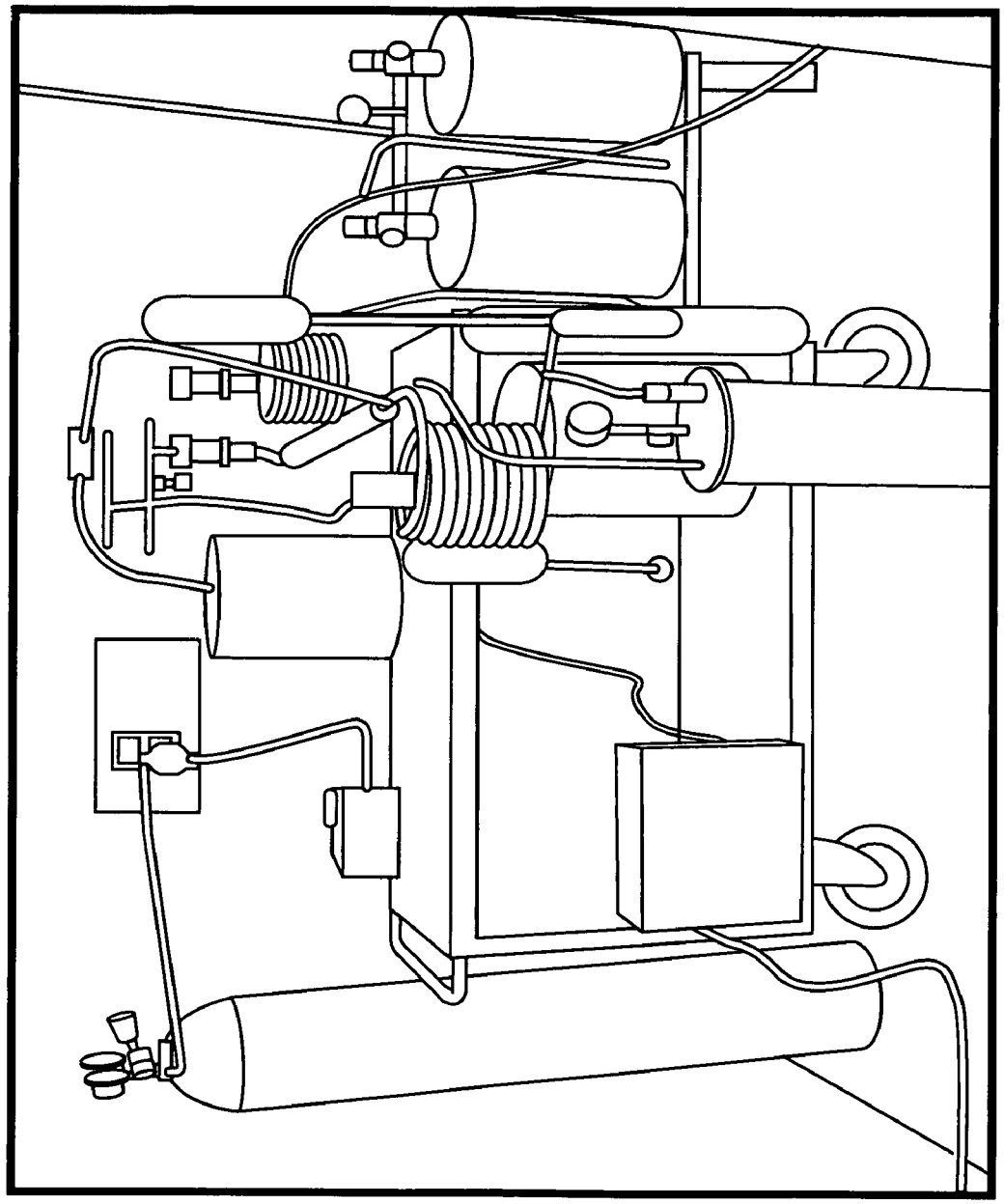
FIG. 12 depicts a bench-scale test apparatus used for the present invention.
Figure 13:
FIG. 13 depicts a shredder residue sample.

Approximately 10 liters of hydrolyzed oil from SR was thermally cracked in a bench-scale reactor at temperatures near 500° C. (932° F.) in 6 runs to produce hydrocarbon oil, a fuel-gas, and a solid carbon product. A photograph of the bench-scale thermal cracking unit is shown in FIG. 12. Gas and oil vapor were vented during the reaction in order to maintain a target pressure. The run was terminated when gas evolution stopped, as indicated by a constant gas pressure. The distribution of oils/gas/carbon fractions from the thermal cracker was 84%, 10%, and 6%, respectively. The distillation of the TCP cracked oil yielded 12% light distillate fuel, 38% middle distillate, 32% diesel, and 15% heavy fuel oil with 3% of the feed as non-condensable gases.

| Distillation Cut | Industrial Uses | Temp Range |
|---|---|---|
| Light Distillate | Gasoline; motor fuel | 122-302° F. |
| Middle Distillate | Kerosene; jet fuel | 302-482° F. |
| Diesel | Diesel fuel; heating oil | 482-644° F. |
| Heavy Fuel Oil | Industrial fuel | 644-676° F. |

TCP Liquid Fuels

The chemical and physical characteristics of TCP hydrolysis oil are listed in Table 1 below. The TCP cracked oil product is a renewable diesel similar to conventional diesel fuel. This renewable diesel can be used for a variety of purposes, e.g. as a direct replacement for diesel fuel or as a blending component for diesel fuel. The TCP cracked oil can be further distilled into gasoline and other fractions. The chemical and physical characteristics of the TCP cracked oil are listed in Table 2.

TABLE 1

TCP hydrolysis oil characteristics from SR feedstock.
TCP Hydrolysis Oil Characteristics

| Test | APS |
| --- | --- |
| Density @ 15 Deg. C. | 0.8818 |
| Distillation, IBP ° F. | — |
| Flash point, ° F. | 230 |
| Sulfur wt % | 0.245 |
| Cloud point, ° F. | — |
| Pour point | −16° F./−21° C. |
| Viscosity @ 40 C., cSt | 229.9 |
| Viscosity @ 100 C., cSt | 23.13 |
| Water & Sediment, Vol. % | 18 |
| Ash wt % | 0.076 |
| Carbon Residue, Wt % | — |
| Cetane Index | — |

TABLE 2

TCP renewable diesel characteristics from SR feedstock.
TCP Renewable Diesel Characteristics (not fractionated)

| Test | APS |
| --- | --- |
| Density @ 15 Deg. C. | 0.785 |
| Distillation, IBP ° F. | 96 |
| Flash point, ° F. | <72 |
| Sulfur wt % | 0.0625 |
| Cloud point, ° F. | Below −33° F. |
| Pour point | Below −33° F. |
| Viscosity @ 40 C., cSt | 1.00 |
| Viscosity @ 100 C., cSt | TBD |
| Water & Sediment, Vol. % | 0.2 |
| Ash Content wt % | <0.001 |
| Carbon Residue, Wt % | 0.35 |
| Cetane Index | 52.2 |

Example 2

Pilot Plant—Turkey processing

A pilot plant has been built employing apparatus and processes of the present invention. The pilot plant can handle approximately seven tons of waste per day.

According to one exemplary application of the pilot plant, the experimental feedstock was turkey processing-plant waste: feathers, bones, skin, blood, fat, viscera. An amount of 10,044 pounds of this material was put into the apparatus's Hydrolysis Stage: a 350-horsepower grinder, which turns the material into gray-brown slurry. From there, the material flowed into a series of tanks and pipes which heated and reformed the mixture.

Two hours later, a light-brown stream of steaming fine oil was produced. The oil produced by this process is very light. The longest carbon chains are $C_{20}$. The produced oil is similar to a mix of half fuel oil, half gasoline.

The process of the present invention has proved to be 85% energy efficient for complex feedstocks such as turkey offal. This means that for every 100 B.t.u. (British thermal units) in the feedstock entering the plant, only 15 B.t.u. are used to run the process. The efficiency is even better for relatively dry materials, such as carbon-heavy or moisture-light raw materials such as plastics.

The Hydrolysis Stage reactor, comprises a tank approximately 20 feet tall, three feet wide, and heavily insulated and wrapped with electric-heating coils. In the Hydrolysis Stage reactor, feedstock is hydrolyzed by means of heat and pressure. Both temperatures and pressures are not very extreme or energy-intensive to produce because water assists in conveying heat into the feedstock. It usually takes only about 15 minutes for this process to occur in the pilot plant.

After the organic materials are heated and partially depolymerized in the reactor vessel, a second stage begins. In this phase, the slurry is dropped to a lower pressure. The rapid depressurization instantly releases about half of the slurry's free water. Dehydration via depressurization is far more efficient than heating and boiling off the water, particularly because no heat is wasted. Water that is "flashed-off" is sent up a pipe that leads back to the beginning of the process to heat the incoming process stream.

In this second stage, the minerals settle out, and get shunted to storage tanks. In turkey waste, these minerals come mostly from bones. The minerals come out as a dried brown-colored powder that is rich in calcium and phosphorous. It can be used as a fertilizer because it is well-balanced in micro-nutrients. In particular it has a useful range of micro- and macro-nutrients. The minerals contain the correct amounts of elements such as calcium and phosphorous required for healthy plant growth and development.

In the pilot plant, the remaining concentrated organic materials flow into a Oil Finishing Stage reactor and is subjected to Oil Finishing Stage processing, as described hereinabove. Gases resulting from the processing were used on-site in the plant to heat the process of the present invention. The oil and carbon flow into storage as useful higher value products.

Depending on the feedstock and the first and Oil Finishing Stage processing times, the process of the present invention can make other specialty chemicals, which are extracted at various sections of the process. Turkey offal, for example, can make fatty acids for use in soap, tires, paints and lubricants.

Example 3

Operating Plant

A full-sized commercial-scale installation has been constructed with additional facilities in development. At peak capacity, the plant is designed to yield over 500 barrels of oil per day, some of which can be returned to the system to generate heat for powering the system. The oil produced is a high-quality oil of the same grade as a #2 heating oil. The plant produces about 21,000 gallons of water, which is clean enough to discharge into a municipal sewage system, and is also free of pathological vectors. The plant also will make about 25 tons of minerals, concentrate and carbon.

Example 4

Exemplary Conversions of Waste Materials

Table 1 shows end-products, and their proportions, for 100 lbs of each of the following waste material, when they are converted to useful materials using the process of the present invention: Municipal Sewage Waste (comprising 75% sewage sludge and 25% grease-trap waste); Tires; Poultry Processing Waste (comprising organs, bones, blood, feathers and fat); Plastic bottles (comprising a blend of Polyethylene Terephthalate (PET) used to make soda bottles, and High Density Polyethylene (HDPE) used to make milk jugs); Paper; Medical Waste (originates primarily from hospitals and comprises plastic syringes, transfusion bags, gauze, paper wrappers and wet wastes); and Heavy Oil (such as refinery-vacuum residues and tar sands). Amounts in Table 1 are in pounds.

TABLE 1

| Feedstock | Oil | Gas | Solids & Concentrate | Water |
|---|---|---|---|---|
| Municipal Sewage Sludge | 26 | 9 | 8 (carbon and mineral solids)† | 57 |
| Tires | 44 | 10 | 42 (carbon and metal solids) | 4 |
| Poultry Processing Waste | 39 | 6 | 5 (carbon and mineral solids) | 50 |
| Plastic bottles | 70 | 16 | 6 (carbon solids) | 8 |
| Paper‡ | 8 | 48 | 24 (carbon solids) | 20 |
| Medical Waste | 65 | 10 | 5 (carbon and metal solids) | 20 |
| Heavy Oil | 74 | 17 | 9 (carbon solids). | — |

‡For paper, the figures are based on pure cellulose; it is estimated that yields for specific paper feedstocks such as newspapers or office waste paper would be within 10% of these figures.
†The solid output from municipal sewage sludge may also contain heavy metals.

‡ For paper, the figures are based on pure cellulose; it is estimated that yields for specific paper feedstocks such as newspapers or office waste paper would be within 10% of these figures.

† The solid output from municipal sewage sludge may also contain heavy metals.

It is worth noting that the yields from cattle and pork processing wastes are similar to those from poultry processing waste.

Example 5

Removal of Contaminants from Coal Fines and High Sulfur Coal

Low detection mercury analysis was carried out on raw fines, high sulfur coal, and on the products of the process of the present invention applied to each. In each case the detection limit was 0.01 ppm. From coal fines raw feed, the mercury level was 0.12 ppm; mercury was not detectable in the processed carbon.

From high sulfur coal raw feed, the mercury level was 0.02 ppm; again, mercury was not detectable in the processed carbon.

Example 6

Removal of Sulfur Contaminants from Coal Fines

Unprocessed fines contained 1.71% sulfur. Composite carbon contained 1.58% sulfur, a 7.6% reduction from the unprocessed fines. Carbon produced by one application of the process of the present invention contained 1.51% sulfur, a 11.6% reduction from the raw feed.

Example 7

Removal of Sulfur Contaminants from High Sulfur Coal

Raw feed high sulfur coal contained 2.34% sulfur by weight. After one application of the process of the present invention, the resulting solid product contained 2.11% sulfur by weight.

Example 8

Removal of Contaminants from Low Sulfur Coal

Unprocessed coal contained 1.08% sulfur; carbon obtained from the process of the present invention contained 0.49% sulfur, a reduction of 54.6%. A very low concentration of sulfur (45 ppm) was also detected in produced water.

In another application of the process of the present invention to the same sample, carbon contained 0.57% sulfur, a reduction of 47.2%. The produced gas (the gas discharged from the process) from this application contained 0.9% sulfur by weight, thus illustrating that the sulfur driven off ends up largely in gaseous products.

It is significant that as much as about half of the sulfur-containing contaminants can be removed when the initial sulfur-content is already very low.

The process of the present invention is also effective at removing mercury. Mercury was essentially absent from carbon produced by the process of the present invention, where detection levels to about 10 ppb were possible. Mercury was detected in the produced water at levels of 30 ppb (0.028 ppm) demonstrating that when mercury is removed from coal, it is transferred to water. When the mercury is in the water, it is amenable to safe disposal. The water is stripped of hydrocarbons, and concentrated down by use of a vacuum distillation unit. The resulting mercury-concentrated water is subject to silicate crystallization and the resulting highly insoluble silicate crystals would be containerized and stored in a hazardous waste site rated for storage of toxic metals.

Example 9

Hydrolyzed Oil

Different compositions of oil can be produced from a wide range of organic materials using the process of the present invention. An exemplary fuel was produced using animal offal as feedstock and diverted from the process of the invention after the hydrolysis stage. Particulate emissions resulting from the use of this fuel is virtually negligible. This fuel provides refineries or blenders with a narrow range 40-plus American Petroleum Institute (API) renewable fuel that can be used either as an alternative fuel, or a blending component for combustible fuels. Salient properties of this fuel are shown in Table 2. Testing methods specified in the table are designated by an ASTM (American Society for Testing Materials) code.

TABLE 2

| Property | Testing Method | Hydrolyzed Oil |
|---|---|---|
| Moisture (%) | D95 | <0.10 |
| API Gravity at 60° F. | D1298 | 22.6 |
| Specific gravity at 60° F. | | 0.9182 |
| Sulfur (%) | D4294 | 0.15% |
| BTU per pound | | 16,407 |
| BTU per gallon | D240 | 125,447 |
| Ash (%) | D482 | 0.030% |
| Carbon Residue (%) | D524/D189 | 6.16% |
| Pour Point (OF) | D97 | 65° F. |
| Carbon (%) | D5291 | 74.01% |
| Hydrogen (%) | D5291 | 11.57% |
| Nitrogen (%) | D3228 | 1.03% |
| Oxygen (%) | D5291 | 13.21% |
| Asphaltenes (%) | D3279/IP143 | 0.96% |
| Viscosity @ 122° F. (mm$^2$/s) | D445 | 50.6 mm$^2$/s |
| Inorganic Chlorides (%) | D512 | 0.006% |
| Organic Chlorine (%) | | <0.005% |
| Metals in Ash | | |
| Aluminum (ppm) | D482 | <1.0 ppm |
| Magnesium (ppm) | | 1.04 ppm |
| Calcium (ppm) | | 1.60 ppm |

TABLE 2-continued

| | Testing Method | Hydrolyzed Oil |
|---|---|---|
| Silica (ppm) | | 36.5 ppm |
| Iron (ppm) | | 25.5 ppm |
| Sodium (ppm) | | 48.5 ppm |
| Vanadium (ppm) | | <1.0 ppm |

Example 10

Fuel Derived from Liquid Mixture

As previously mentioned, the liquid mixture produced by the method can be applied directly to use or in a concentrated form as a food, fertilizer, fuel, or other products. Properties of two exemplary liquid mixture-derived fuels of the invention are shown below in Table 3, wherein the testing methods are designated by an ASTM code (for standards designated with a "D" prefix) or AOAC code. Each fuel was produced from a sample of raw feed comprising animal manure, sludge, and byproducts of food manufacture and distribution.

TABLE 3

| Property | Testing Method | Liquid Mixture-Derived Fuel No. 1 | Liquid Mixture-Derived Fuel No. 2 | Liquid Mixture-Derived Fuel No. 3 |
|---|---|---|---|---|
| Ash Content | AOAC 923.03 (Agri) | 2.27% | 2.32% | 2.50% |
| Phosphorus Content | AOAC 958.01 | <0.02 Wt % | <0.02 Wt % | N/A |
| Sulfur Content | D1552 (CBNO) Sulfur | 0.25 Wt % | 0.30 Wt % | 0.30 Wt % |
| BTU/LB | D240 (CBNO) - LB | N/A High Moisture Sample | N/A High Moisture Sample | N/A High Moisture Sample |
| Carbon | D5291(CBNO) | 21.84 Wt % | 28.64 Wt % | 25.00 Wt % |
| Hydrogen | D5291 (CBNO) | 9.66 Wt % | 10.01 Wt % | 10.00 Wt % |
| Nitrogen | D5291 (CBNO) | 2.35 Wt % | 1.79 Wt % | 2.20 Wt % |
| Oxygen | D5291 - Oxygen | 59.59 Wt % | 51.70 Wt % | 60.00 Wt % |
| Moisture | | 62.4% | 67.6% | 65.0% |
| Volatile Matter | | Included in Moisture | Included in Moisture | |

Example 11

Embodiment of a Oil Finishing Stage Reactor and Cooler/Condenser

Figure 8A:
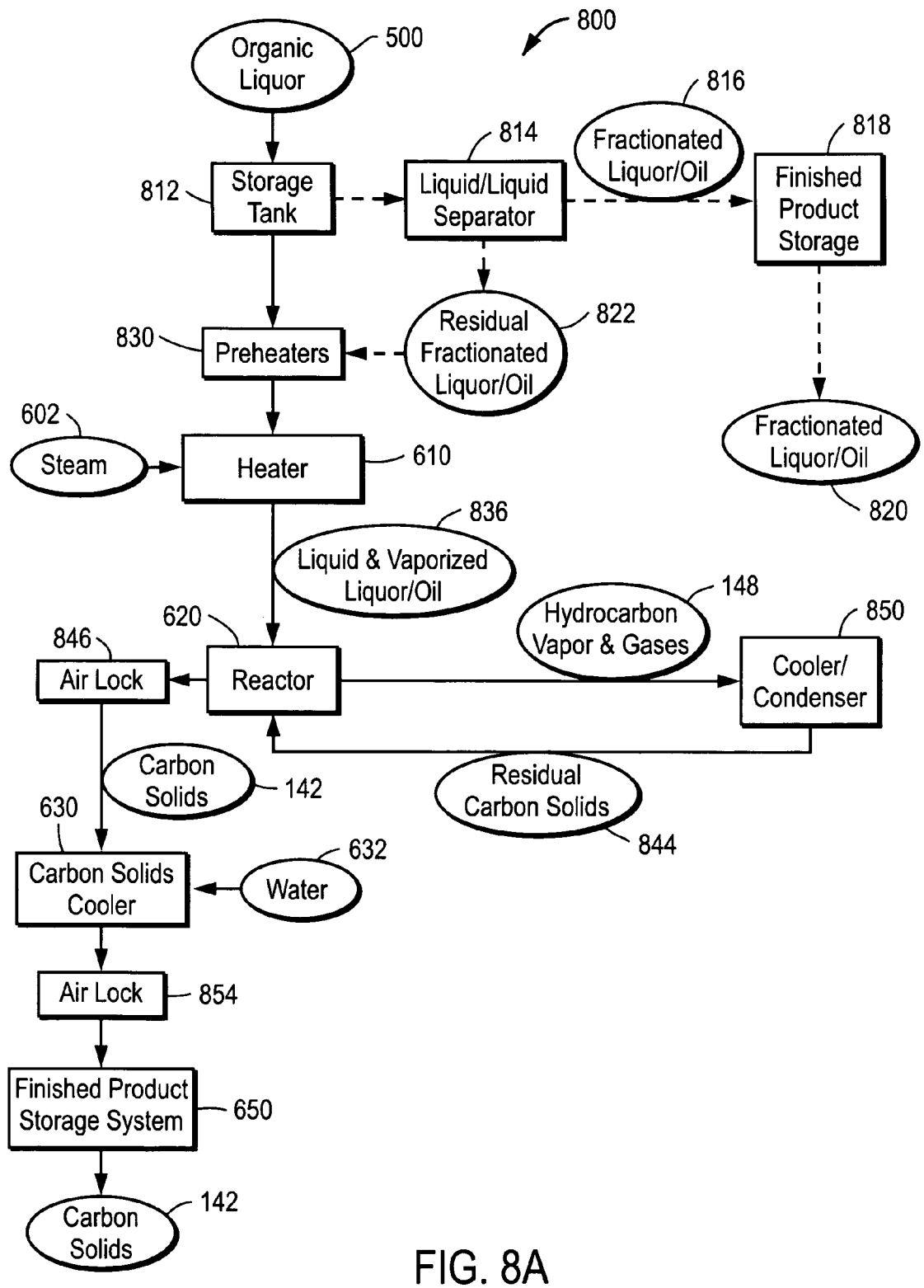
FIGS. 8A and 8B show use, respectively, of an Oil Finishing Stage reactor and a cooler/condenser with a process according to the present invention.
Figure 8B:
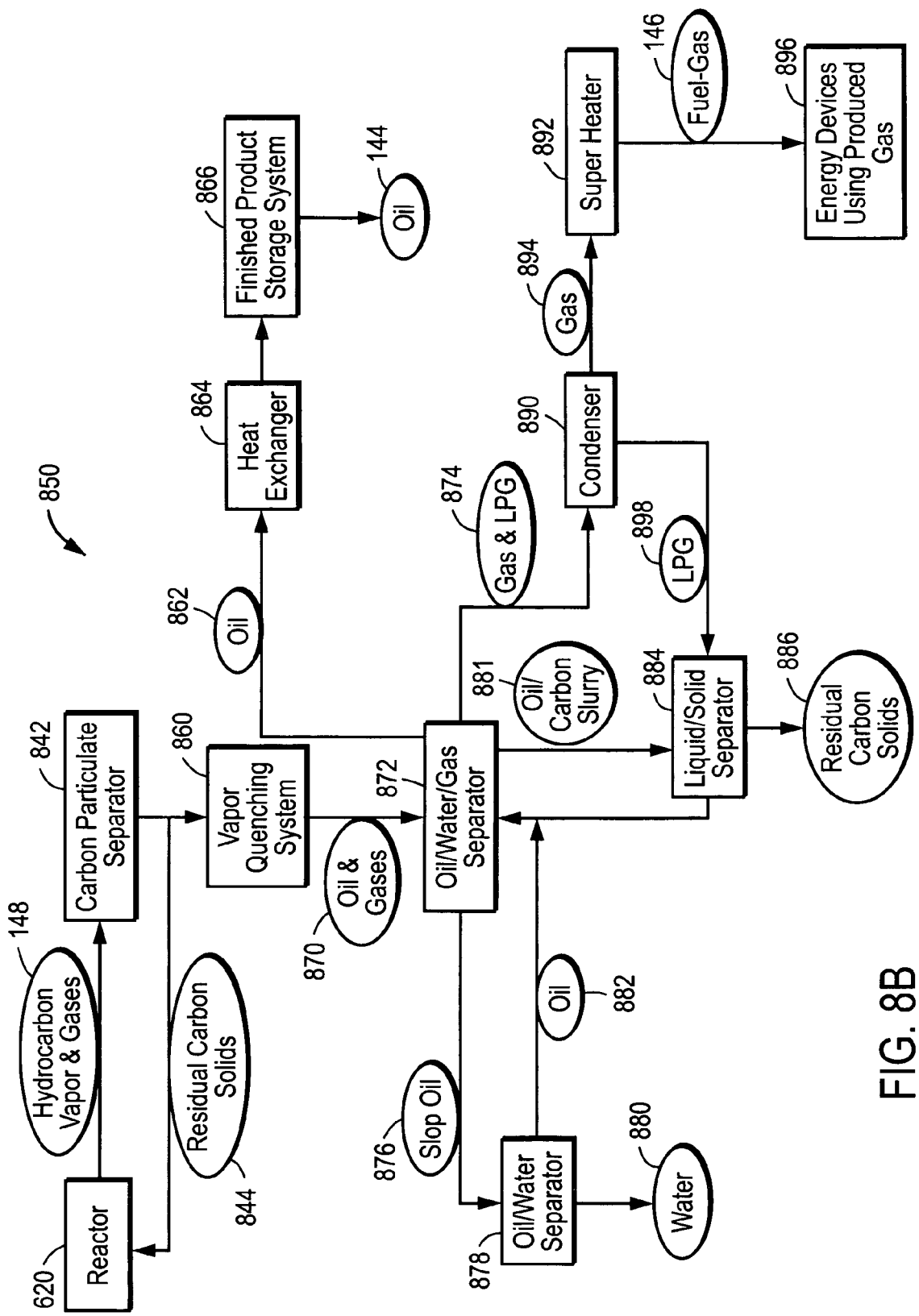
Figure 9:
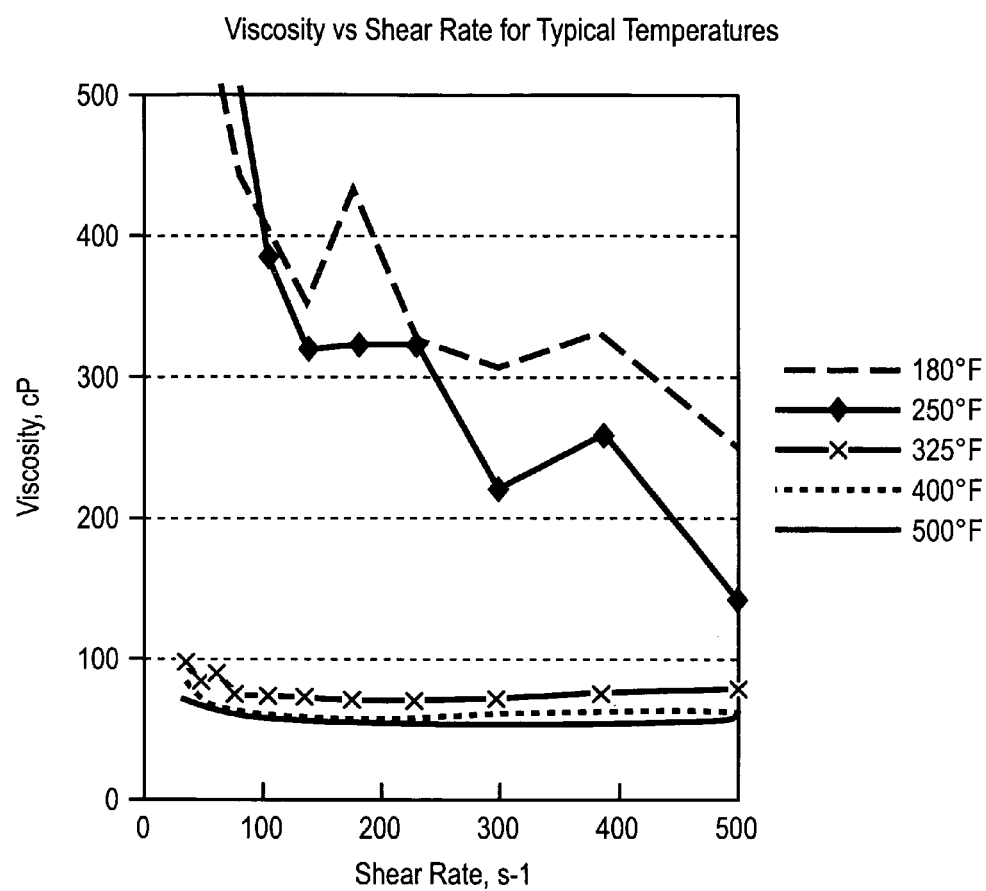
FIG. 9 shows the relationship between viscosity and shear rate of a feedstock at various temperatures.

FIGS. 8A and 8B show a schematic embodiment of an apparatus for use with the process of the present invention. Some elements of a preferred Oil Finishing Stage reactor are also shown in FIG. 6.

FIG. 8A shows, schematically, a preferred apparatus for use with the Oil Finishing Stage of the process of the present invention. Organic liquor 500 passes into a storage tank 812. Optionally, organic liquor and oil may be directed to a liquid/liquid separator 814 and divided into a first portion of fractionated liquor/oil 816 and a second portion of, or residual, fractionated liquor/oil 822. The first portion of fractionated liquor/oil may be directed to finished product storage 818, and distributed as fractionated liquor/oil 820 which can be recycled or sold. The second portion of fractionated liquor/oil 822 is redirected to one or more preheaters 830. Having been heated, the fractionated liquor/oil 822, or the unseparated liquor/oil 500 is passed to a heater 610, preferably accompanied by steam 602. Resulting liquid and vaporized liquor/oil 836 is passed to a reactor 620, such as an auger, and separated into hydrocarbon vapor and gases 148, and carbon solids 142. The hydrocarbon vapor and gases 148 are passed to a cooler/condenser 850, which is further described in FIG. 8B. Any remaining particulates in the oil vapor and gases, such as residual carbon solids 844, are removed and returned to the reactor 620.

Carbon solids 142 are directed through an air lock 846, and into a carbon solids cooler 630, wherein they are mixed with water 632. The resulting mixture of water and carbon solids is passed through another air lock 854 into a finished product storage system 650. Final product carbon solids 142 may be distributed to one or more commercial applications.

For use in conjunction with apparatus 800 shown in FIG. 8A, is a cooler/condenser 850, shown in FIG. 8B. Cooler/condenser 850 facilitates a number of separation cycles wherein a mixture of oil vapor and gases, which may also contain water and particulates, is subject to a number of different separation steps. Hydrocarbon vapor and gases 148 from reactor 620 pass into a carbon particulate separator 842, which separates out remaining solid particles, such as residual carbon solids 844, and redirects such solids back to reactor 620.

The hydrocarbon vapor and gases that emerge from the carbon particulate separator pass into a vapor quenching system 860, implemented according to general principles that would be understood by one of ordinary skill in the art. From the vapor quenching system, oil and gases 870 pass into an oil/water/gas separator 872 which further separates the various components such as oil 862, slop oil 876, gas and LPG 874, and an oil/carbon slurry 881.

Oil 862 passes to a heat exchanger 864 and thereafter into a finished product storage system 866, and is sold as oil 144.

Gas and liquid petroleum gas ("LPG") 874 pass into a condenser 890 which separates out LPG 898 from the other gaseous components. Gas 894 is passed to super heater 892 to yield a fuel gas 146, which can be delivered to one or more devices as a source of energy. LPG 898 is recycled in the following way. First, LPG 898 is passed through a liquid/solid separator 884, and any residual carbon solids 886 are removed. Then, the separated LPG, mixed with oil separated from the oil/carbon slurry 881, is returned to the oil/water/gas separator 872, and a further separation takes place. The cycle wherein the gas and LPG mixture is separated and condensed may be repeated as many times as is desired.

An oil/solid mixture, typically an oil/carbon slurry 881, may also be directed from oil/water/gas separator 872 to liquid/solid separator 884 in order to remove residual carbon solids 886. The separated oil, mixed with LPG, is preferably returned to the oil/water/gas separator for further redirection, as appropriate.

Slop oil 876 from oil/water/gas separator 872 is passed to an oil/water separator 878, and water 880 is released, or may be recycled. Oil 882 from the oil/water separator is passed back to the oil/water/gas separator for further iterations of the separation cycle.

The foregoing description is intended to illustrate various aspects of the present invention. It is not intended that the examples presented herein limit the scope of the present invention. The invention now being fully described, it will be apparent to one of ordinary skill in the art that many changes and modifications can be made thereto without departing from the spirit or scope of the appended claims.

What is claimed:

1. A process of converting shredder residue into oil, comprising:
    dissolving the shredder residue in a solvent;
    preparing a slurry from the shredder residue;
    subjecting the slurry to a depolymerization step to produce a liquid mixture, wherein said depolymerization step takes place at a temperature between about 572° F. and about 785° F;
    separating solids from the liquid mixture;
    adding water to the liquid mixture;
    subjecting the liquid mixture to a hydrolysis step to produce a reacted feed, wherein said hydrolysis step takes place at a temperature between about 430° F. and about 510° F. at a pressure above the saturation pressure of water in the liquid mixture; and
    deriving an oil from said reacted feed.

2. The process of claim 1, wherein said depolymerization step takes place at a pressure above the saturation pressure of water in the slurry.

3. The process of claim 1, wherein said solvent is an organic solvent.

4. The process of claim 1, wherein said depolymerization step takes place at a temperature between about 572° F. and about 650° F.

5. The process of claim 1, wherein the solvent is oil.

6. The process of claim 5, wherein the solvent is oil obtained from said process.

7. A process of converting a raw stream comprising shredder residue and one or more tires into fuel, comprising:
    dissolving a raw stream comprising shredder residue and one or more tires in a solvent to produce a slurry;
    subjecting the slurry to a depolymerization step to produce a liquid mixture;
    separating solids from the liquid mixture;
    adding water to the liquid mixture;
    subjecting the liquid mixture to a hydrolysis step to produce a reacted feed; and
    deriving an oil from said reacted feed.

8. The process of claim 7, wherein said depolymerization step takes place at a temperature between about 572° F. and about 785° F.

9. The process of claim 7, wherein said hydrolysis step takes place at a temperature between about 430° F. and about 750° F. at a pressure above the saturation pressure of water in the liquid mixture.

10. The process of claim 7, wherein said depolymerization step takes place at a temperature in the range of about 700° F. to about 775° F. and said hydrolysis step takes place at a temperature in the range of about 440° F. to about 500° F. and pressure at each said step is maintained above the water saturation pressure at the respective temperature.

11. The process of claim 7, wherein the solvent is oil.

12. The process of claim 7, wherein the solvent is oil obtained from said process.

13. The process of claim 7, wherein said deriving comprises hydrotreating the organic liquor.

14. The process of claim 7, wherein said deriving comprises subjecting the organic liquor to a thermal conversion process.

15. The process of claim 7, wherein said deriving comprises:
    flashing to a lower pressure to remove steam and gasses;
    separating solids; and
    separating water to form an organic liquor.

16. The process of claim 15, wherein said deriving further comprises a liquid-liquid separation.

17. The process of claim 15, wherein said deriving further comprises reacting the organic liquor at a temperature between about 300° C. and about 600° C. to accomplish at least cracking hydrocarbon molecules.

18. The process of claim 1, wherein said deriving comprises: removing heat, water and entrained solids from the reacted feed to form an organic liquor; and
    processing the organic liquor into a fuel.

19. The process of claim 18, wherein said removing comprises:
    flashing the reacted feed to a lower pressure to form an intermediate feed; and
    separating liquids and solids from the intermediate feed to form the organic liquor.

20. The process of claim 19, wherein said separating liquids and solids comprises a first solid-liquid separation to form an organic liquor/water mixture and a second liquid-liquid separation to remove water from the organic liquor.

21. The process of claim 20, wherein said processing comprises removing additional water by a further liquid-liquid separation.

22. The process of claim 20, wherein said processing comprises reacting the organic liquor at a temperature between about 300° C. and about 600° C.

23. A process for producing fuel from a shredder residue containing feedstock, comprising:
    preparing a slurry including a liquid from the feedstock to form a process stream;
    depolymerizing the process stream at a temperature in the range of about 572° F. to 785° F.;
    separating at least one undisolved solid material from the process stream after depolymerizing;
    adding water to the process stream;
    hydrolyzing the depolymerized and separated process stream at a temperature in the range of about 430° F. to 750° F. and a pressure above the saturation pressure of water in the process stream at said hydrolysis temperature;
    flash reducing the pressure of the process stream after hydrolyzing to recover vapors and heat, including steam;
    separating and removing solids from the process stream after reducing the pressure;
    separating water from the process stream after reducing the pressure; and
    diverting the process stream for use as a fuel.

24. The process of claim 16, further comprising redirecting the recovered heat and steam to the process stream after the preparing step.

25. The process of claim 16, wherein vapors including steam are recovered from the hydrolyzing step and redirected to the process stream after the preparing step.

26. The process of claim 16, further comprising, prior to said diverting, reacting the process stream at a temperature in the range of about 300° C. to 600° C.

27. The process of claim 16, wherein including a liquid in said preparing step comprises adding a solvent to the process stream.

* * * * *